United States Patent
Takami et al.

(10) Patent No.: US 10,727,540 B2
(45) Date of Patent: Jul. 28, 2020

(54) SECONDARY BATTERY, BATTERY MODULE, BATTERY PACK AND VEHICLE

(71) Applicant: KABUSHIKI KAISHA TOSHIBA, Minato-ku (JP)

(72) Inventors: Norio Takami, Yokohama (JP); Yasunobu Yamashita, Tokyo (JP); Shinsuke Matsuno, Tokyo (JP); Yasuhiro Harada, Isehara (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/457,406

(22) Filed: Mar. 13, 2017

(65) Prior Publication Data

US 2017/0222272 A1    Aug. 3, 2017

Related U.S. Application Data

(63) Continuation of application No. PCT/JP2017/003666, filed on Feb. 1, 2017.

(30) Foreign Application Priority Data

Feb. 1, 2016  (JP) ................................. 2016-017249
Sep. 21, 2016  (JP) ................................. 2016-184794

(51) Int. Cl.
*H01M 4/00*   (2006.01)
*H01M 10/38*  (2006.01)
(Continued)

(52) U.S. Cl.
CPC ......... *H01M 10/38* (2013.01); *H01M 2/1077* (2013.01); *H01M 4/485* (2013.01);
(Continued)

(58) Field of Classification Search
CPC .. H01M 10/38; H01M 4/485; H01M 2220/20; H01M 4/5825; H01M 2300/002
See application file for complete search history.

(56) References Cited

U.S. PATENT DOCUMENTS 6,403,253 B1   6/2002  Wainwright et al.
9,184,470 B2  11/2015  Kwon et al.
(Continued)

FOREIGN PATENT DOCUMENTS

CN   101154745 A    4/2008
JP   WO 95/21470 A1  8/1995
(Continued)

OTHER PUBLICATIONS

International Search Report dated Mar. 14, 2017 in PCT/JP2017/003666 (submitting English language translation only).
(Continued)

*Primary Examiner* — Cynthia H Kelly
*Assistant Examiner* — Monique M Wills
(74) *Attorney, Agent, or Firm* — Oblon, McClelland, Maier & Neustadt, L.L.P.

(57) ABSTRACT

According to one embodiment, a secondary battery including a positive electrode, a negative electrode, and an electrolyte is provided. The negative electrode includes titanium-containing oxide and at least one kind of element selected from the group consisting of B, P, Al, La, Zr, Ge, Zn, Sn, Ga, Pb, In, Bi, and Tl. The electrolyte includes lithium ions and a solvent containing water.

34 Claims, 12 Drawing Sheets

(51) Int. Cl.
    *H01M 4/485*     (2010.01)
    *H01M 2/10*     (2006.01)
    *H01M 4/58*     (2010.01)
    *H01M 4/02*     (2006.01)

(52) U.S. Cl.
    CPC .... *H01M 4/5825* (2013.01); *H01M 2004/027* (2013.01); *H01M 2220/20* (2013.01); *H01M 2300/002* (2013.01)

(56) References Cited

U.S. PATENT DOCUMENTS

| | | | | |
|---|---|---|---|---|
| 2006/0204839 | A1* | 9/2006 | Richards | H01M 2/0257 |
| | | | | 429/137 |
| 2009/0087742 | A1 | 4/2009 | Martinet et al. | |
| 2010/0136427 | A1 | 6/2010 | Kondo et al. | |
| 2010/0238606 | A1 | 9/2010 | Dreissig et al. | |
| 2010/0255352 | A1 | 10/2010 | Inagaki et al. | |
| 2011/0200848 | A1* | 8/2011 | Chiang | B60L 11/1875 |
| | | | | 429/4 |
| 2012/0077074 | A1* | 3/2012 | Hoshina | C01G 23/005 |
| | | | | 429/149 |
| 2013/0095386 | A1 | 4/2013 | Xu et al. | |
| 2013/0115513 | A1 | 5/2013 | Choi et al. | |
| 2013/0330629 | A1* | 12/2013 | Matsuno | H01M 4/131 |
| | | | | 429/231.1 |
| 2015/0079467 | A1* | 3/2015 | Ahn | H01M 4/131 |
| | | | | 429/215 |
| 2015/0147646 | A1* | 5/2015 | McGee | H01M 4/622 |
| | | | | 429/217 |
| 2015/0318530 | A1 | 11/2015 | Yushin et al. | |
| 2016/0308220 | A1* | 10/2016 | Qi | H01M 4/90 |
| 2017/0098823 | A1* | 4/2017 | Yushin | H01M 4/364 |

FOREIGN PATENT DOCUMENTS

| | | |
|---|---|---|
| JP | H 9-508490 | 8/1997 |
| JP | 2000-077073 | 3/2000 |
| JP | 2002-42764 A | 2/2002 |
| JP | 2002-110221 A | 4/2002 |
| JP | 2003-017057 | 1/2003 |
| JP | 2005-071807 | 3/2005 |
| JP | 2006-100244 | 4/2006 |
| JP | 2006-127848 A | 5/2006 |
| JP | 2007-123093 A | 5/2007 |
| JP | 2009-110931 A | 5/2009 |
| JP | 4301527 B2 | 7/2009 |
| JP | 2009-259473 | 11/2009 |
| JP | 2010-108676 A | 5/2010 |
| JP | 2011-249238 A | 12/2011 |
| JP | 2012-123952 | 6/2012 |
| JP | 2012-248436 A | 12/2012 |
| JP | 2013-101908 | 5/2013 |
| JP | 5300502 | 9/2013 |
| JP | 2015-502013 | 1/2015 |
| JP | 2015-46307 A | 3/2015 |
| JP | 2015-156356 | 8/2015 |
| KR | 10-2006-0117247 A | 11/2006 |
| KR | 10-2009-0108708 A | 10/2009 |
| KR | 10-2010-0106196 A | 10/2010 |
| KR | 10-2015-0047274 A | 5/2015 |
| WO | WO 2008/001541 | 1/2008 |
| WO | WO 2008/088832 A2 | 7/2008 |
| WO | WO 2009/008280 | 1/2009 |
| WO | WO 2009/008280 A1 | 1/2009 |
| WO | WO 2010/090224 A1 | 8/2010 |

OTHER PUBLICATIONS

International Search Report and Written Opinion dated Mar. 14, 2017 in PCT/JP2017/003666 (with English Translation of Categories of Cited Documents).

S. Liu, et al., "Rechargeable Aqueous Lithium-Ion Battery of $TiO_2/LiMn_2O_4$ with a High Voltage" Journal of the Electrochemical Society, vol. 156, No. 12, 2011, pp. A1490-A1497.

Mao-Sung. Wu, et al., "Electrochemical fabrication of anatase $TiO_2$ nanostructure as an anode material for aqueous lithium-ion batteries" Journal of Power Sources, vol. 185, 2008, pp. 1420-1424.

Safety Data Sheet for Lithium Hexafluorophosphate; retrieved from "https://www.ltschem.com/msds/LiPF6.pdf", accessed 10:40 AM Japan time on Feb. 5, 2019.

Wang, G.X., et al., "Secondary aqueous lithium-ion batteries with spinel anodes and cathodes", Journal of Power Sources, vol. 74, 1998, pp. 198-201.

Robab Khayat Ghavami et al., Effects of cationic CTAB and anionic SDBS surfactants on the performance of $Zn-MnO_2$ alkaline batteries, Journal of Power Sources 164 (2007) 934-946.

Haegyeom Kim et al., "Aqueous Rechargeable Li and Na Ion Batteries" Chem. Rev. 2014; 114, pp. 11788-11827.

\* cited by examiner

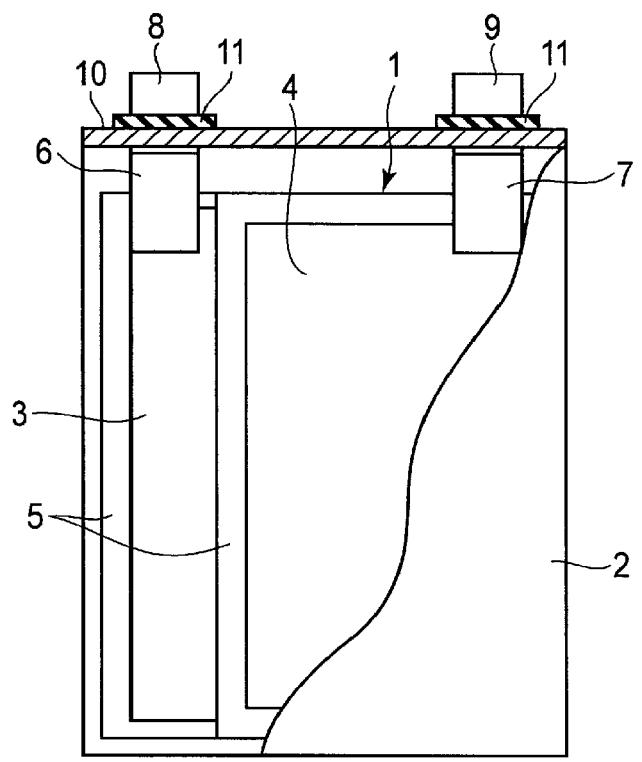
F I G. 1

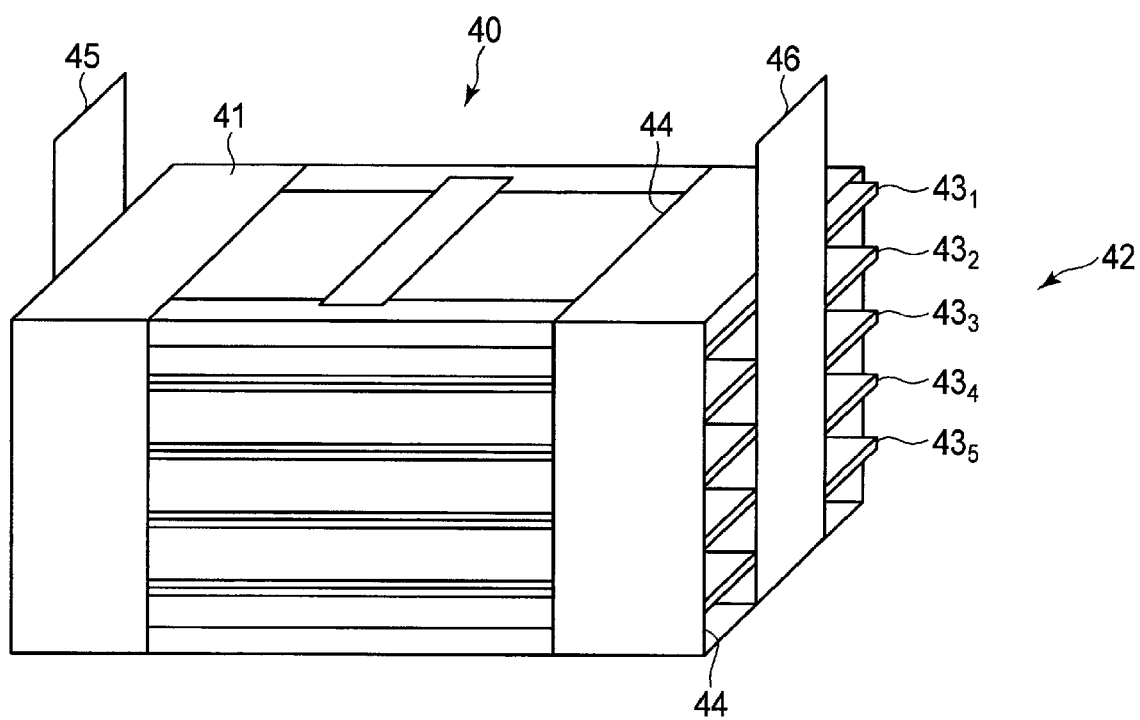
F I G. 6

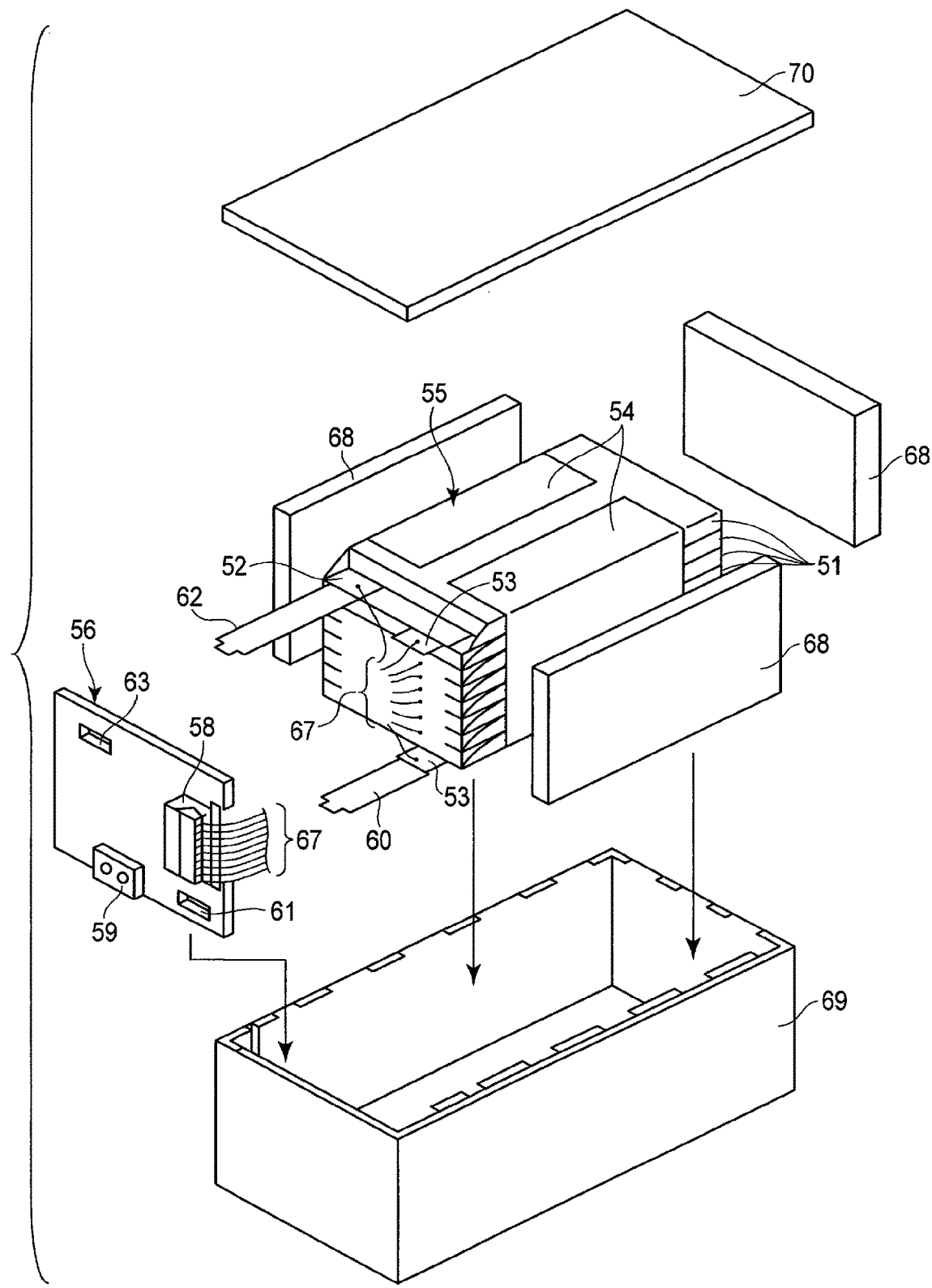
F I G. 7

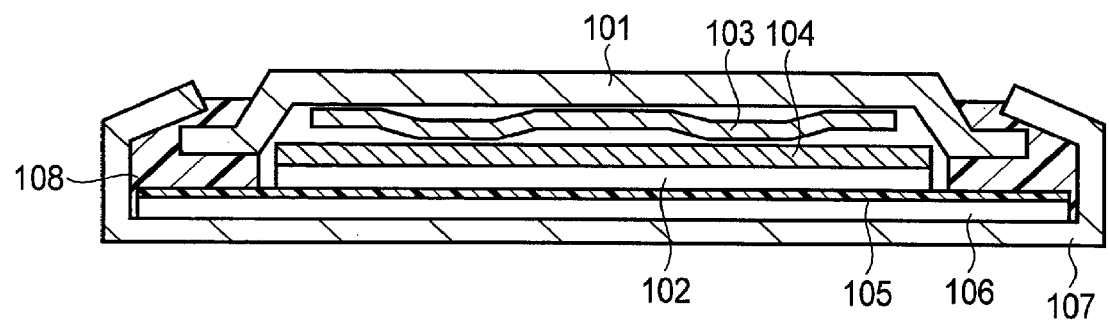
F I G. 9
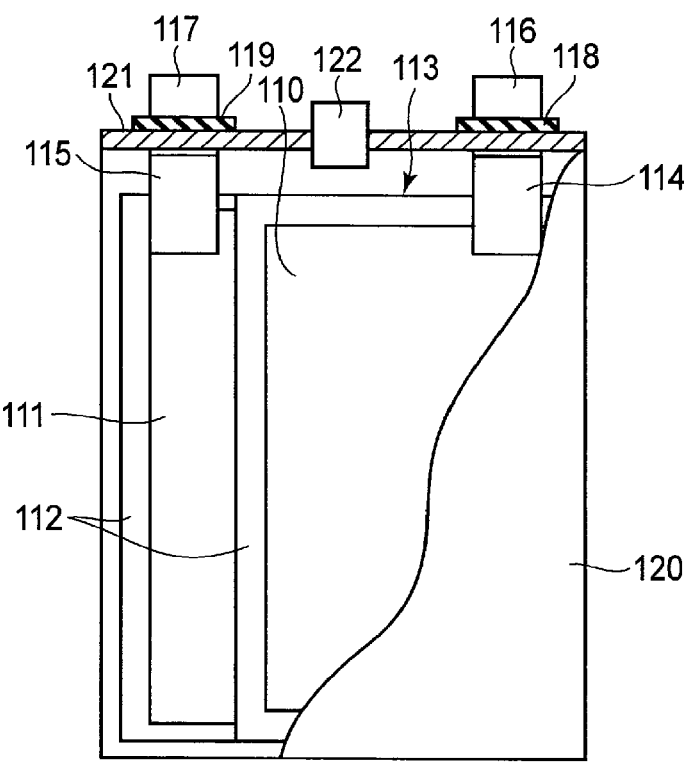
F I G. 10

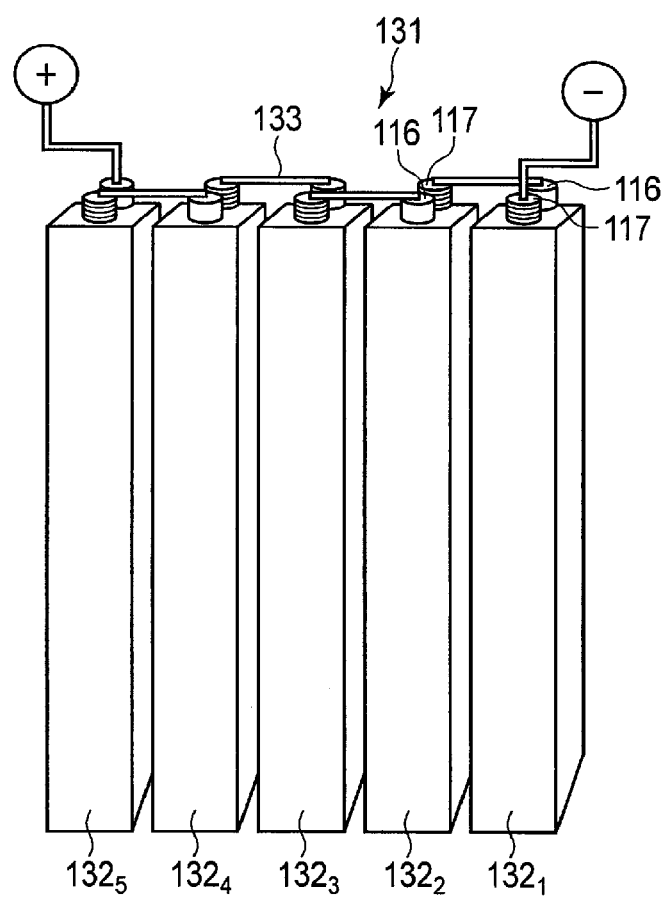
F I G. 12

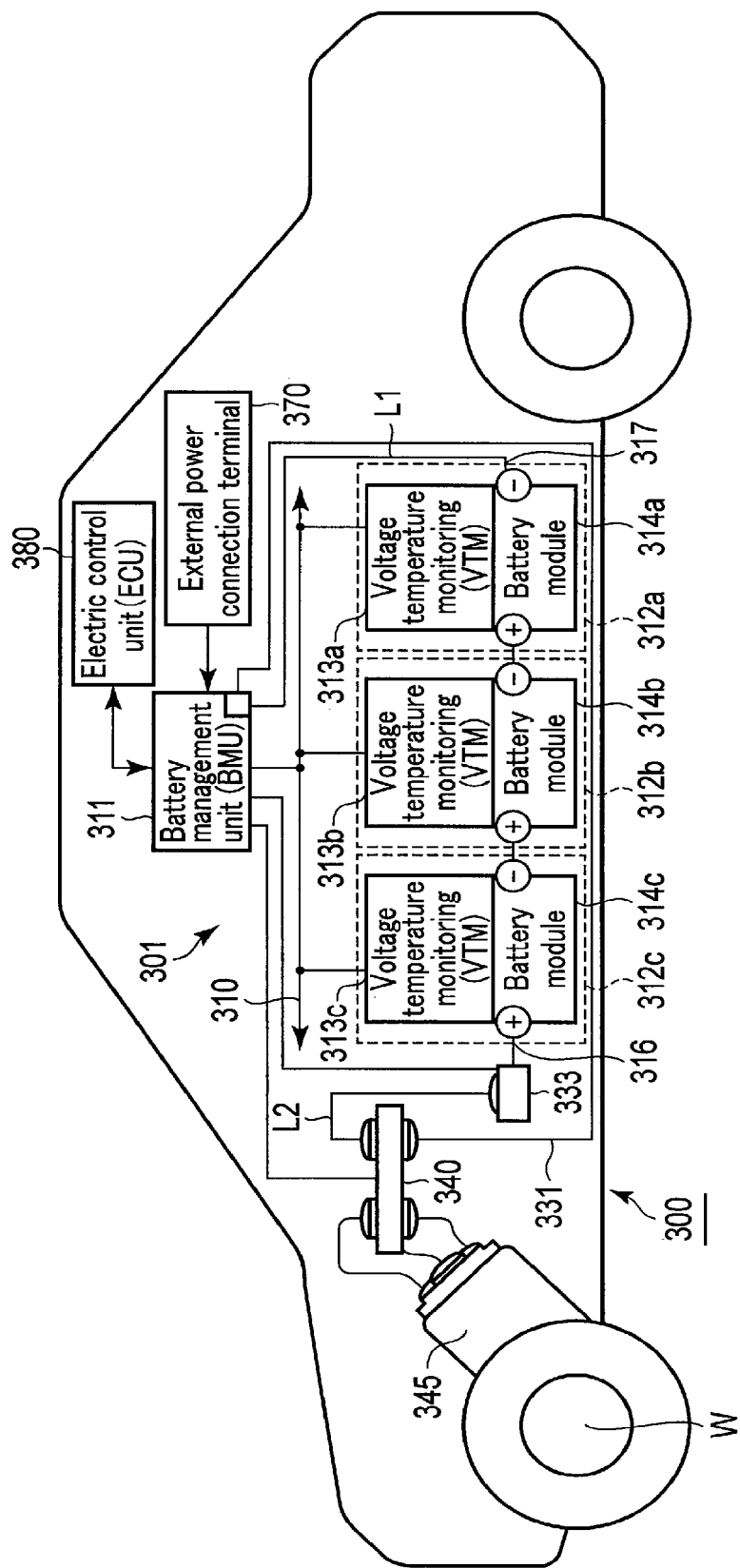
F I G. 14

SECONDARY BATTERY, BATTERY MODULE, BATTERY PACK AND VEHICLE

CROSS-REFERENCE TO RELATED APPLICATIONS

This application is a Continuation application of PCT Application No. PCT/JP2017/003666, filed Feb. 1, 2017, and based upon and claiming the benefit of priority from Japanese Patent Application No. 2016-017249, filed Feb. 1, 2016, and Japanese Patent Application No. 2016-184794, filed Sep. 21, 2016, the entire contents of all of which are incorporated herein by reference.

FIELD

Embodiments of the present invention relate to a secondary battery, a battery module, a battery pack and a vehicle.

BACKGROUND

A nonaqueous electrolyte battery in which a lithium metal, a lithium alloy, a lithium compound or a carbonaceous material is used for a negative electrode is expected as a high energy density battery, and active research and development have been conducted. A lithium ion secondary battery including a positive electrode containing $LiCoO_2$ or $LiMn_2O_4$ as an active material and a negative electrode containing a carbonaceous material that allows lithium ions to be inserted in and extracted from has been widely put to practical use for a portable device.

In the case of installing the battery in a vehicle such as an automobile or a train, it is desirable that the positive and negative electrodes include a material excellent in chemical and electrochemical stability, in durability, and in corrosion resistance for obtaining a storage performance in high-temperature environments (e.g., at not less than 60° C.), cycle performance, and reliability of high power over a long time. Further, high performance in cold climates, high-output performance in a low-temperature environment (−40° C.), and long life performance are required. On the other hand, although a nonvolatile and noncombustible electrolytic solution has been developed as a nonaqueous electrolyte for enhancing safety performance, a battery including the electrolytic solution has not yet been put to practical use because output characteristics, low-temperature performance, and long life performance are reduced.

As described above, when the lithium ion secondary battery is installed in a vehicle or the like, there is a problem with the high-temperature durability and low-temperature output performance. Thus, it is difficult to install the lithium ion secondary battery in an engine room of the vehicle in place of a lead storage battery.

Since an electrolytic solution of the lithium ion secondary battery is used at a high voltage of 2 V to 4.5 V, an aqueous solution-based electrolytic solution is not used in the lithium ion secondary battery, and a nonaqueous electrolytic solution in which lithium salt is dissolved in an organic solvent is used. It has been considered to improve a composition of the nonaqueous electrolytic solution in order to improve large current discharge performance and cycle life performance. However, since ion conductivity of the nonaqueous electrolytic solution is lower than that of the aqueous solution-based electrolytic solution, it is difficult to lower the resistance of a battery. Since an organic solvent is used in the nonaqueous electrolyte, high temperature decomposition of the nonaqueous electrolyte is likely to occur. And since heat stability of the nonaqueous electrolyte is poor, high-temperature cycle life performance is lowered. Also, although a solid electrolyte has been considered as a nonaqueous electrolyte, since the ion conductivity of the nonaqueous electrolyte is further lowered, it is difficult to enhance large current discharge performance.

In a nonaqueous electrolyte battery charged and discharged by movement of Li ions between a negative electrode and a positive electrode, a nonaqueous electrolyte containing a nonaqueous solvent is used as an electrolytic solution. Since the nonaqueous solvent has wide potential stability, in the nonaqueous electrolyte battery, a high cell voltage of approximately 3 to 4 V can be exhibited. Thus, the nonaqueous electrolyte battery is excellent in energy density as compared with conventional storage batteries. Therefore, in recent years, the use of nonaqueous electrolyte batteries has been progressing in a wide range of applications including on-vehicle application such as μHEV (micro-hybrid electric vehicle) and an idling stop system, and for stationary use.

However, since a nonaqueous solvent contained in a nonaqueous electrolyte is an organic solvent, the nonaqueous solvent is highly volatile and inflammable. Thus, a nonaqueous electrolyte battery has risks such as a possibility of ignition associated with over-charge, temperature increase, or impact. To prevent such risks, the use of an aqueous solvent in a lithium ion battery has been proposed.

BRIEF DESCRIPTION OF THE DRAWINGS

FIG. 1 is a partially cutout cross-sectional view of a secondary battery of an embodiment;

FIG. 6 is a perspective view of an example of a battery pack of the embodiment;

FIG. 7 is an exploded perspective view of another example of a battery pack of the embodiment;

FIG. 9 is a schematic cross-sectional view of an example of a coin-type secondary battery according to an embodiment;

FIG. 10 is a schematic cross-sectional view of an example of a square-type secondary battery according to an embodiment;

FIG. 12 is a perspective view of an example of a battery module according to an embodiment;

FIG. 14 is a schematic view showing an aspect of a vehicle including the secondary battery according to embodiments.

DETAILED DESCRIPTION

Figure 2:
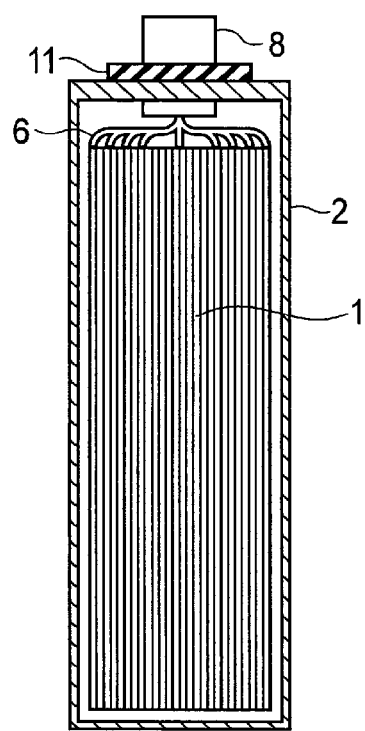
FIG. 2 is a side view of the battery of FIG. 1.

According to one embodiment, a secondary battery including a positive electrode, a negative electrode, and an electrolyte is provided. The negative electrode includes titanium-containing oxide and at least one kind of element selected from the group consisting of B, P, Al, La, Zr, Ge, Zn, Sn, Ga, Pb, In, Bi, and Tl. The electrolyte includes lithium ions and a solvent containing water.

Furthermore, according to one embodiment, a battery module includes the secondary battery according to the embodiment.

Yet further, according to one embodiment, a battery pack includes the secondary battery according to the embodiment.

In addition, according to one embodiment, a vehicle includes the battery pack according to the embodiment.

According to another embodiment, a secondary battery is provided. The secondary battery includes a positive electrode, a negative electrode, and an electrolytic solution. The negative electrode includes a current collector and a negative electrode active material including titanium-containing oxide. At least one of the current collector and the negative electrode active material includes on at least a portion of a surface thereof, a covering layer including at least one kind of element selected from the group consisting of Zn, In, Sn, Pb, Hg, Cu, Cd, Ag, and Bi. The electrolytic solution includes an aqueous solvent and an electrolyte.

Furthermore, according to another embodiment, a battery module is provided. The battery module includes the secondary battery according to the other embodiment.

According to one embodiment, a battery pack is provided. The battery pack includes the secondary battery according to the other embodiment According to still another embodiment, a vehicle is provided. The vehicle includes the battery pack according to the other embodiment.

First Embodiment

According to a first embodiment, a secondary battery including a positive electrode, a negative electrode, and an electrolyte is provided. The negative electrode contains particles of titanium-containing oxide and at least one kind of element (hereinafter referred to as an additive element) selected from the group consisting of B, P, Al, La, Zr, Ge, Zn, Sn, Ga, Pb, In, Bi, and Tl. The electrolyte contains lithium ions and a solvent containing water. In this electrolyte, the ion conductivity can be increased by 10 times or more as compared with a nonaqueous electrolytic solution. When such an aqueous electrolyte is combined with a negative electrode containing particles of titanium-containing oxide as a negative electrode active material, generation of hydrogen gas inhibits insertion and extraction of lithium ions. The present inventors have for the first time found that when a negative electrode contains an additive element, a hydrogen generation rate in titanium-containing oxide is reduced to reduce generation of hydrogen, so that lithium ions can be efficiently inserted in and extracted from the negative electrode, whereby cycle life performance, storage performance, and large current discharge performance of a secondary battery are enhanced.

When the electrolyte further contains zinc ions, the capacity of the secondary battery can be improved in addition to the cycle life performance, the storage performance, and the large current discharge performance. It is assumed that this is due to the mechanism to be described as follows. Zinc ions in an electrolytic solution may be deposited as zinc as metal or a compound of zinc (for example, zinc oxide or zinc hydroxide) on a surface of particles of titanium-containing oxide by charging such as initial charging. Thus, at least a portion of the surface of the particles of the titanium-containing oxide can be covered with a covering member containing Zn as a zinc element. Since the Zn (zinc element) in the covering member functions as an additive element to increase a hydrogen generation overvoltage of a negative electrode, hydrogen generation is suppressed, so that lithium ions are smoothly inserted in and extracted from the negative electrode. Since the zinc element in the covering member also functions as a negative electrode active material, a negative electrode capacity is enhanced. When the zinc element in a metal state is contained in the negative electrode, electron conductivity of the negative electrode is enhanced. From these results, it is possible to achieve a secondary battery being excellent in cycle life performance, storage performance, and large current discharge performance and having a high capacity.

When the covering member containing an additive element covers at least a portion of the surface of the particles of the titanium-containing oxide, the hydrogen generation overvoltage in the negative electrode can be further increased, and therefore, the cycle life performance and the storage performance of the secondary battery can be further improved.

When the electrolyte contains an anion including at least one kind selected from the group consisting of a chlorine ion ($Cl^-$), a hydroxide ion ($OH^-$), a sulfate ion ($SO_4^-$), and a nitrate ion ($NO_3^-$), the ion conductivity of the electrolyte is enhanced, whereby large current discharge performance of the secondary battery can be improved.

When the titanium-containing oxide includes at least one kind selected from titanium oxide represented by a general formula $Li_xTiO_2$ ($0 \leq x \leq 1$) and lithium titanium oxide represented by a general formula $Li_{4+x}Ti_5O_{12}$ (x is $-1 \leq x \leq 3$), the hydrogen generation overvoltage in the negative electrode is further increased, so that the cycle life performance and the storage performance of the secondary battery can be further improved.

As described above, the secondary battery of each embodiment includes the electrolyte, the negative electrode, and the positive electrode, and a separator can be interposed between the negative electrode and the positive electrode. Further, the secondary battery of each embodiment can further include a container storing the electrolyte, the negative electrode, and the positive electrode.

Hereinafter, the electrolyte, the negative electrode, the positive electrode, the separator, and the container will be described.

1) Electrolyte

The electrolyte is a first electrolyte, which contains a solvent containing lithium ions and water. Examples of the electrolyte include a solution containing lithium ions, and a gel-like electrolyte including a composite of the solution and a polymer material. The solution containing lithium ions is prepared by, for example, dissolving a lithium salt in a solvent containing water. Examples of the polymer material include polyvinylidene fluoride (PVdF), polyacrilonitrile (PAN), and polyethyleneoxide (PEO)

It is preferable to use water as a solvent. This is because an electrolyte having a high ion conductivity can be obtained. An aqueous solution may have a lithium ion concentration in the range of not less than 2 mol/L and not more than 10 mol/L. It is considered that when the lithium ion concentration is high, free water molecules are reduced, and a hydrogen generation suppression effect can be enhanced. Thus, the concentration is more preferably in the range of not less than 4 mol/L and not more than 10 mol/L and still more preferably in the range of not less than 6 mol/L and not more than 10 mol/L.

Examples of lithium salt include LiCl, LiBr, LiOH, $Li_2SO_4$, $LiNO_3$, $Li_2C_2O_4$, and $LiB[(OCO)_2]_2$. One or plural kinds of lithium ions may be used. It is preferable because an electrolyte containing LiCl can have a high lithium ion concentration of not less than 4 mol/L or not less than 6 mol/L.

It is preferable that an electrolyte contains anion species including at least one kind selected from the group consisting of a chlorine ion ($Cl^-$), a hydroxide ion ($OH^-$), a sulfate ion ($SO_4^{2-}$), and a nitrate ion ($NO_3^-$). Those anion species can be obtained by, for example, dissolving lithium salt, such as LiCl, LiOH, $Li_2SO_4$, or $LiNO_3$, in a solvent.

The electrolyte may contain salt of an additive element. One or plural kinds of additive elements may be contained in the salt. It is preferable that this salt can be dissolved in a solvent containing water. Examples of the salt include $ZnSO_4$. When the electrolyte contains $ZnSO_4$, zinc ions exist in the electrolyte (for example, in a solvent). As a result, metallic zinc or a compound of zinc is deposited on a surface of titanium-containing oxide particles by charging such as initial charging, whereby at least a portion of the surface of the titanium-containing oxide particles can be covered with a zinc-containing covering member. Thus, the capacity of the secondary battery can be improved in addition to the cycle life performance, the storage performance, and the large current discharge performance.

A pH value of an aqueous solution containing lithium ions is preferably in the range of not less than 3 and not more than 13. If the pH value is in this range, hydrogen generation can be reduced. Consequently, the cycle life performance and the storage performance can be enhanced. More preferable ranges are not less than pH 4 and not more than pH 6.5 in an acidic region and not less than pH 7.5 and not more than pH 12 in an alkaline region. When the pH value is in the acidic region or the alkaline region, corrosion reaction of an additive element such as zinc can be suppressed while improving the ion conductivity of an electrolyte. The pH value of the electrolyte can be adjusted into a range in the acidic region by adding sulfuric acid to the electrolyte. On the other hand, the pH value of the electrolyte can be adjusted into a range in the alkaline region by adding LiOH to the electrolyte.

2) Negative Electrode

The negative electrode includes a negative electrode current collector and a negative electrode active material-containing layer provided on one side or both sides of the current collector and including an active material, an electro-conductive agent, and a binder.

Examples of the negative electrode current collector include a foil, a porous body, and a mesh. Examples of materials forming the negative electrode current collector include electrically conductive materials such as metals and alloys. Examples of metals include nickel, stainless steel, iron, copper, aluminum, and zinc. It is preferable for the negative electrode current collector to include a metal plate whose surface is covered with a layer or film of metal oxide by oxidation treatment. The negative electrode current collector may be made of one or more kinds of materials.

A negative electrode active material-containing layer further contains at least one kind of element (hereinafter referred to as an additive element) selected from the group consisting of B, P, Al, La, Zr, Ge, Zn, Sn, Ga, Pb, In, Bi, and Tl. Each additive element may take any form including a simple substance, a compound, and an alloy. Each additive element may be present in a negative electrode in a plurality of forms such as a simple substance and a compound.

Examples of compounds of each additive element include oxide, hydroxide, and an oxide solid electrolyte. Examples of oxides of the additive element include boron oxide ($B_2O_3$), alumina ($Al_2O_3$), zirconia oxide ($ZrO_2$), germanium oxide ($GeO_2$), zinc oxide ($ZnO$), and lead oxide ($PbO$). Examples of hydroxides of the additive element include zinc hydroxide ($Zn(OH)_2$). On the other hand, it is preferable to use an oxide solid electrolyte having high stability in an alkali aqueous solution and having lithium ion conductivity. In particular, an oxide solid electrolyte having a garnet crystal structure, a perovskite crystal structure, or a NASICON-type crystal structure has advantages of chemical stability in an alkaline aqueous solution, a high reduction resistance, and a wide potential window. Examples of the oxide solid electrolyte having the garnet crystal structure include $Li_{5+x}A_xLa_{3-x}M_2O_{12}$ (A is at least one kind of element selected from the group consisting of Ca, Sr, and Ba, M is Nb and/or Ta, and x is $0 \le x \le 2$), $Li_3M_{2-x}L_2O_{12}$ (M is Ta and/or Nb, L is Zr, and x is $0 \le x \le 2$), $Li_{7-3x}Al_xLa_3Zr_2O_{12}$ (x is $0 \le x \le 0.3$), and $Li_7La_3Zr_2O_{12}$. Among them, since $Li_{6.25}Al_{0.25}La_3Zr_2O_{12}$ and $Li_7La_3Zr_2O_{12}$ each have a high ion conductivity and are each electrochemically stable, the large current discharge performance and the cycle life performance of the secondary battery are improved. As the oxide solid electrolyte having the perovskite crystal structure, $Li_{3x}La_{2/3-x}TiO_3$ ($0.05 \le x \le 0.15$) is preferably used. As the oxide solid electrolyte having the NASICON-type crystal structure, $Li_{1.3}Ti_{1.7}Al_{0.3}(PO_4)_3$ is preferably used. As an oxide solid electrolyte having a $\gamma$-$Li_3PO_4$ crystal structure, $Li_{14}ZnGe_4O_{16}$ or $Li_{3.6}Ge_{0.6}V_{0.4}O_4$ is preferably used.

Preferred examples of oxides include zirconia oxide ($ZrO_2$), alumina ($Al_2O_3$), zinc oxide ($ZnO$), and germanium oxide ($GeO_2$). Those oxides have a high suppression effect for hydrogen generation. When $Al_2O_3$ is used, hydrogen generation is suppressed, and the cycle life performance and the storage performance are enhanced.

Since zinc as metal or a compound of zinc (for example, zinc oxide or zinc hydroxide) has a high hydrogen overvoltage and functions as a negative electrode active material, hydrogen generation is suppressed, and a high capacity negative electrode can be achieved. Since zinc as metal is excellent in electron conductivity, it can serve as an electro-conductive agent, so that the electron conductivity of a negative electrode can be enhanced.

Composite particles in which at least a portion of a surface of particles of an additive element is covered with a layer or film including oxide of the additive element may be used. The hydrogen generation overvoltage on a surface of metal oxide can be increased as compared with a surface of a metal simple substance. In particular, a composite in which at least a portion of a surface of Al particles is covered with a layer or a film including alumina ($Al_2O_3$) and a composite in which at least a portion of a surface of Zn particles is covered with a layer or a film including zinc oxide (ZnO) each have a high hydrogen overvoltage, and thus it is preferable. It is preferable that alumina is formed by applying alumite treatment to Al body.

Examples of alloys containing an additive element include a Zn alloy, a Bi—In—Pb-based alloy, a Bi—In—Ca-based alloy, and a Bi—In—Al alloy. Those alloys can increase the hydrogen generation overvoltage.

The additive element allows containing of a negative electrode active material-containing layer by mixing particles containing the additive element with titanium-containing oxide particles. Although the shape of particles containing this additive element is not limited particularly, the particles may have a spherical shape, an elliptical shape, a flat shape, a fibrous shape, or the like.

When additive element-containing particles are mixed with negative electrode active material particles, it is desirable that a mixing ratio satisfies the following formula (1):

$$2\% \text{ by weight} \leq \{W_1/W_2\} \times 100 \leq 50\% \text{ by weight} \quad (1)$$

In the formula (1), $W_1$ represents the weight of the additive element-containing particles, and $W_2$ is the weight of the negative electrode active material particles. When a surface of the titanium-containing oxide particles is covered with a covering member, $W_2$ is the total weight of the titanium-containing oxide particles and the covering member.

When the weight ratio of an additive element is not less than 2% by weight and not more than 50% by weight, the electron conductivity in a negative electrode is enhanced, and hydrogen generation is significantly suppressed. Therefore, lithium ions can be smoothly inserted in and extracted from the negative electrode active material, whereby the large current discharge performance of a battery can be enhanced. A more preferable range of the weight ratio is not less than 3% by weight and not more than 30% by weight.

The weight ratio of the additive element is measured by the following method. A secondary battery is disassembled in a glove box filled with argon to take out a negative electrode therefrom. A negative electrode active material-containing layer is separated from a negative electrode current collector of the taken out negative electrode. The negative electrode active material-containing layer is washed with water or cleaned with a neutral aqueous solution and then dried. Thereafter, the additive element and the negative electrode active material are separated using a specific gravity difference between the additive element and the negative electrode active material. The separation is performed by a method of putting a mixed powder in an organic solvent and separating the additive element and the negative electrode active material based on a difference in settling velocity or a method of separating the additive element and the negative electrode active material by using a dry type gravity sorting/separator device. The weights of the additive element and the negative electrode active material are measured to calculate the weight ratio of the additive element from the formula (1).

At least a portion of the surface of titanium-containing oxide particles can be covered with a covering member containing the additive element. Examples of the covering method include, in addition to plating and evaporation, a method of allowing an electrolytic solution of a secondary battery to contain the additive element and allowing the additive element in the electrolytic solution to be deposited on titanium-containing oxide particles by charging. A thickness of the covering member including the additive element is preferably not less than 0.01 μm and not more than 1 μm. If the thickness is less than this range, hydrogen generation increases, and the life performance may be reduced. On the other hand, if the thickness is more than this range, resistance increases, and the large current discharge performance may be reduced. A more preferable range is not less than 0.01 μm and not more than 0.5 μm. Although the covering member containing the additive element may have a granular shape, a fibrous shape, a layered shape, or the like, the shape is not limited particularly. The thickness of the covering member can be measured by observation using a scanning electron microscope (SEM) or a transmission electron microscope (TEM).

The negative electrode active material-containing layer may further contain titanium oxide (TiO, $TiO_2$) in addition to the additive element.

The negative electrode active material contains one or plural kinds of titanium-containing oxides. Examples of the titanium-containing oxides include lithium titanium oxide, titanium oxide, niobium titanium oxide, and sodium niobium titanium oxide. The Li insertion potential of the titanium-containing oxide is desirably in a range of not less than 1V (vs. Li/Li$^+$) and not more than 3V (vs. Li/Li$^+$).

Examples of lithium titanium oxides include spinel structure lithium titanium oxide (for example, a general formula $Li_{4+x}Ti_5O_{12}$ (x is $-1 \leq x \leq 3$)), lithium titanium oxide having a ramsdellite structure (for example, $Li_{2+x}Ti_3O_7$ ($-1 \leq x \leq 3$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $LiTiO_2$ ($0 < x \leq 1$).

Examples of titanium oxides include titanium oxide having a monoclinic structure, titanium oxide having a rutile structure, and titanium oxide having an anatase structure. In the titanium oxide having each crystal structure, the composition before charging can be represented by $TiO_2$, and the composition after charging can be represented by $Li_xTiO_2$ (x is $0 \leq x \leq 1$). In the titanium oxide having a monoclinic structure, the structure before charging can be represented as $TiO_2$ (B).

Examples of niobium oxides include niobium oxide represented by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, and M is at least one kind of element selected from the group consisting of Fe, V, Mo, and Ta).

Examples of sodium niobium titanium oxides include orthorhombic Na-containing niobium titanium composite oxide represented by a general formula $Li_{2+v}Na_{2-w}M1_xTi_{6-y-z}Nb_yM2_zO_{14+\delta}$ ($0 \leq v \leq 4$, $0 < w < 2$, $0 \leq x < 2$, $0 < y \leq 6$, $0 \leq z < 3$, $-0.5 \leq \delta \leq 0.5$, M1 includes at least one selected from Cs, K, Sr, Ba, and Ca, and M2 includes at least one selected from Zr, Sn, V, Ta, Mo, W, Fe, Co, Mn, and Al).

Preferable examples of titanium-containing oxides include titanium oxide having an anatase structure, titanium oxide having a monoclinic structure, and lithium titanium oxide having a spinel structure. In each titanium-containing oxide and the lithium titanium oxide, since the Li insertion potential is in a range of not less than 1.4 V (vs. Li/Li$^+$) and not more than 2 V (vs. Li/Li$^+$), the hydrogen generation suppression effect can be enhanced by combining the titanium-containing oxide with an electrolytic solution being an aqueous solution containing lithium ions.

Consequently, a negative electrode can allow lithium ions to be efficiently inserted in and extracted from. Titanium oxide having an anatase structure has the most excellent hydrogen generation suppression effect, followed by titanium oxide having a monoclinic structure, lithium titanium oxide having a spinel structure, and niobium titanium oxide. By virtue of the use of those titanium-containing oxides, an aluminum foil or an aluminum alloy foil used as a positive electrode current collector can be used like a negative electrode current collector, instead of a copper foil, so that weight reduction and cost reduction can be achieved. This is advantageous for an electrode structure as a bipolar structure. The lithium titanium oxide having a spinel structure can reduce a change in volume due to a charge/discharge reaction.

A negative electrode active material is contained in the form of particles in a negative electrode active material-containing layer. Negative electrode active material particles may be independent primary particles, secondary particles as agglomerates of primary particles, or a mixture of the independent primary particles and the secondary particles. The shape of particles is not limited particularly and may be, for example, a spherical shape, an elliptical shape, a flat shape, or a fibrous shape.

An average particle size (diameter) of secondary particles of a negative electrode active material is preferably not less than 5 µm and more preferably not less than 7 µm and not more than 20 µm. If the average particle size is in this range, the hydrogen generation suppression effect can be enhanced.

A negative electrode active material in which the average particle size of secondary particles is not less than 5 µm is obtained by the following method, for example. An active-material raw material is reacted and synthesized to produce an active material precursor having an average particle size of not more than 1 µm. After that, the precursor is baked as a heat treatment and then ground using a grinder such as a ball mill and a jet mill. Then, in the heat treatment, an active material precursor is aggregated to be grown to secondary particles having a large particle size.

An average particle size of primary particles of a negative electrode active material is desirably not more than 1 µm. Consequently, a diffusion distance of lithium ions inside active material particles is reduced, and a specific surface area increases. Thus, excellent high input performance (i.e., rapid charge performance) is obtained. On the other hand, if an average particle size is small, particles are likely to aggregate, and most of an electrolyte may be distributed in a negative electrode to cause depletion of the electrolyte in a positive electrode. Therefore, the lower limit value of the average particle size is desirably 0.001 µm. A more preferable average particle size is not less than 0.1 µm and not more than 0.8 µm.

In negative electrode active material particles, it is desirable that the specific surface area according to a BET method using $N_2$ absorption is in a range of not less than 3 $m^2/g$ and not more than 200 $m^2/g$. Consequently, an affinity with an electrolyte of a negative electrode can be further enhanced.

A specific surface area of a negative electrode active material-containing layer (except for a current collector) is desirably in a range of not less than 3 $m^2/g$ and not more than 50 $m^2/g$. A more preferable range of the specific surface area is not less than 5 $m^2/g$ and not more than 50 $m^2/g$. The negative electrode active material-containing layer may be a porous layer provided on a current collector, and including a negative electrode active material, an electro-conductive agent, and a binder.

A porosity of a negative electrode (except for a current collector) is desirably in a range of 20 to 50%. Consequently, it is possible to obtain a high-density negative electrode excellent in affinity with an electrolyte. A more preferable range of the porosity is 25 to 40%.

Examples of the electro-conductive agent include carbon materials, such as acetylene black, carbon black, coke, carbon fibers, or graphite, and metal powders such as nickel or zinc. One or plural kinds of electro-conductive agents may be used. Since hydrogen is generated from a carbon material, it is desirable to use a metal powder as an electro-conductive agent. When zinc particles are used in an additive element, since the zinc particles serve as an electro-conductive agent, another electro-conductive agent is not required. The zinc particles further serve as a negative electrode active material. Thus, when the zinc particles are used in the additive element, hydrogen generation is suppressed, and a high capacity negative electrode excellent in electron conductivity can be achieved.

Examples of the binder include polytetrafluoroethylene (PTFE), fluororubbers, styrene butadiene rubbers, and core/shell binder. One or plural kinds of binders may be used.

The mixing ratio of the negative electrode active material, the electro-conductive agent, and the binder is preferably set in the range of 80% by weight to 95% by weight for the negative electrode active material, 3% by weight to 18% by weight for the electro-conductive agent, and 2% by weight to 7% by weight for the binder.

The negative electrode is produced by, for example, suspending the negative electrode active material, the electro-conductive agent, and the binder in an appropriate solvent, applying the suspended matter on a current collector, drying, and pressing the current collector by, for example, heat-pressing.

3) Positive Electrode

The positive electrode has a positive electrode current collector and a positive electrode active material-containing layer provided on one side or both sides of the current collector and including an active material, an electro-conductive agent, and a binder.

As the positive electrode active material, a positive electrode active material capable of allowing Li to be inserted and extracted may be used. Examples of the positive electrode active material include lithium manganese composite oxide, lithium nickel composite oxide, lithium cobalt aluminum composite oxide, lithium nickel cobalt manganese composite oxide, spinel-type lithium manganese nickel composite oxide, lithium manganese cobalt composite oxide, lithium iron oxide, lithium fluorinated iron sulfate, and a phosphate compound having an olivine crystal structure (such as $Li_xFePO_4$ ($0 \leq x \leq 1$) and $Li_xMnPO_4$ ($0 \leq x \leq 1$)). The phosphate compound having an olivine crystal structure is excellent in heat stability.

Examples of a positive electrode active material capable of obtaining a high positive electrode potential include lithium manganese composite oxides such as $LiMn_2O_4$ ($0<x \leq 1$) and $Li_xMnO_2$ ($0<x \leq 1$), lithium nickel aluminum composite oxides such as $Li_xNi_{1-y}Al_yO2$ ($0<x \leq 1$, $0<y \leq 1$), lithium cobalt composite oxides such as $Li_xCoO_2$ ($0<x \leq 1$), lithium nickel cobalt composite oxides such as $Li_xNi_{1-y-z}Co_yMn_zO_2$ ($0<x \leq 1$, $0<y \leq 1$, $0 \leq z \leq 1$), lithium manganese cobalt composite oxides such as $Li_xMn_yCo_{1-y}O_2$ ($0<x \leq 1$, $0<y \leq 1$), spinel-type lithium manganese nickel composite oxides such as $Li_xMn_{2-y}Ni_yO_4$ ($0<x \leq 1$, $0<y<2$), lithium phosphorus oxides having an olivine crystal structure, such as $Li_xFePO_4$ ($0<x \leq 1$), $Li_xFe_{1-y}Mn_yPO_4$ ($0<x \leq 1$, $0 \leq y \leq 1$) and $Li_xCoPO_4$ ($0<x \leq 1$), and fluorinated iron sulfate (such as $Li_xFeSO_4F$ ($0<x \leq 1$)).

According to lithium nickel aluminum composite oxides, lithium nickel cobalt manganese composite oxides, and lithium manganese cobalt composite oxides, reaction with an electrolyte under a high temperature environment can be suppressed, so that a battery life can be significantly increased. Composite oxide represented by $Li_xNi_{1-y-z}Co_yMn_zO_2$ ($0 \leq x \leq 1.1$, $0 \leq y \leq 0.5$, and $0 \leq z \leq 0.5$, more preferably $0<x \leq 1.1$, $0<y \leq 0.5$, and $0<z \leq 0.5$) is advantageous for a high temperature durability life.

Particles of a positive electrode active material may include independent primary particles, secondary particles as agglomerates of primary particles, or both the independent primary particles and the secondary particles.

An average particle size (average particle diameter) of primary particles of the positive electrode active material is preferably not more than 1 µm and more preferably 0.05 to 0.5 µm. It is preferable that at least a portion of surfaces of the particles of the positive electrode active material is covered with a carbon material. The carbon material may take the form of a layer structure, a particle structure, or an aggregate of particles.

When the positive electrode active material particles take the form where the secondary particles and the independent primary particles are mixed, the average particle size of the positive electrode active material particles is preferably not less than 0.8 µm and not more than 15 µm.

As a positive electrode current collector, a foil, a porous body, or a mesh is preferably used. Examples of electrically conductive materials contained in the positive electrode current collector include aluminum alloy, and metals such as nickel, stainless steel, iron, copper, or aluminum.

Examples of an electro-conductive agent used for enhancing electron conductivity and suppressing contact resistance with a current collector include acetylene black, carbon black, graphite, and carbon fiber having an average fiber diameter of not more than 1 µm. One or plural kinds of electro-conductive agents may be used.

Examples of a binder for binding an active material and the electro-conductive agent include polytetrafluoroethylene (PTFE), polyvinylidene fluoride (PVdF), and fluororubbers. One or plural kinds of binders may be used.

The mixing ratio of the positive electrode active material, the electro-conductive agent, and the binder is preferably set in the range of not less than 80% by weight and not more than 95% by weight for the positive electrode active material, not less than 3% by weight and not more than 18% by weight for the electro-conductive agent, and not less than 2% by weight and not more than 7% by weight for the binder. When the mixing ratio of the electro-conductive agent is not less than 3% by weight, the above effect can be exercised, and when the mixing ratio of the electro-conductive agent is not more than 18% by weight, decomposition of an electrolyte on a surface of the electro-conductive agent under high temperature preservation can be reduced. When the mixing ration of the binder is not less than 2% by weight, sufficient electrode strength is obtained, and when the mixing ration of the binder is not more than 7% by weight, an insulating portion of an electrode can be decreased.

The positive electrode is produced by, for example, suspending the positive electrode active material, the electro-conductive agent, and the binder in an appropriate solvent, applying the suspended matter on a positive electrode current collector, drying, and pressing the current collector. A positive electrode pressing pressure is preferably in the range of 0.15 ton/mm to 0.3 ton/mm. If the positive electrode pressing pressure is in this range, it is preferable because adhesion (i.e., peel strength) between the positive electrode active material-containing layer and the positive electrode current collector is enhanced, and, at the same time, the elongation percentage of the positive electrode current collector is not more than 20%.

4) Separator

A separator may be disposed between a positive electrode and a negative electrode. Examples of the separator include nonwoven fabrics, films, and paper. Examples of materials contained in the separator include polyolefin, such as polyethylene or polypropylene, and cellulose. Preferable examples of the separator include nonwoven fabrics containing cellulose fibers and porous films containing polyolefin fibers. The porosity of the separator is preferably not less than 60%. A fiber diameter is preferably not more than 10 µm. When the fiber diameter is not more than 10 µm, an affinity with an electrolyte of the separator is enhanced, so that battery resistance can be reduced. A more preferable range of the fiber diameter is not more than 3 µm. In a cellulose fiber containing nonwoven fabric having a porosity of not less than 60%, impregnation of an electrolyte is good, and high output performance can be exhibited from low temperature to high temperature. The separator does not react with a negative electrode in long term storage after charging, float charging, and over-charge, and a short-circuit between the negative electrode and a positive electrode due to dendrite precipitation of lithium metal does not occur. A more preferable range is 62% to 80%.

It is preferable that the separator has a thickness of not less than 20 µm and not more than 100 µm and a density of not less than 0.2 g/cm$^3$ and not more than 0.9 g/cm$^3$. If the thickness and the density of the separator are in these ranges, mechanical strength and a reduction in battery resistance can be balanced, so that a high output secondary battery in which an internal short-circuit is suppressed can be provided. Heat shrinkage of the separator under a high temperature environment is small, and good high temperature storage performance can be exhibited.

5) Container

As a container containing a positive electrode, a negative electrode, and an electrolyte, a metal container, a laminate film container, or a resin container, such as a polyethylene container or a polypropylene container, may be used.

As the metal container, a rectangular or cylindrical metal can made of nickel, iron, stainless steel, or the like may be used.

Each plate thickness of the resin container and the metal container is preferably not more than 1 mm and more preferably not more than 0.5 mm. A more preferable range is not more than 0.3 mm. The lower limit value of the plate thickness is desirably 0.05 mm.

Examples of laminate films include a multilayer film in which a metal layer is covered with a resin layer. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) may be used. A preferable range of a thickness of the laminate film is not more than 0.5 mm. A more preferable range is not more than 0.2 mm. The lower limit value of the thickness of the laminate film is desirably 0.01 mm.

The secondary battery according to the embodiments is applicable to secondary batteries in various forms such as a rectangular form, a cylindrical form, a flat form, a thin form, or a coin form. The secondary battery according to the embodiments is preferably a secondary battery having a bipolar structure. Consequently, it is advantageous in terms of enabling production of a plural of series cells as one cell.

An example of the secondary battery according to the embodiments will be described with reference to FIGS. 1 to 4.

FIGS. 1 and 2 show an example of a secondary battery using a metal container.

An electrode group 1 is stored in a rectangular cylindrical metal container 2. The electrode group 1 has a structure in which a positive electrode 3 and a negative electrode 4 are spirally wound to provide a flat shape while a separator 5 is interposed between the positive electrode 3 and the negative electrode 4. An electrolyte (not shown) is held by the electrode group 1. As shown in FIG. 2, belt-like positive electrode leads 6 are electrically connected to a plural of portions of an end of the positive electrode 3 located on an end surface of the electrode group 1. On the other hand, belt-like negative electrode leads 7 are electrically connected to a plural of portions of an end of the negative electrode 4 located on the end surface of the electrode group 1. The positive electrode leads 6 are bundled to be electrically connected to a positive electrode conductive tab 8. A positive electrode terminal is constituted of the positive electrode leads 6 and the positive electrode conductive tab 8. The negative electrode leads 7 are bundled to be electrically connected to a negative electrode conductive tab 9. A negative electrode terminal is constituted of the negative electrode leads 7 and the negative electrode conductive tab 9. A metal sealing plate 10 is fixed to an opening of the metal container 2 by welding or the like. The positive electrode conductive tab 8 and the negative electrode conductive tab 9 are drawn to the outside through a take-out hole formed in the sealing plate 10. An inner peripheral surface of each take-out hole of the sealing plate 10 is covered with an insulating member 11 in order to avoid a short-circuit due to contact between the positive electrode conductive tab 8 and the negative electrode conductive tab 9.

Figure 3:
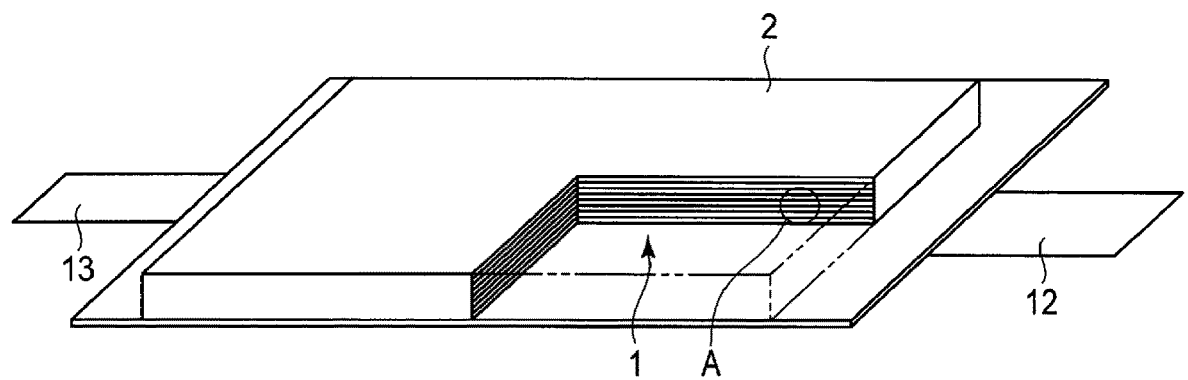
FIG. 3 is a partially cutout perspective view of the secondary battery of the embodiment.
Figure 4:
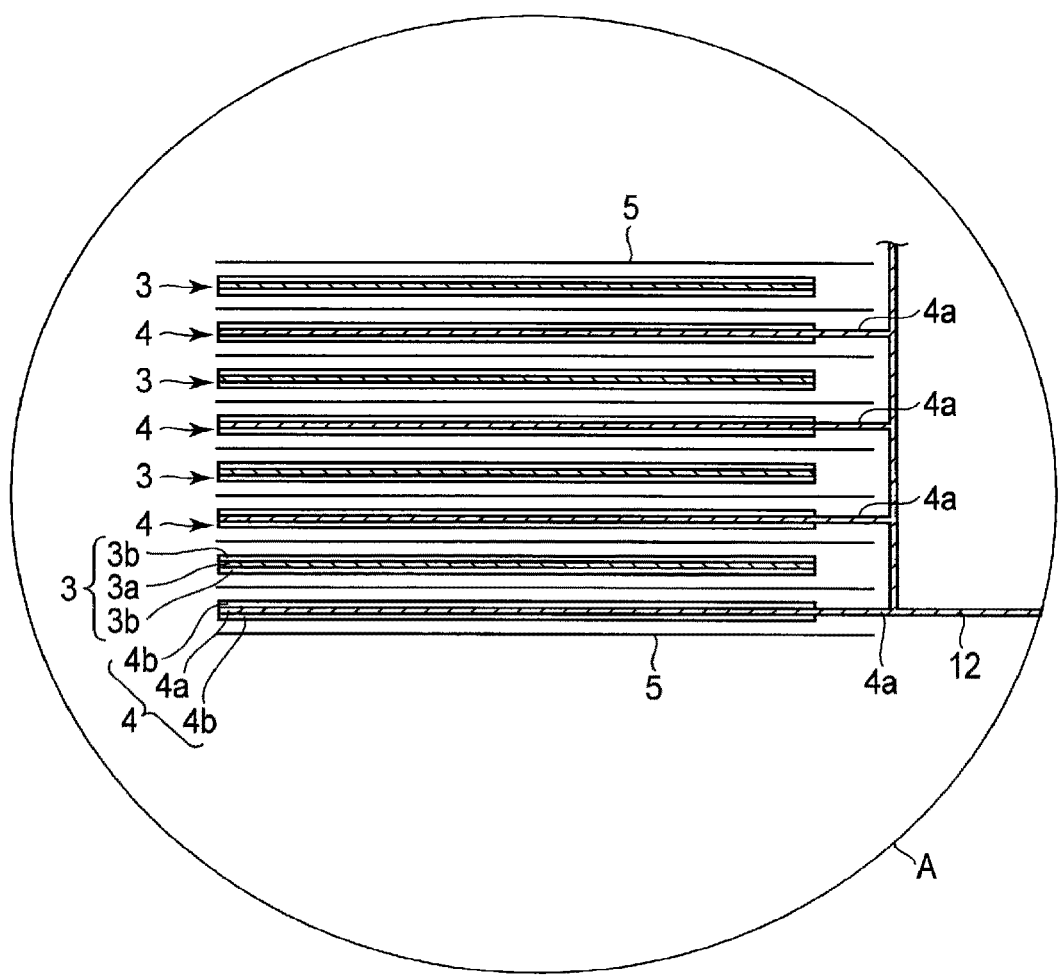
FIG. 4 is an enlarged cross-sectional view of an A portion of FIG. 3.

FIGS. 3 and 4 show an example of a secondary battery using a container member made of a laminate film.

The laminate type electrode group 1 is stored in a bag-like container 2 made from a laminate film in which a metal layer is interposed between two resin films. The laminate type electrode group 1 has a structure in which the positive electrode 3 and the negative electrode 4 are alternately stacked with the separator 5 being interposed therebetween as shown in FIG. 4. There are a plural of the positive electrodes 3, and each of which includes a current collector 3a and a positive electrode active material-containing layer 3b which is provided on both surfaces of the current collector 3a. There are a plural of the negative electrodes 4, and each of which includes a current collector 4a and a negative electrode active material-containing layer 4b which is provided on both surfaces of the current collector 4a. One side of the current collector 4a of each of the negative electrodes 4 is projected from the positive electrode 3. The projected current collector 4a is electrically connected to a belt-like negative electrode terminal 12. A leading end of the belt-like negative electrode terminal 12 is drawn to the outside from the container 2. Further, although not shown, as for the positive electrode 3, a side of the current collector 3a is projected from the negative electrode 4 and positioned at an opposite side of the projected side of the current collector 4a. The current collector 3a projected from the negative electrode 4 is electrically connected to a belt-like positive electrode terminal 13. A leading end of the belt-like positive electrode terminal 13 is positioned at an opposite side of the negative electrode terminal 12 and is drawn to the outside from one side of the container 2.

The secondary battery shown in FIGS. 1 to 4 may include a safety valve for releasing hydrogen gas, generated in the container, to the outside. The safety valve to be used may be of the return type, in which the safety valve operates when the internal pressure exceeds a set value and the safety valve functions as a sealing plug when the internal pressure is reduced, or the non-return type, in which once the safety valve operates, the function as a sealing plug is not restored. Although the secondary battery shown in FIGS. 1 to 4 is of a sealed type, when the secondary battery is provided with a circulation system for returning hydrogen gas to water, the secondary battery may be an open system.

According to the first embodiment, hydrogen generation is suppressed and the lithium ions can be efficiently inserted and extracted by the negative electrode since the secondary battery includes the negative electrode, containing titanium-containing oxide and at least one kind of element selected from the group consisting of B, P, Al, La, Zr, Ge, Zn, Sn, Ga, Pb, In, Bi, and TI, and the electrolyte containing lithium ions and a solvent containing water. As a result, the cycle life performance, the storage performance, and the large current discharge performance of the secondary battery including an aqueous electrolyte can be enhanced.

Second Embodiment

According to a second embodiment, a battery module in which a secondary battery is a unit cell can be provided. The secondary battery of the first embodiment may be used as the secondary battery of the second embodiment.

Examples of the battery module include a battery module including, as a structural unit, a plural of unit cells electrically connected in series or parallel and a battery module including a unit constituted of a plural of unit cells electrically connected in series or a unit constituted of a plural of unit cells electrically connected in parallel.

The battery module may be contained in a housing. As the housing, a metal can made of aluminum alloy, iron, stainless steel, or the like or a plastic container may be used, for example. A plate thickness of the container is desirably not less than 0.5 mm.

Examples of an embodiment in which a plural of secondary batteries are electrically connected in series or parallel include an embodiment in which a plural of secondary batteries each provided with a container are electrically connected in series or parallel and an embodiment in which a plural of electrode groups contained in a common housing are electrically connected in series or parallel. As a specific example of the former embodiment, positive electrode terminals and negative electrode terminals of a plural of secondary batteries are connected by a metal bus bar (made of aluminum, nickel, or copper, for example). As a specific example of the latter embodiment, a plural of electrode groups in a state of being electrochemically insulated by bulkheads are contained in one housing, and these electrode groups are electrically connected in series. When the number of batteries electrically connected in series is in the range of 5 to 7, voltage compatibility with a lead storage battery is improved. In order to further improve the voltage compatibility with the lead storage battery, it is preferable that five or six unit cells are connected in series.

Figure 5:
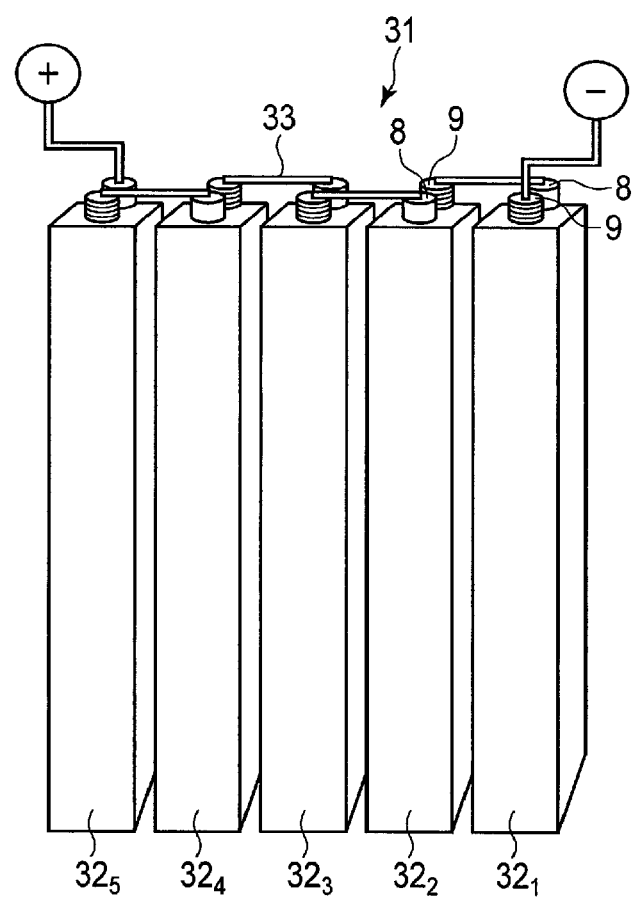
FIG. 5 is a perspective view of an example of a battery module of the embodiment.

An example of the battery module will be described with reference to FIG. 5. A battery module 31 shown in FIG. 5 is provided with, as unit cells, rectangular secondary batteries (for example, FIGS. 1 and 2) $32_1$ to $32_5$ according to the first embodiment. The positive electrode conductive tab 8 of the battery $32_1$ and the negative electrode conductive tab 9 of the battery $32_2$ located adjacent thereto are electrically connected by a lead 33. Further, the positive electrode conductive tab 8 of the battery $32_2$ and the negative electrode conductive tab 9 of the battery $32_3$ located adjacent thereto are electrically connected by the lead 33. As described above, the batteries $32_1$ to $32_5$ are connected in series.

Since the battery module of the second embodiment includes the secondary battery of the first embodiment, a battery module excellent in cycle life performance, storage performance, and large current discharge performance can be achieved. The secondary battery of the first embodiment is excellent in compatibility with a lead storage battery. Thus, a battery module in which five secondary batteries are connected in series can be used as an alternative to a lead storage battery for power supply.

Third Embodiment

According to the third embodiment, it is possible to provide a battery pack including at least one secondary battery of the first embodiment and a circuit portion for controlling charge/discharge of the secondary battery. When a battery pack includes a plural of secondary batteries, the battery module of the second embodiment may be used in the battery pack.

In a battery pack, a circuit portion may be connected to a secondary battery before being installed in a vehicle such as an automobile or an electronic device; however, the battery pack of the embodiment includes a battery pack in which a circuit portion of a vehicle such as an automobile is connected to a secondary battery.

An example of a battery pack will be described with reference to FIG. 6. A battery pack 40 includes a battery module including a secondary battery shown in FIGS. 3 and 4. The battery pack 40 includes a housing 41 and a battery module 42 contained in the housing 41. In the battery module 42, a plural of (for example, five) secondary batteries $43_1$ to $43_5$ are electrically connected in series. The secondary batteries $43_1$ to $43_5$ are stacked in a thickness direction. The housing 41 has openings 44 in the upper portion and four side surfaces. The side surface from which positive and negative electrode terminals 13 and 12 of the secondary batteries $43_1$ to $43_5$ are projected is exposed to the openings 44 of the housing 41. A positive electrode terminal 45 for output of the battery module 42 has a belt shape, one end is electrically connected to the positive electrode terminal 13 of any of the secondary batteries $43_1$ to $43_5$, and the other end is projected from the upper portion of the housing 41 while being projected through the opening 44 of the housing 41. On the other hand, a negative electrode terminal 46 for output of the battery module 42 has a belt shape, one end is electrically connected to the negative electrode terminal 12 of any of the secondary batteries $43_1$ to $43_5$, and the other end is projected from the upper portion of the housing 41 while being projected through the opening 44 of the housing 41.

Figure 8:
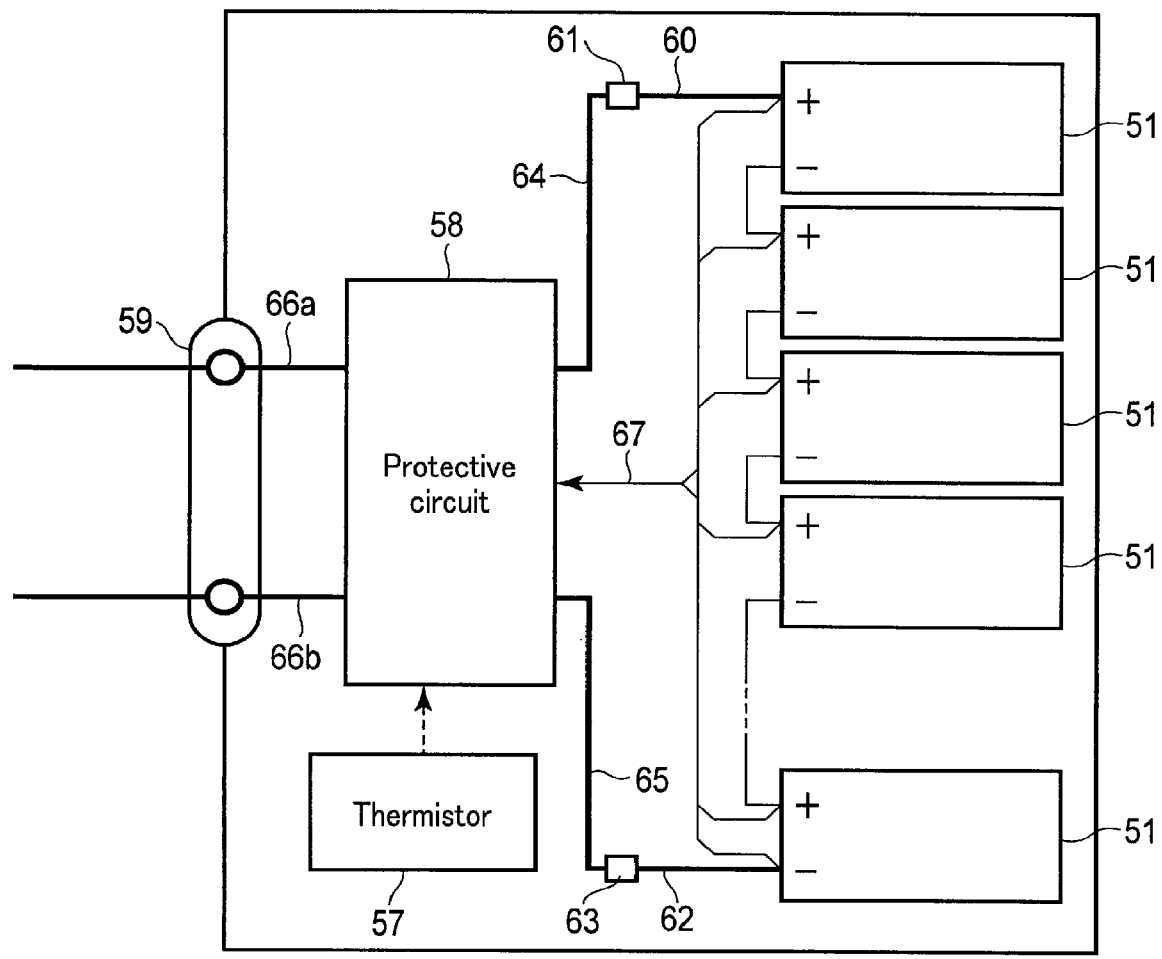
FIG. 8 is a block diagram showing an electric circuit of the battery pack of FIG. 7.

Another example of a battery pack will be described in detail with reference to FIGS. 7 and 8. A plural of unit cells 51 constituted of flat-type secondary batteries are stacked such that a negative electrode terminal 52 and a positive electrode terminal 53 extending outward are arranged in the same direction, and they are fastened with an adhesive tape 54 to form a battery module 55. Those unit cells 51 are electrically connected to each other in series as shown in FIG. 8.

A printed wiring board 56 is disposed facing side surfaces of the unit cells 51 from which the negative electrode terminal 52 and the positive electrode terminal 53 extend. As shown in FIG. 8, a thermistor 57, a protective circuit 58, and a terminal 59 for passing current to external devices are installed on the printed wiring board 56. An insulating plate (not shown) is attached to a surface of the printed wiring board 56 facing the battery module 55, in order to avoid unnecessary connect with wirings of the battery module 55.

A positive electrode lead 60 is connected to the positive electrode terminal 53 positioned in the undermost layer of the battery module 55, and its tip is inserted into a positive electrode connector 61 of the printed wiring board 56 to electrically connect it. A negative electrode lead 62 is connected to the negative electrode terminal 52 positioned in the uppermost layer of the battery module 55, and its tip is inserted into a negative electrode connector 63 of the printed wiring board 56 to electrically connect it. Those connectors 61 and 63 are connected to the protective circuit 58 through wirings 64 and 65 formed on the printed wiring board 56.

The thermistor 57 detects a temperature of the unit cell 51, and the detection signal thereof is transmitted to the protective circuit 58. The protective circuit 58 can interrupt a plus wiring 66a and a minus wiring 66b between the protective circuit 58 and the terminal 59 for passing current to external devices under a predetermined condition. The predetermined condition may include, for example, a condition in which the detection temperature of the thermistor 57 is more than a predetermined temperature. Also, the predetermined condition may include a condition in which over-charge, over-discharge, and overcurrent of the unit cell 51 are detected. Each of the unit cells 51 and the battery module 55 are subjected to the detection of the over-charge and the like. When each of the unit cells 51 is detected, a battery voltage may be detected, or a positive electrode potential or a negative electrode potential may be detected. In the latter case, a lithium electrode used as a reference electrode is inserted into each of the unit cells 51. In the cases of FIG. 7 and FIG. 8, wirings 67 are connected to each of the unit cells 51 for voltage detection, and detection signals are transmitted to the protective circuit 58 through these wirings 67.

A rubber or resin protective sheet 68 is disposed on each of three side surfaces of the battery module 55 except for the side surface from which the positive electrode terminal 53 and the negative electrode terminal 52 are projected.

The battery module 55 is stored in a housing container 69 together with the protective sheets 68 and the printed wiring board 56. In other words, the protective sheets 68 are arranged on both of inner surfaces in a long side direction of the housing container 69 and one inner surface in a short side direction of the housing container 69, and the printed wiring board 56 is disposed on the other inner surface in a short side direction. The battery module 55 is positioned in a space surrounded by the protective sheets 68 and the printed wiring board 56. A lid 70 is attached to a top face of the housing container 69.

For fixing the battery module 55, a thermally-shrinkable tape may be used instead of the adhesive tape 54. In that case, after protective sheets are arranged at both of side faces of a battery module, it is surrounded by a thermally-shrinkable tape, and then the thermally-shrinkable tape is thermally shrunk to bind the battery module.

In FIGS. 7 and 8, although an embodiment in which the unit cells 51 are connected in series is described, they may be connected in parallel, for increasing a battery capacity. Battery packs may be connected in series or in parallel.

The embodiments of the battery pack may be appropriately altered depending on the application thereof. The application of the battery pack may include applications in which charging/discharging at high current is desired. Specific examples of the applications include power sources for digital cameras, a stationary battery, and vehicle-installed batteries for two- or four-wheel hybrid electric vehicles, two- or four-wheel electric vehicles, motor-assisted bicycles, and a railway car. Vehicle-installed batteries are particularly preferred.

Since the battery pack of the third embodiment which has been described above includes the secondary battery of the first embodiment, a battery pack excellent in cycle life performance, storage performance, and large current discharge performance can be achieved. Thus, according to the embodiment, it is possible to provide a battery module and a battery pack suitable as an alternative power supply to a lead battery used as a starter power supply for a vehicle or as a vehicle-installed secondary battery to be installed in a hybrid car.

Fourth Embodiment

When an electrolytic solution including an aqueous solvent is used in view of safety, it is difficult to obtain a battery voltage of about 3 to 4 V, which is obtained in a nonaqueous lithium ion battery (a nonaqueous electrolyte battery). When the aqueous solvent is used, it is necessary to use a negative electrode material having a relatively high operating potential such as $LiV_2O_4$ or $LiTi_2(PO_4)_3$, in order to avoid hydrogen generation due to electrolysis on the negative electrode. Consequently, the battery voltage of the aqueous lithium ion battery reaches only about 2 V, and the energy density is lower than that of the nonaqueous lithium ion battery.

When a negative electrode material having a low operating potential such as $Li_4Ti_5O_{12}$ is used in order to increase the battery voltage of the aqueous lithium ion battery, the hydrogen generation on the negative electrode becomes significant, and not only does the safety become reduced, but also, the battery characteristics may be reduced due to the generated hydrogen.

Hereinafter, embodiments will be described with reference to the drawings.

The lithium secondary battery according to embodiments includes a positive electrode, a negative electrode, and an electrolytic solution. The negative electrode includes a current collector and a negative electrode active material including titanium-containing oxide. At least one of the current collector and the negative electrode active material has on at least a portion of its surface a covering layer including at least one kind of element selected from the group consisting of Zn, In, Sn, Pb, Hg, Cu, Cd, Ag, and Bi. The electrolytic solution includes an aqueous solvent and an electrolyte.

In a lithium ion secondary battery using an aqueous solvent, a current collector (negative electrode current collector) and an active material (negative electrode active material) within the negative electrode may serve as a reaction field for hydrogen generation. When the negative electrode includes an electro-conductive agent (negative electrode electro-conductive agent), hydrogen may also be generated in the negative electrode electro-conductive agent. According to the above constitution, for each of the current collector and/or particles of the active material serving as the reaction field for hydrogen generation at the negative electrode, hydrogen generation can be suppressed by disposing a film (covering layer) with low catalyzing activity on at least a portion of the surface. When the negative electrode includes the electro-conductive agent, hydrogen generation can be suppressed by disposing a film with low catalyzing activity on a portion of a surface of the particles of the electro-conductive agent.

With regard to a nonaqueous electrolyte battery using a nonaqueous solvent such as an organic solvent, as a solvent of an electrolytic solution, rather than an aqueous solvent, there have been reported examples aiming to obtain effects different from suppression of hydrogen generation, in which a covering layer including, for example, zinc (Zn) or copper (Cu) is formed on a surface of negative electrode active material particles. For example, when an alloy-based material such as a silicon-based material or a tin-based material is used as an active material, a shape change such as volume expansion of the active material accompanying charge and discharge and fracturing of the active material accompanying the shape change can be suppressed by covering a surface of the active material with a layer of a metal material. In addition, production of lithium salt on the surface of the active material that may cause short-circuiting can be suppressed.

As described above, in the negative electrode included in the lithium ion secondary battery using the aqueous solvent, not only the negative electrode active material but also both the negative electrode current collector and the negative electrode electro-conductive agent may serve as reaction fields for hydrogen generation. Thus, in embodiments, it is preferable that the above-described covering layer is disposed both on surfaces of the negative electrode active material and the negative electrode current collector. When the negative electrode electro-conductive agent is included, it is preferable that each of the negative electrode active material, the negative electrode current collector, and the negative electrode electro-conductive agent has a covering layer formed on at least a portion of the surface. Thus, electrolysis of water at each reaction field can be suppressed by the covering layer. It is a matter of course that, in an nonaqueous battery including no aqueous solvent, the water electrolysis is not required to be paid attention to, and attention may be paid to side reaction between an active material and a nonaqueous electrolyte.

According to embodiments, since the water electrolysis at the negative electrode can be suppressed, even when a battery using an electrolytic solution, including an aqueous solvent, and a negative electrode active material operating at low potential is operated, hydrogen generation can be suppressed. As a result, since self-discharge in a lithium ion secondary battery can be suppressed, charge-and-discharge efficiency and charge-and-discharge cycle life of the battery can be enhanced. Accordingly, according to the configuration of the embodiment, safety is enhanced by using an aqueous solvent in an electrolytic solution, and, at the same time, a lithium secondary battery exhibiting excellent charge-and-discharge efficiency and cycle life can be achieved.

Hereinafter, each feature of the lithium secondary battery according to embodiments will be described.

1) Negative Electrode

A negative electrode includes a current collector (negative electrode current collector) and a negative electrode mixed-materials layer (negative electrode active material-containing layer) including a negative electrode active material.

The current collector may include at least one kind of metal selected from the group consisting of aluminum, copper, zinc, nickel, titanium, and iron. Among them, the current collector preferably includes zinc with high hydrogen overvoltage. The current collector may include one of those metals, or include two or more kinds of those metals. For example, alloy such as stainless steel may be used. The current collector may be a substrate including those metals, for example. The substrate as the current collector is, for example, a metal foil formed of those metals. Further, the substrate as the current collector is, for example, a foil formed of alloy including those metals.

Examples of the shape of the current collector include a mesh shape and a porous shape in addition to a foil shape. In order to enhance energy density and output, the shape of a foil having a small volume and a large surface area is preferable.

It is preferable that a film such as a carbon-containing film, a polymer film, and an oxide film is formed on at least a portion of a surface of a current collector. If such a film exists on the surface of the current collector, an effect of further suppressing hydrogen generation can be expected. Further, such a film can cover a substrate including the above-described metals in the current collector, for example.

The negative electrode active material includes a titanium-containing oxide. Examples of the titanium-containing oxide may include an oxide of titanium, a lithium-titanium oxide, a niobium-titanium oxide, and a sodium-niobiumtitanium oxide. The Li insertion potential of the titanium-containing oxide is desirably in a range of 1 V (vs. Li/Li$^+$) to 3 V (vs. Li/Li$^+$). The negative electrode active material may include one of the titanium-containing oxides, or include two or more of the titanium-containing oxides.

Examples of the oxide of titanium may include an oxide of titanium having a monoclinic structure, an oxide of titanium having a rutile structure, and an oxide of titanium having an anatase structure. For the oxide of titanium having each crystal structure, the composition before charging can be represented by $TiO_2$, and the composition after charging can be represented by $Li_xTiO_2$, wherein x is $0 \leq x \leq 1$. The structure before charging for the oxide of titanium having the monoclinic structure can be represented by $Ti_2$ (B).

Examples of the lithium-titanium oxide include a lithium-titanium oxide having a spinel structure (for example, the general formula: $Li_{4+x}Ti_5O_{12}$ wherein x is $-1 \leq x \leq 3$), a lithium-titanium oxide having a ramsdellite structure (for example, $Li_{2+x}Ti_3O_7$ wherein $-1 \leq x \leq 3$), $Li_{1+x}Ti_2O_4$ wherein $0 \leq x \leq 1$, $Li_{1.1+x}Ti_{1.8}O_4$ wherein $0 \leq x \leq 1$, $Li_{1.07+x}Ti_{1.86}O_4$ wherein $0 \leq x \leq 1$, and $Li_xTiO_2$ wherein $0 < x \leq 1$), and the like.

The lithium-titanium oxide includes, for example, a lithium-titanium composite oxide in which a dopant is introduced into the above lithium-titanium oxide having the spinel structure or the ramsdellite structure.

Examples of the niobium-titanium oxide include oxides represented by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, and M is at least one element selected from the group consisting of Fe, V, Mo, and Ta) and the general formula $Ti_{1-x}M_{x+y}Nb_{2-y}O_{7-\gamma}$ ($0 \leq x \leq 1$, $0 \leq y < 1$, and M includes at least one selected from the group consisting of Mg, Fe Ni, Co W, Ta and Mo).

Examples of the sodium-niobium-titanium oxide include an orthorhombic Na-including niobium-titanium-composite oxide represented by the general formula $Li_{2+v}Na_{2-w}M1_xTi_{6-y-z}Nb_yM2_zO_{14+\delta}$ ($0 \leq v \leq 4$, $0 < w < 2$, $0 \leq x < 2$, $0 < y < 6$, $0 \leq z < 3$, $y+z < 6$, $-0.5 \leq \delta \leq 0.5$, M1 includes at least one element selected from the group consisting of Cs, K, Sr, Ba, and Ca, and M2 includes at least one element selected from Zr, Sn, V, Ta, Mo, W, Fe, Co, Mn, and Al).

The negative electrode active material is included in the negative electrode material layer, for example, in the form of particles. The negative electrode active material particle may be singular primary particles, secondary particles in which each of the secondary particles include aggregated primary particles, or a mixture of singular primary particles and secondary particles. The shape of the particles is not particularly limited and, for example, may be a spherical shape, an elliptic shape, a flat shape, a fiber shape, or the like.

The negative electrode mixed-materials layer can be disposed on one surface or both of reverse surfaces of the negative electrode current collector. The negative electrode mixed-materials layer may further include an electro-conductive agent and a binder, in addition to the negative electrode active material.

Examples of the electro-conductive agent may include carbonaceous substances such as acetylene black, carbon black, graphite, carbon nanofiber, and carbon nanotube. The carbonaceous substances may be used alone or as a mixture of plural carbonaceous substances. The electro-conductive agent may be included in the negative electrode material layer in the form of particles.

The binder binds the active material, the electro-conductive agent, and the current collector. Examples of the binder may include polytetrafluoroethylene (PTFE), polyvinylidene fluoride (PVdF), fluororubber, an acrylic resin, and cellulose such as carboxymethyl cellulose.

With respect to the mixing ratio of the negative electrode active material, the electro-conductive agent, and the binder in the negative electrode mixed-materials layer, it is preferable that the proportion of the negative electrode active material is within a range of 30% by weight to 96% by weight, the proportion of the negative electrode electro-conductive agent is within a range of 2% by weight to 60% by weight, and the proportion of the binder is within a range of 2% by weight to 30% by weight. When the proportion of the electro-conductive agent is less than 2% by weight, the current collecting performance of the negative electrode mixed-materials layer is reduced, and consequently, the high current performance of the battery may be reduced. When the proportion of the binder is less than 2% by weight, the binding between the negative electrode mixed-materials layer and the negative electrode current collector is reduced, and consequently, the cycle performance may be reduced. On the other hand, from the perspective of obtaining a high capacity, the electro-conductive agent and the binder are preferably included in proportions of 60% by weight or less and 30% by weight or less, respectively.

In the embodiments, at least one of the negative electrode current collector, the negative electrode active material, and the electro-conductive agent has, on at least a portion of the surface, a covering layer including at least one kind selected from the group consisting of Zn, In, Sn, Pb, Hg, Cu, Cd, Ag, and Bi. Among them, a covering layer including one or more kinds of Zn, In, Sn, Pb, and Hg is preferable from the viewpoint of suppressing electrolysis of water.

The covering layer has a thickness (layer thickness) of 2 nm or more to 5 μm or less, for example. If the thickness of the covering layer is 100 nm or less, good Li diffusibility can be maintained in voids existing in an electrode or on an active material surface, and therefore, it is preferable. The covering layer may be a film having a film thickness in the above range and formed on the surface of the negative electrode current collector, and/or the negative electrode active material, and/or the electro-conductive agent.

The covering layer may include a metal phase formed of at least one kind of element selected from the group consisting of Zn, In, Sn, Pb, Hg, Cu, Cd, Ag, and Bi. The covering layer may further include an alloy phase including those elements. The covering layer may furthermore include oxide phases and/or hydroxide phases of those elements. The entire covering layer may be constituted of any one of those phases, or two or more phases may be mixed in the covering layer. Since the catalytic activity of an oxide is low with respect to a hydrogen generation reaction, it is more preferable that the covering layer includes the oxide phase.

The covering layer may cover the entire surface of each of the negative electrode current collector, the negative electrode active material particles, and electro-conductive agent particles or may partially cover each of them. Even in a case where the covering layers are scattered on each surface, rather than covering the entire surface, an effect of suppressing a side reaction of hydrogen generation can be expected. For each of the negative electrode current collector, the negative electrode active material particles, and electro-conductive agent particles, the cover ratio of the surface area by the covering layer is preferably 10% or more to 100% or less. Each cover ratio is more preferably 60% or more. For each of them, it is more preferable that the entire surface is uniformly covered.

From the viewpoint of suppressing self-discharge, among the negative electrode current collector, the negative electrode active material particles, and electro-conductive agent particles, it is most effective that the negative electrode active material particles include a covering layer. In the case where the negative electrode active material does not include a covering layer on the surface, when charging a battery, an oxidation-reduction reaction may occur between an aqueous solvent and the active material. Due to this oxidation-reduction reaction, electrons are accepted and donated within the battery without passing through an external circuit. Due to this, the active material is discharged. When the active material particles include a covering layer, self-discharge can be effectively suppressed.

In addition to the negative electrode active material particles, it is more preferable that the negative electrode current collector and the electro-conductive agent particles each include a covering layer on the surface. This is, as described above, because during charging, electrolysis of water occurs on a surface of a member having electric conductivity, such as a current collector and an electro-conductive agent. When a covering layer is disposed on each surface of those members, the side reaction can be effectively suppressed.

The covering layer may be formed by applying electrodeposition to a negative electrode produced by, for example, a method described later. The electrodeposition may be applied to a negative electrode alone by using a plating bath, or may be applied to a negative electrode incorporated into a battery by using a reaction of an additive included in an electrolytic solution, for example. In either case, the covering is applied by applying current at a predetermined potential or less at which a constituent element precipitates in a solution having the constituent element of a covering layer dissolved therein.

When a covering layer is formed using a plating bath, plating treatment is applied to a negative electrode under the following conditions, for example, whereby plating including a zinc metal phase is formed on each surface of a negative electrode current collector, a negative electrode active material, and an electro-conductive agent in the negative electrode.

$ZnCl_2$: 30 to 100 g/L
Zn: 15 to 50 g/L
$NH_4Cl$: 100 to 150 g/L
pH: 4.5 to 6.0
Bath Temperature: 20 to 35° C.
Current Density: 1 to 10 A/dm$^2$ Here, although the example in which a covering layer including zinc is formed is shown as a specific example, conditions of a plating bath used for plating treatment, treatment conditions, and so on can be suitably changed according to the composition of a covering layer to be formed. It is preferable from the viewpoint of uniform electrodeposition that additives such as citric acid, saccharin, and polyvinyl alcohol are added to the plating bath. When those additives are added, unevenness of electrodeposition can be suppressed, and a uniform covering layer can be obtained.

It is preferable from the viewpoint of simplifying processes that a compound including a constituent element (one or more selected from the group consisting of Zn, In, Sn, Pb, Hg, Cu, Cd, Ag, and Bi, etc.) is added to an electrolytic solution, whereby a covering layer is formed making use of a current during charging of a battery. For example, when a chloride or a sulfate of the above constituent element is added to an electrolytic solution at a ratio of 1 mM or more to 100 mM or less, a covering layer can be formed by charge and discharge in a potential range in which a negative electrode of an oxide of titanium is operated. When a metal formed of an element that becomes a constituent element of a covering layer is included in a current collector, a covering layer can be formed using elution of the element from the current collector and reprecipitation of the element.

In a case of using the negative electrode active material whose potential is relatively low, having a potential of an insertion and extraction reaction of lithium of less than −1.0 V (vs. SCE) and more preferably −1.1 V or less (vs. SCE), as described above, when charge and discharge are performed in the operating potential range of the negative electrode active material, a potential significantly lower than −0.76 V, which is an oxidation-reduction equilibrium potential of zinc, can be applied to a negative electrode, for example. Thus, by virtue of the use of the negative electrode active material in which the insertion/extraction potential of Li is low, as described above, the formation of a covering layer by electrodeposition can be achieved by usual charge and discharge. On the other hand, in the case of using a compound such as a vanadium-based active material, in which the potential of the insertion and desorption reaction of Li is −1.0 V or more (vs. SCE), as a negative electrode active material, even if charge and discharge are performed in the operating range, a covering layer cannot be formed.

By virtue of the use of the electrodeposition as described above, a covering layer can be formed on a surface of each of a negative electrode active material, a negative electrode current collector, and an electro-conductive agent.

When a covering layer is formed respectively on the surface of each of the negative electrode active material, the negative electrode current collector, and the electro-conductive agent, one example is a process in which each member is respectively mixed by a wet process with a compound including the constituent element of the covering layer, and baked. As a specific example, a case where a film of zinc oxide is formed on a lithium titanate powder as a negative electrode active material is shown as follows. As a matter of course, materials to be used, conditions, and so on can be suitably changed according to an active material used in a negative electrode, a composition of a covering layer, a member to be covered, the form of the member, and so on.

First, a lithium titanate powder is immersed in a zinc sulfate aqueous solution of 0.1 M, and while stirring, a sodium carbonate aqueous solution of 0.1 M is added-in dropwise. A precipitate of a mixture of a white basic zinc carbonate and the lithium titanate powder thus obtained is washed with water and subsequently dried. After that, the washed mixed powder is baked at a temperature of approximately 140° C. to 350° C. Thereby, a powder of lithium titanate whose surface is covered with zinc oxide can be produced. Each surface of electro-conductive agent particles and a current collector can be covered by a similar method.

A film may be formed by a mechanochemical method with respect to each member. For example, a powder of zinc and lithium titanate particles are put into a ball mill and mixed with acetone, ethanol, and the like as dispersion media. Thereby, a zinc film is formed on a lithium titanate surface by physical pressure. This method can also be applied to electro-conductive agent particles. Here, although the method of forming a covering layer including zinc with respect to the particles of lithium titanate as a negative electrode active material has been described as a specific example, materials to be used, conditions, and so on can be suitably changed according to an active material used in a negative electrode, the composition of the covering layer, a member to be covered, the form of the member, and so on.

The negative electrode can be produced, for example, by the following method. First, the negative electrode active material, the electro-conductive agent, and the binder are suspended in a solvent to prepare a slurry. The slurry is coated onto one surface or both of reverse surfaces of the negative electrode current collector. The coat applied onto the negative electrode current collector is dried to form a negative electrode mixed-materials layer. After that, the negative electrode current collector and the negative electrode mixed-materials layer formed thereon are subjected to pressing. Alternatively, the negative electrode active material, the electro-conductive agent, and the binder may be formed into pellets, and used as the negative electrode mixed-materials layer.

When the negative electrode is thus produced, a negative electrode active material, an electro-conductive agent, and a negative electrode current collector each formed with a covering layer, for example, by the above-described method may be used. Alternatively, after the negative electrode is produced using those members without covering layer, a covering layer may be formed on the obtained negative electrode, by the above-described method.

<Analysis of Covering Layer>

The composition and thickness (layer thickness) of a covering layer can be analyzed by observation using a scanning transmission electron microscope (STEM), for example. As one example of STEM, HD2300A manufactured by Hitachi High-Technologies Corporation can be used. The thickness of the covering layer is measured at an acceleration voltage of 200 kV, for example, and can be quantified from a difference in image contrast between a target member including the covering layer (current collector, active material particles, or electro-conductive agent particles) and the covering layer. The composition of the covering layer is measured at an acceleration voltage of 200 kV, for example, and can be quantified by energy dispersive X-ray spectrometry (EDS) analysis. When measurement is performed by STEM, a measurement sample (each member including a covering layer) is first made into thin pieces having a thickness of 0.1 μm by focused ion beam (FIB) processing, and in order to protect the outermost surface, a C film and a W film are formed. A sample thus processed is observed at an observation magnification of 200,000 times. At this time, a difference in composition between a covering layer and a member (current collector, active material particles, or electro-conductive agent particles) is obtained as an image contrast, and the thickness of the covering layer can be quantified. The composition of the covering layer can be analyzed by EDS. For example, when the covering layer has a large thickness of 100 nm or more, a similar observation is performed by suitably adjusting the magnification according to a state of measurement target such that observation is easily performed.

The cover ratio of a covering layer on a surface of each member can be quantified by EDS analysis. The cover ratio in a current collector is quantified from an abundance ratio between a current collector (for example, metal constituting a foil) and the constituent elements of the covering layer. Similarly, the cover ratio of an electro-conductive agent is quantified from an abundance ratio between the electro-conductive agent (for example, a carbonaceous material) and the covering layer, and the cover ratio of an active material is quantified from an abundance ratio between the constituent elements of the active material and the constituent elements of the covering layer.

2) Positive Electrode

The positive electrode may include a positive electrode current collector and a positive electrode mixed-materials layer (positive electrode active material-including layer). The positive electrode mixed-materials layer may be formed on one surface or both of reverse surfaces of the positive electrode current collector. The positive electrode mixed-materials layer may include a positive electrode active material, and optionally an electro-conductive agent and a binder.

As the positive electrode active material, for example, compounds capable of having lithium inserted and extracted may be used. The positive electrode active material may include, for example, a lithium-manganese composite oxide, a lithium-nickel composite oxide, a lithium-cobalt-aluminum composite oxide, a lithium-nickel-cobalt-manganese composite oxide, a spinel-type lithium-manganese-nickel composite oxide, a lithium-manganese-cobalt composite oxide, a lithium iron oxide, a lithium fluorinated iron sulfate, a phosphate compound having an olivine crystal structure (for example, $Li_xFePO_4$ wherein $0 \leq x \leq 1$, or $Li_xMnPO_4$ wherein $0 \leq x \leq 1$), and the like. The phosphate compound having the olivine crystal structure has excellent thermal stability.

Examples of the positive electrode active material with which a high positive electrode potential can be obtained are described below. Examples include lithium-manganese composite oxides such as $Li_xMn_2O_4$ ($0<x \leq 1$), or $Li_xMnO_2$ ($0<x \leq 1$); a lithium-nickel-aluminum composite oxide such as $Li_xNi_{1-y}Al_yO_2$ ($0<x \leq 1$ and $0<y \leq 1$); lithium-cobalt-composite oxides such as $Li_xCoO_2$ ($0<x \leq 1$); lithium-nickel-cobalt composite oxides such as $Li_xNi_{1-y-z}Co_yMn_zO_2$ ($0<x \leq 1$, $0<y \leq 1$, and $0 \leq z \leq 1$); lithium-manganese-cobalt composite oxides such as $Li_xMn_yCo_{1-y}O_2$ ($0<x \leq 1$ and $0<y \leq 1$); spinel-type lithium-manganese-nickel composite oxides such as $Li_xMn_{2-y}Ni_yO_4$ ($0<x \leq 1$ and $0<y<2$); lithium-phosphorus oxides having an olivine structure such as $Li_xFePO_4$ ($0<x \leq 1$), $Li_xFe_{1-y}Mn_yPO_4$ ($0<x \leq 1$ and $0 \leq y \leq 1$), or $Li_xCoPO_4$ ($0<x \leq 1$); fluorinated iron sulfates (such as $Li_xFeSO_4F$ wherein ($0<x \leq 1$)).

One kind of the positive electrode active materials may be used alone, or two or more kinds may be used. The positive electrode active material preferably includes at least one compound selected from the group consisting of $LiFePO_4$, $LiMn_2O_4$, and $LiCoO_2$, among the compounds described above. When these materials are used, the oxidative decomposition of the aqueous solvent can be suppressed because the operating potential does not become too high.

The electro-conductive agent, which may be included in the positive electrode mixed-materials layer, includes the same electro-conductive agent as those that may be included in the negative electrode mixed-materials layer. Examples of the electro-conductive agent, accordingly, include carbonaceous substances such as acetylene black, carbon black, graphite, carbon nanofiber and carbon nanotube. The carbonaceous substances may be used alone or as a mixture of plural carbonaceous substances.

The binder binds the active material, the electro-conductive agent, and the current collector in the positive electrode mixed-materials layer, in a similar manner as with the negative electrode mixed-materials layer. The binder, which may be included in the positive electrode mixed-materials layer, includes the same binder as those that may be included in the negative electrode mixed-materials layer. Examples of the binder, accordingly, include polytetrafluoroethylene (PTFE), polyvinylidene fluoride (PVdF), fluororubber, an acrylic resin, cellulose such as carboxymethyl cellulose, and the like.

With respect to the mixing ratio of the positive electrode active material, the electro-conductive agent, and the binder in the positive electrode mixed-materials layer, it is preferable that the proportion of the positive electrode active material is within a range of 30% by weight to 95% by weight, the proportion of the electro-conductive agent is within a range of 3% by weight to 60% by weight, and the proportion of the binder is within a range of 2% by weight to 30% by weight. When the mixing ratio of the electro-conductive agent is 3% by weight or more, the electric conductivity of the positive electrode can be secured. When the mixing ratio of the electro-conductive agent is 18% by weight or less, the decomposition of the electrolytic solution on the surface of the electro-conductive agent during storage at a high temperature can be reduced. When the mixing ratio of the binder is 2% by weight or more, sufficient electrode strength can be obtained. When the mixing ratio of the binder is 30% by weight or less, the mixed amount of the binder, which is an insulating material, within the positive electrode is decreased, thus the internal resistance can be decreased.

In the positive electrode current collector, as in the negative electrode current collector, a film such as a carbon-containing film, a polymer film, and an oxide film may be formed. When the positive electrode current collector includes such a film, corrosion of the positive electrode current collector due to an aqueous solvent in an electrolytic solution can be suppressed, and thus it is preferable.

The positive electrode may be produced by the following method. First the positive electrode active material, the electro-conductive agent, and the binder are dispersed in a solvent to prepare a slurry. Then, the slurry is coated onto one surface or both of reverse surfaces of the positive electrode current collector. The coat applied onto the positive electrode current collector is dried to form the positive electrode mixed-materials layer. After that, the positive electrode current collector and the positive electrode mixed-materials layer formed thereon are pressed. Alternatively, the positive electrode active material, the electro-conductive agent, and the binder may be formed into pellets, and used as the positive electrode mixed-materials layer.

3) Electrolytic Solution

An electrolytic solution includes an aqueous solvent and an electrolyte. The electrolytic solution includes at least one kind of anion selected from the group consisting of $NO_3^-$, $Cl^-$, $LiSO_4^-$, $SO_4^{2-}$, $OH^-$, $TFSI^-$ {bis(trifluoromethanesulfonyl)imide ion; $[N(SO_2CF_3)_2]^-$}, $FSI^-$ {lithium bis(fluorosulfonyl)imide ion; $[N(SO_2F)_2]^-$}, and $BOB^-$ {bisoxalate borate ion; $[B(C_2O_4)_2]^-$}. One of these anions may be included in the electrolytic solution, or two or more of these anions may be included.

As an aqueous solvent, a solution including water can be used. Here, the solution including water may be pure water or a mixed solution or a mixed solvent of water and materials other than water.

As an electrolyte, a second electrolyte that dissociates when dissolved in an aqueous solvent to generate the anions may be used. In particular, lithium salt that dissociates into Li ions and the anions is preferable. Examples of such lithium salt include $LiNO_3$, $LiCl$, $Li_2SO_4$, $LiOH$, $LiTFSI$ [lithium bis(trifluoromethanesulfonyl)imide; $LiN(SO_2CF_3)_2$], $LiFSI$ [lithium bis(fluorosulfonyl)imide; $LiN(SO_2F)_2$], and $LiBOB$ [lithium bisoxalate borate; $LiB(C_2O_4)_2$].

Lithium salt that dissociates into Li ions and the anions has a relatively high solubility in an aqueous solvent. Thus, it is possible to obtain an electrolytic solution in which the anions have a high concentration of 1 M to 10 M and the Li ion diffusion is good.

An electrolytic solution including $NO_3^-$ and/or $Cl^-$ can be used in a wide anion concentration range of approximately from 0.1 M to 10 M for each of $NO_3^-$ and $Cl^-$. It is preferable from the viewpoint of ion conductivity that the anions have a high concentration of from 3 M to 9 M. It is more preferable that the anion concentration of the electrolytic solution including $NO_3^-$ and $Cl^-$ is from 8 M to 9 M.

An electrolytic solution including $LiSO_4^-$ and/or $SO_4^{2-}$ can be used in the anion concentration range of approximately from 0.05 M to 2.5 M for each of $LiSO_4^-$ and $SO_4^{2-}$. It is preferable from the viewpoint of ion conductivity that the anions have a high concentration of from 1.5 M to 2.5 M.

It is desirable that the $OH^-$ concentration in an electrolytic solution is from $10^{-14}$ M to 0.1 M.

An electrolytic solution including $BOB^-$ can be used in the anion concentration range of approximately from 0.1 M to 5 M. However, since $BOB^-$ is hydrolyzed, some are present as oxalate ions in the electrolytic solution. Considering stability and solubility after decomposition, the anion concentration is preferably from 0.1 M to 1.0 M.

An electrolytic solution including $TFSI^-$ and/or $FSI^-$ can be used in the anion concentration range of approximately from 0.1 M to 21 M for each of $TFSI^-$ and $FSI^-$. It is preferable from the viewpoint of suppressing a side reaction that the anions have a concentration of from 15 M to 21 M.

The electrolytic solution may include an additive, as a raw material used when a covering layer included in a negative electrode is formed by the above-described electrodeposition according to charge and discharge of a battery. As the additive, a chloride, sulfate, or nitrate, including at least one selected from the group consisting of Zn, In, Sn, Pb, Hg, Cu, Cd, Ag, and Bi may be included. Particularly, it is preferable from the viewpoint of suppressing electrolysis of water that a covering layer is formed using an additive including at least one selected from the group consisting of Zn, In, Pb, and Hg having a high hydrogen overvoltage. The concentration of the above additive is preferably 2 mM or more to 50 mM or less. The concentration of the additive is more preferably 5 mM or more. If the concentration is 2 mM or more, the formation of a covering layer by charge and discharge is promoted. If the concentration is 50 mM or less, excessive electrodeposition can be suppressed.

From the viewpoint of stabilizing formation of a surface film by electrodeposition, saccharin, citric acid, boric acid, polyethylene glycol, and the like may be added to an electrolytic solution. Due to adsorption of their molecules to a surface of the target onto which a covering layer is to be formed (negative electrode current collector and/or negative electrode active material particles and/or electro-conductive agent particles), or an interface complex formation reaction with metal ions of an element that becomes the constituent element of the covering layer, an effect of suppressing excessive covering layer formation reaction can be expected.

The pH of an electrolytic solution is preferably 0 or more and 13 or less. If pH is less than 0, since the electrolytic solution is strongly acidic, decomposition of an active material and degradation of a current collector tend to progress. If pH is more than 13, since oxygen generation overvoltage in a positive electrode is reduced, electrolysis of an aqueous solvent tends to progress.

A solute, that is, an electrolyte in an electrolytic solution can be qualitatively detected and quantified by an ion chromatography method, for example. Since the sensitivity of the ion chromatography method is high, the ion chromatography method is particularly preferable as an analytical method.

Examples of specific measuring conditions of qualitative and quantitative analysis of a solute, included in an electrolytic solution, using the ion chromatography method are shown as follows:

System: Prominence HIC-SP
Analysis column: Shim-pack IC-SA3
Guard column: Shim-pack IC-SA3(G)
Eluent: 3.6 mmol/L sodium carbonate aqueous solution
Flow rate: 0.8 mL/min
Column temperature: 45° C.
Injection amount: 50 μL
Detection: electrical conductivity 4) Electrode Terminal The electrode terminal may include, for example, an external terminal and an internal terminal. The external terminal is, for example, an electrode lead. Alternatively, an electrically conductive container member such as a metal can may be used as the external terminal, as described below. The internal terminal includes, for example, an electrode tab. The shape of the internal terminal is not particularly limited, and may include, for example, a belt shape, a disk shape, a washer shape, a spiral shape, a corrugated plate shape, and the like.

The electrode terminal is preferably formed from at least one metal selected from the group consisting of aluminum, zinc, titanium, and iron, or from an alloy thereof. Examples of the alloy include aluminum alloy or stainless steel. As the material for the internal terminal, a metal capable of suppressing the electrolysis of the aqueous solvent is desirable. For example, it is preferable that the positive electrode internal terminal is made of titanium, and the negative electrode internal terminal is made of zinc.

The internal terminal may get into contact with the electrolytic solution inside the battery. For that reason, it is desirable that the surface of the internal terminal is protected with an insulating resin, thereby suppressing the electrolysis of the aqueous solvent. As the insulating resin, for example, a polymer material such as polypropylene (PP), polyethylene (PE), nylon, and polyethylene terephthalate (PET) may be used.

The electrode terminal is used for electrically connecting, for example, an external circuit to the inside of the battery through the electrode terminal. By connecting the external circuit to the electrode terminal, supplying of electric current to the external circuit becomes possible. Alternatively, in the case where plural batteries are electrically connected in series or in parallel, the electrode terminals are electrically connected among the plural batteries.

5) Separator

As the separator, for example, a porous film or a synthetic resin non-woven fabric may be used which is formed from a material such as polyethylene (PE), polypropylene (PP), cellulose, glass fiber, or polyvinylidene fluoride (PVdF). Of these, cellulose is preferable because of its excellent ability to hold liquids and Li diffusibility.

6) Gasket

As the gasket, for example, a polymer material such as polypropylene (PP), polyethylene (PE), nylon, polyethylene terephthalate (PET), or polyimide may be used. By using the polymer material as the gasket, not only can the air-tightness of the battery interior be improved, but also, short-circuiting between the positive electrode and the negative electrode can be prevented.

7) Container Member

As the container member, a bag-shaped container made of a laminate film or a metal container may be used. The shape of the container member may include, for example, a flat-type, a square-type, a cylindrical-type, a coin-type, a button-type, a sheet-type, a laminate-type, and the like. Of course, any appropriate container member can be used depending on the use of the lithium secondary battery. For example, when the lithium secondary battery is loaded on a portable electronic device, a container member for a small-sized battery can be used. When the lithium secondary battery is loaded on vehicles such as two-wheel to four-wheel automobiles, a container member for a large scale battery can be used.

As the laminate film, for example, a multilayer film which includes resin layers and a metal layer disposed between the resin layers may be used. The metal layer is preferably an aluminum foil or aluminum alloy foil in order to reduce the weight. As the resin layer, for example, a polymer material such as polypropylene (PP), polyethylene (PE), nylon, or polyethylene terephthalate (PET) may be used. The laminate film can be sealed and formed into a shape of the container member. The laminate film has preferably a thickness of 0.5 mm or less, more preferably 0.2 mm or less.

The metal container is preferably formed from, for example, at least one metal selected from the group consisting of aluminum, zinc, titanium, and iron, or an alloy of the metal. Specific examples of the alloy include aluminum alloy and stainless steel. The metal container preferably has a wall thickness of 0.5 mm or less, more preferably 0.2 mm or less.

When the metal container is used as the container member, the metal container can also be used as the electrode terminal (the external terminal).

Examples of the lithium secondary battery according to the embodiment is explained below, with reference to FIG. 9 to FIG. 11.

FIG. 9 shows one example of a lithium secondary battery using a coin-type metal container.

As shown in FIG. 9, a coin-type lithium secondary battery has a structure in which a negative electrode 106, a separator 105, a gasket 108, a positive electrode 102, a spacer 104, a washer 103, and a positive electrode can 101 are sequentially stacked in a negative electrode can 107. In the negative electrode can 107, an electrolytic solution (not shown) is housed. The electrolytic solution may be housed within the lithium secondary battery in a state in which the negative electrode 106, the separator 105 and/or the positive electrode 102 are impregnated with the electrolytic solution. The electrolytic solution can also be housed within the lithium secondary battery in a state in which the solution is filled in a space within the battery.

Here, the negative electrode 106 is, for example, a disk-shaped negative electrode obtained by punching a negative electrode, produced as described above, into a round shape. The positive electrode 102 is, for example, a disk-shaped positive electrode obtained by punching a positive electrode, produced as described above, into a round shape.

The spacer 104 and the washer 103 function as a positive electrode internal terminal to secure the electrical conductivity between the positive electrode 102 and the positive electrode can 101. When the washer 103 is a waved washer, as shown in the drawing, the contact between the washer 103 and the spacer 104 or the positive electrode can 101 can be made more definite, and the electrical conductivity can be further secured. In FIG. 9, the spacer 104 and the washer 103 (the waved washer) are shown as the positive electrode internal terminal of the coin-type lithium secondary battery, but the positive electrode internal terminal may be a single member or plural members in greater number, and the shape thereof is not limited to that shown in the drawing.

The negative electrode can 107 is a metal can serving as a container member for the coin-type lithium secondary battery, and also functions as the negative electrode terminal (the external terminal). Similarly, the positive electrode can 101 is a metal can serving as a container member, and also functions as the positive electrode terminal (the external terminal). The center part of the positive electrode can 101 is open in order to release gas generated within the battery (not shown). During production of the coin-type lithium secondary battery, the electrolytic solution can be put into the positive electrode can 101 through the opening. By adjusting the amount of electrolytic solution when putting the electrolytic solution in, the leakage of the electrolytic solution to the outside of the battery can be prevented. For example, if the amount of the electrolytic solution put in is adjusted to about 100 μl, the electrolytic solution may become impregnated in the negative electrode 106, the separator 105, and the positive electrode 102 as described above, and the solution may be held there. The leakage of the electrolytic solution can also be prevented, for example, by using a thick separator 105 having a thickness of about 0.1 to 0.5 μm.

Figure 11:
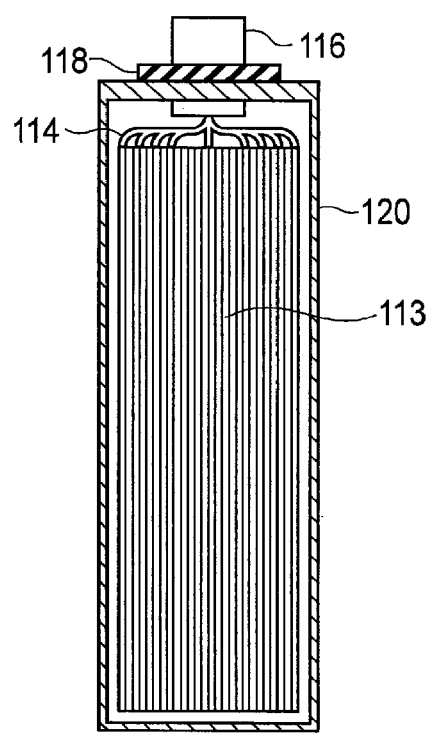
FIG. 11 is a schematic cross-sectional view of a side surface of the square-type secondary battery in FIG. 10.

One example of a lithium secondary battery using a square-type metal container is shown in FIG. 10 and FIG. 11.

The electrode group 113 is housed in a rectangular-tube-shaped metal container 120. The electrode group 113 has, for example, a structure where plural positive electrodes 110, negative electrodes 111, and separators 112 are stacked in order of the positive electrode 110, the separator 112, the negative electrode 111 and the separator 112. Alternatively, the electrode group 113 may also have a structure in which the positive electrode 110, the negative electrode 111, and the separator 112 disposed therebetween are spirally wound in a manner such that a flat shape is obtained. Regardless of the structure of the electrode group 113, it is desirable that the separator 112 is disposed as the outermost layer of the electrode group 113 in order to avoid contact between the electrodes and the metal container 120. The electrode group 113 holds the electrolytic solution (not shown).

As shown in FIG. 11, a belt-shaped positive electrode tab 114 is electrically connected to each of plural positions on the edge of the positive electrode 110 located on the end surface of the electrode group 113. Although not shown, a belt-shaped negative electrode tab 115 is electrically connected to each of plural positions on the edge of the negative electrode 111 located on the end surface. The plural positive electrode tabs 114 are bundled into one, and electrically connected to a positive electrode conductive lead 116. The positive electrode tabs 114 (the positive electrode internal terminals) and the positive electrode conductive lead 116 (the positive electrode external terminal) compose the positive electrode terminal. The negative electrode tabs 115 are bundled into one, and connected to a negative electrode conductive lead 117. The negative electrode tabs 115 (the negative electrode internal terminals) and the negative electrode conductive lead 117 (the negative electrode external terminal) compose the negative electrode terminal.

A metal sealing plate 121 is fixed over an opening of the metal container 120 by welding or the like. The positive electrode conductive lead 116 and the negative electrode conductive lead 117 are respectively drawn out from outlets, which are provided on the sealing plate 121, to the outside.

A positive electrode gasket 118 and a negative electrode gasket 119 are respectively disposed on the inner circumferential surface of each outlet of the sealing plate 121, in order to avoid short-circuiting due to contact of the sealing plate 121 with the positive electrode conductive lead 116 and the negative electrode conductive lead 117. Furthermore, by disposing the positive electrode gasket 118 and the negative electrode gasket 119, the air-tightness of the square-type lithium secondary battery can be maintained.

A control valve 122 (a safety valve) is disposed on the seal plate 121. When the internal pressure within the battery is increased due to gas generation caused by the electrolysis of the aqueous solvent, the generated gas can be released to the outside through the control valve 122. As the control valve 122, for example, a return type control valve, which operates when an internal pressure becomes higher than a predetermined value and functions as a sealing plug when the internal pressure is reduced, may be used. Alternatively, a non-return type control valve, which does not recover its function as the sealing plug once it is operated, may also be used. In FIG. 10, the control valve 122 is disposed at the center of the sealing plate 121, but the control valve 122 may be located at the end of the sealing plate 121. The control valve 122 may be omitted.

According to the fourth embodiment described above, there can be provided a lithium secondary battery that has high safety because an electrolytic solution including an aqueous solvent is used, and excellent in charge-and-discharge efficiency and charge-and-discharge cycle life because self-discharge is suppressed.

Fifth Embodiment

According to a fifth embodiment, a battery module including a lithium secondary battery as a unit cell is provided. As the lithium secondary battery, a lithium secondary battery of the fourth embodiment may be used.

Examples of the battery module include a battery module including unit cells as structural units, each being electrically connected to each other in series or in parallel, a battery module including a unit structured by plural unit cells that are electrically connected in series or a unit structured by plural unit cells that are electrically connected in parallel, and the like.

The battery module may be housed in a housing. As the housing, a metal can formed of aluminum alloy, iron, stainless steel, or the like, or a plastic container, or the like may be used. The container desirably has a wall thickness of 0.5 mm or more.

Examples of the aspect in which the plural lithium secondary batteries are electrically connected in series or in parallel include an aspect in which the plural secondary batteries each has a container and are electrically connected in series or in parallel, and an aspect in which plural electrode groups are housed in the same housing and are electrically connected in series or in parallel. Specific examples of the former are those in which positive electrode terminals and negative electrode terminals of plural lithium secondary batteries are connected via metal bus bars (for example, aluminum, nickel, or copper). Specific examples of the latter include an aspect in which plural electrode groups are housed in one housing in a state of being electrochemically insulated from each other by partitions, and these electrode groups are electrically connected to each other in series. When 5 to 7 batteries are electrically connected in series, for example, a battery module having good voltage compatibility with a lead storage battery can be obtained. In order to further increase the voltage compatibility with the lead storage battery, a structure in which 5 or 6 unit cells are connected in series is preferable.

One example of the battery module is explained with reference to FIG. 12.

A battery module 131, shown in FIG. 12, includes plural square-type secondary batteries $132_1$ to $132_5$ according to the fourth embodiment (for example, FIG. 10 and FIG. 11) as unit cells. A positive electrode lead 116 of battery $132_1$ and a negative electrode lead 117 of battery $132_2$ positioned adjacent thereto, are electrically connected through a bus-bar 133. Further, a positive electrode lead 116 of the battery $132_2$ and a negative electrode lead 117 of battery $132_3$ positioned adjacent thereto, are electrically connected through a bus-bar 133. In this manner, the batteries $132_1$ to $132_5$ are connected in series.

According to the battery module of the fifth embodiment, by including the lithium secondary battery according to the fourth embodiment, there can be provided a battery module having high safety that is excellent in charge-and-discharge efficiency and charge-and-discharge cycle life because self-discharge is suppressed. Furthermore, when 5 of the lithium secondary batteries according to the fourth embodiment are connected in series, excellent compatibility with a lead storage battery can be obtained. Therefore, the battery module, in which 5 lithium secondary batteries are connected in series, is capable of being used as a backup power source for a lead storage battery.

Sixth Embodiment

According to a sixth embodiment, a battery pack is provided. The battery pack includes the lithium secondary battery according to the fourth embodiment.

The battery pack according to the sixth embodiment may include one or more lithium secondary batteries (unit cells) according to the fourth embodiment described above. The plural lithium secondary batteries, which may be included in the battery pack according to the sixth embodiment, may be electrically connected to each other in series, in parallel or in a combination of in series and in parallel. The plural lithium secondary batteries may be electrically connected to compose a battery module. In the case of composing a battery module from plural secondary batteries, the battery module according to the fifth embodiment may be used.

The battery pack according to the sixth embodiment may further include a protective circuit. The protective circuit has a function of controlling the charge and discharge of the lithium secondary battery. Alternatively, a circuit included in equipment that uses the battery pack as a power source (for example, an electronic device, a vehicle such as an automobile, or the like) may be used as the protective circuit of the battery pack.

Moreover, the battery pack according to the sixth embodiment may further include an external power distribution terminal. The external power distribution terminal is configured to externally output current from the lithium secondary battery and/or to input current into a unit cell 51. In other words, when the battery pack is used as a power source, the current is externally provided through the external power distribution terminal. When the battery pack is charged, the charge current (including a regenerative energy of power of an automobile, or the like) is provided to the battery pack through the external power distribution terminal.

An example of the battery pack according to the sixth embodiment is explained with reference to FIG. 7 and FIG. 8. FIG. 7 is an exploded perspective view showing the battery pack according to the sixth embodiment. FIG. 8 is a block diagram showing an electric circuit of the battery pack in FIG. 7.

The battery pack shown in FIGS. 7 and 8 include plural unit cells 51. Each of the plural unit cells 51 may be the flat-type lithium secondary battery explained with reference to FIGS. 10 and 11.

Plural unit cells 51, i.e. flat-type secondary batteries, are stacked such that externally extending negative electrode terminals 52 and positive electrode terminals 53 are arranged in the same direction, and the resulting stack is fastened with an adhesive tape 54 to form a battery module 55. The unit cells 51 are electrically connected to each other in series, as shown in FIG. 8.

A printed wiring board 56 is disposed facing the side surfaces of the unit cells 51 from which the negative electrode terminals 52 and the positive electrode terminals 53 extend out. A thermistor 57, a protective circuit 58, and an external power distribution terminal 59 are installed on the printed wiring board 56, as shown in FIG. 8. An electric insulating plate (not shown) is attached to the surface of the printed wiring board 56 facing the battery module 55 to avoid unnecessary connection with wirings of the battery module 55.

A positive electrode lead 60 is connected to a positive electrode terminal 53 located at the lowermost layer of the battery module 55, and the distal end of the lead 60 is inserted into a positive electrode connector 61 on the printed wiring board 56 and thus electrically connected to the connector. A negative electrode lead 62 is connected to a negative electrode terminal 52 located at the uppermost layer of the battery module 55, and the distal end of the lead 62 is inserted into a negative electrode connector 63 on the printed wiring board 56 and thus electrically connected to the connector. The connectors 61 and 63 are connected to the protective circuit 58 through wirings 64 and 65 formed on the printed wiring board 56.

The thermistor 57 detects the temperature of the unit cell 51, and the detection signals are sent to the protective circuit 58. The protective circuit 58 can shut down a plus wiring 66a and a minus wiring 66b between the protective circuit 58 and the external power distribution terminal 59 under predetermined conditions. A predetermined condition is, for example, the case where the temperature detected by the thermistor 57 becomes a predetermined temperature or higher. Another example of the predetermined condition is the case when the over-charge, over-discharge or over-current of the unit cells 51 is detected. The detection of the over-charge, or the like, is performed for each individual unit cell 51 or for the battery module 55. When each individual unit cell 51 is detected, the battery voltage may be detected, or the positive electrode potential or negative electrode potential may be detected. In the latter case, a lithium electrode, which is used as a reference electrode, is inserted into each individual unit cell 51. In the case of FIG. 7 and FIG. 8, a wiring 67 for voltage detection is connected to each of the unit cells 51, and the detected signals are sent to the protective circuit 58 through the wirings 67.

Protective sheets 68, made of rubber or resin, are arranged on three side planes of the battery module 55 except for the side plane from which the positive electrode terminals 53 and the negative electrode terminals 52 protrude out.

The battery module 55 is housed in a housing container 69 together with the protective sheets 68 and the printed wiring board 56. That is, the protective sheets 68 are arranged on both internal surfaces in a long side direction and one internal surface in a short side direction of the housing container 69, and the printed wiring board 56 is disposed on the internal surface on the opposite side in the short side direction. The battery module 55 is located in a space surrounded by the protective sheets 68 and the printed wiring board 56. A lid 70 is attached to the upper surface of the housing container 69.

In order to fix the battery module 55, a heat-shrinkable tape may be used instead of the adhesive tape 54. In such a case, the battery module is fastened by placing the protective sheets on both side surfaces of the battery module, revolving the heat-shrinkable tape around the battery module, and thermally shrinking the heat-shrinkable tape.

In FIGS. 7 and 8, an aspect has been shown in which the unit cells 51 are connected in series; however, in order to increase the battery capacity, the cells may be connected in parallel. Alternatively, the connection in series and the connection in parallel may be combined. Assembled battery packs may be connected to each other in series or in parallel.

The aspect of the battery pack may be appropriately changed depending on the application thereof. The battery pack is preferably used in applications in which charge-and-discharge at large current is desired. Specifically the battery pack may be used, for example, as a power source of a digital camera, as a battery for installing in a vehicle such as a two- to four-wheeled hybrid electric automobile, a two- to four-wheeled electric automobile, a power-assisted bicycle, or a railway car, or as a stationary battery. In particular, the battery pack is suitably used for a battery installed in a vehicle.

In a vehicle into which the battery pack according to the sixth embodiment has been installed, the battery pack is configured, for example, to recover regenerative energy from power of the vehicle. Examples of the vehicle include two- to four-wheeled hybrid electric automobiles, two- to four-wheeled electric automobiles, electric assist bicycles, and railway cars such as electric trains.

Figure 13:
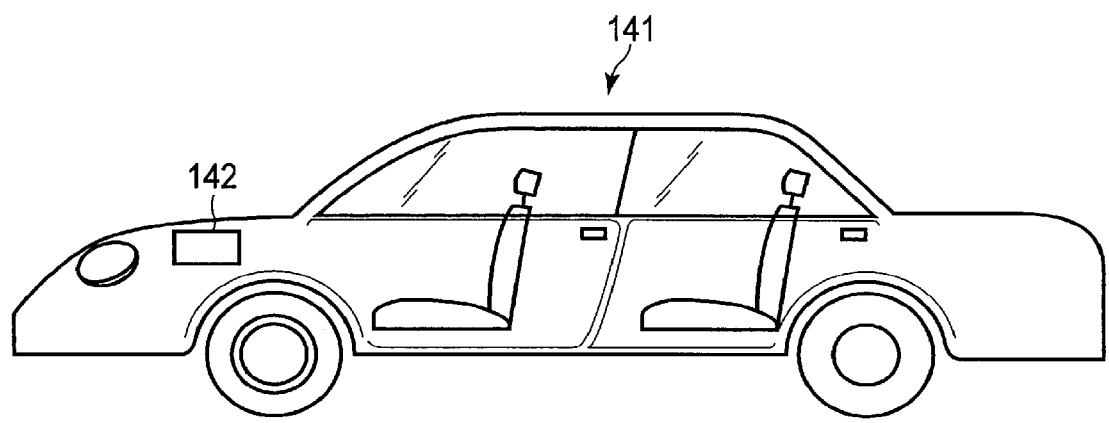
FIG. 13 is a schematic view of an example of a vehicle including a battery pack according to the embodiment.

FIG. 13 shows an example of an automobile that includes a battery pack according to the sixth embodiment.

The automobile 141 shown in FIG. 13 includes a battery pack 142, which is an example of the battery pack according to the sixth embodiment, installed in the engine compartment at the front of the vehicle body. The installing position is not limited to engine compartments. For example, the battery pack may also be installed in rear parts of the vehicle body of automobiles or under seats.

According to the sixth embodiment described above, by including the lithium secondary battery according to the fourth embodiment, there can be provided a battery pack having excellent safety that is excellent in charge-and-discharge efficiency and charge-and-discharge cycle life because self-discharge is suppressed. According to the embodiment, accordingly, it is possible to provide a battery pack that is favorable as an alternative power source in place of a lead battery, which is used as a power source of a starter for a vehicle, or as a secondary battery for installing in a hybrid car.

The electrolytes (first electrolytes) according to the first to third embodiments and the electrolytic solutions (electrolytic solutions each including the second electrolyte) according to the fourth to sixth embodiments may include both lithium ions and sodium ions.

In the first electrolyte and the electrolytic solution, water as a solvent is preferably contained in an amount of 1 mol or more relative to 1 mol of salt as a solute. In a more preferable embodiment, the amount of water as solvent is 3.5 mol or more relative to 1 mol of salt as a solute.

Whether the first electrolyte and the electrolytic solution include water can be examined by GC-MS (Gas Chromatography-Mass Spectrometry) measurement. Calculation of salt concentration and water content in the first electrolyte and the electrolytic solution, measurement can be performed by ICP (Inductively Coupled Plasma) emission analysis, for example. Specified amounts of the first electrolyte and the electrolytic solution are weighed out, and a concentration of included salt is calculated, whereby a molar concentration (mol/L) can be calculated. When the specific gravities of the first electrolyte and the electrolytic solution are measured, the number of moles of a solute and a solvent can be calculated.

As the separator in the secondary battery according to the first embodiment and the separator in the secondary battery according to the fourth embodiment, solid electrolytes may be used. As the solid electrolytes, oxides such as LATP ($Li_{1+x}Al_xTi_{2-x}(PO_4)_3$, where $0.1 \leq x \leq 0.4$) having a NASICON-type skeleton, amorphous LIPON ($Li_{2.9}PO_{3.3}N_{0.46}$), and garnet-type LLZ ($Li_7La_3Zr_2O_{12}$) are preferable. The respective features within the first to sixth embodiments may be replaced with or combined with features of other embodiments.

For example, a gel electrolyte included in the first electrolyte may be applied to an electrolytic solution.

As the covering member containing the additive element included in the first embodiment, a covering member having a layered shape, a covering member having a granular shape instead of or in combination with the layered shape, a covering member having a fibrous shape, or the like may be used. These forms may be applied to the covering layer included in the fourth embodiment.

The lithium salt that may be contained in the first electrolyte and the lithium salt that may be contained in the electrolytic solution of the third embodiment may be replaced or combined with each other.

In any configuration, an excellent battery performance can be obtained.

The applications of the first to six embodiments include batteries for stationary use and batteries for use in railway cars.

An aspect of a vehicle according to embodiments is explained below, with reference to FIG. 14.

FIG. 14 is a view schematically showing an aspect of a vehicle having the secondary battery according to the embodiments installed. A vehicle 300, shown in FIG. 14, is an electric automobile.

The vehicle 300, shown in FIG. 14, includes a vehicle power source 301, a vehicle ECU (electric control unit) 380, which is a master controller of the vehicle power source 301, an external terminal (an external power connection terminal) 370, an inverter 340, and a drive motor 345.

The vehicle 300 includes the vehicle power source 301, for example, in an engine compartment, in the rear sections of the automobile body, or under a seat. In FIG. 14, however, the position of the secondary battery installed in the vehicle 300 is schematically shown.

The vehicle power source 301 includes plural (for example, three) battery packs 312a, 312b and 312c, BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack.

Each of the battery modules 314a to 314c includes plural secondary batteries connected to each other in series. The plural secondary batteries are, for example, the secondary battery according to the first embodiment or the secondary battery according to the fourth embodiment. The battery modules 314a to 314c each perform charging and discharging through a positive electrode terminal 316 and a negative electrode terminal 317.

In order to collect information concerning security of the vehicle power source 301, the battery management unit 311 performs communication among the battery module monitoring units 313a to 313c and collects information such as voltages or temperatures of the secondary batteries of the battery modules 314a to 314c included in the vehicle power source 301.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each secondary battery that configure the battery modules 314a to 314c based on communications from the battery management unit 311. It is possible, however, to measure the temperatures only at several points per battery module and the temperatures of all of the secondary batteries need not be measured.

The power source for vehicle 301 may also have an electromagnetic contactor (for example, a switch unit 333 shown in FIG. 14) for switching connection between the positive electrode terminal and the negative electrode terminal. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near a switch element.

The inverter 340 converts an inputted direct current voltage to a three phase alternate current (AC) high voltage for driving a motor. The inverter 340 controls an output voltage based on control signals from the battery management unit 311 or the vehicle ECU 380, which controls the entire operation of the vehicle. A three phase output terminal of the inverter 340 is connected to each three phase input terminal of the drive motor 345.

The drive motor 345 is rotated by electric power supplied from the inverter 340, and transfers the rotation to an axle and driving wheels W, for example, through a differential gear unit.

Although not shown, the vehicle 300 also includes a regenerative brake mechanism, which rotates the drive motor 345 when the vehicle 300 is braked, and converts kinetic energy to regenerative energy, which is electric energy.

The regenerative energy, recovered in the regenerative brake mechanism, is inputted into the inverter 340 and converted to direct current. The direct current is inputted into the vehicle power source 301.

One terminal of a connecting line L1 is connected to the negative electrode terminal 317 of the vehicle power source 301. The connecting line L1 is connected through a current detector (not shown) in the battery management unit 311 to a negative electrode input terminal of the inverter 340.

One terminal of a connecting line L2 is connected through the switch unit 333 to the positive electrode terminal 316 of the vehicle power source 301. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the entire vehicle. Data transfer is performed between the battery management unit 311 and the vehicle ECU 380 through communication lines, concerning the security of the vehicle power source 301, such as a remaining capacity of the vehicle power source 301.

In the vehicle including the secondary battery according to the first embodiment, each of the battery packs 312a, 312b, and 312c are able to exhibit excellent large current discharge performance, cycle life performance, and storage performance. Thus, vehicle performance, safety and reliability can be secured.

In a vehicle including the secondary battery according to the fourth embodiment, each of the battery packs 312a, 312b, and 312c are able to exhibit excellent charge-and-discharge cycles, and has high safety. Thus, stability, reliability, and safety of the vehicle can be secured.

EXAMPLES

Hereinafter, although examples of the disclosure will be described in detail with reference to the drawings, the disclosure is not limited to the following examples.

Example 1

As a positive electrode active material, lithium manganese oxide ($LiMn_2O_4$) particles having a spinel structure were used. In the $LiMn_2O_4$ particles, primary particles and secondary particles were mixed, and an average particle size of the $LiMn_2O_4$ particles was 5 μm. 3% by weight of carbon fibers of vapor-phase growth serving as an electro-conductive agent and having a fiber diameter of 0.1 μm, based on a weight of the positive electrode active material-containing layer, 5% by weight of a graphite powder as the electro-conductive agent, based on the weight of the positive electrode active material-containing layer, and 5% by weight of polytetrafluoroethylene (PTFE) as a binder, based on the weight of the positive electrode active material-containing layer are mixed with a positive electrode active material, and the resultant mixture was dispersed in water to prepare a slurry. The resultant slurry was applied onto both surfaces of a nickel foil having a thickness of 10 μm, dried, and pressed to produce a positive electrode. A thickness of each positive electrode active material-containing layer was 43 μm. An electrode density was 2.2 g/cm$^3$.

An anatase $TiO_2$ powder having an average secondary particle size (i.e., average secondary particle diameter) of 10 μm, a zinc powder having an average particle size of 10 μm, and tetrafluoroethylene (PTFE) as a binder were mixed so that the weight ratio was 80:17:3 and then dispersed in water. The resultant dispersion was stirred using a ball mill under conditions in which rotational speed was 1000 rpm and a stirring time was two hours to prepare a slurry. The resultant slurry was applied onto a nickel foil having a thickness of 10 µm, dried, and heat-pressed to produce a negative electrode in which a thickness of each negative electrode active material-containing layer was 59 µm, and the electrode density was 2.2 g/cm³.

A nonwoven fabric made of cellulose fibers, having an average fiber diameter of 1 µm, and having a thickness of 20 µm and a porosity of 65% was provided as a separator. A surface of the positive electrode was covered with the separator, and the negative electrodes are spirally wound while being laminated such that the negative electrode active material-containing layer faces the positive electrode active material-containing layer through the separator, thus producing an electrode group. At that time, an electrode width of the positive electrode active material-containing layer was 50 mm, and an electrode width of the negative electrode active material-containing layer was 51 mm. Thus, in the electrode group, a long side of the negative electrode active material-containing layer was projected from a long side of the positive electrode active material-containing layer.

This electrode group was pressed to be formed into a flat shape. The electrode group was stored in a thin metal can container made of stainless steel and having a thickness of 0.25 mm. In that metal can, a valve which leaks gas when the internal pressure exceeded 2 atmosphere pressure was installed.

On the other hand, as an electrolytic solution, i.e., a first electrolyte, 6 M of LiCl, 0.5 M of $ZnSO_4$ and 0.25 M of $Li_2SO_4$ were dissolved in 1 L of water, and LiOH was added such that a pH value was 11, thus preparing an alkali aqueous solution. The electrolytic solution was injected into the electrode group in the container, and a thin secondary battery having the above-mentioned structure shown in FIG. 1 and having a thickness of 16 mm, a width of 40 mm, and a height of 60 mm was produced.

When initial charge/discharge was applied to the obtained secondary battery such that after the secondary battery was charged up to 2.7 V by a constant current of 6 A at 25° C., the secondary battery was discharged up to 1.5 V at 3 A, zinc was deposited on a surface of the anatase $TiO_2$ particles as the negative electrode active material to cover at least a portion of the surfaces of the $TiO_2$ particles with a zinc metal layer having a thickness of 0.05 µm. Table 1 shows, as mixing ratio (% by weight), results calculated from the formula (1) in which $W_1$ is a weight of the zinc powder, and $W_2$ is a total weight of the anatase $TiO_2$ particles and the zinc metal layer.

Examples 2 to 4

Thin secondary batteries were produced similarly to Example 1 except that positive electrode active materials, negative electrode active materials, negative electrode covering members, thicknesses of the negative electrode covering members, kinds of materials mixed in the negative electrode, mixing ratio, aqueous electrolytic solution compositions, and pH were set to the values shown in Table 1. The covering member of Example 3 made of $ZrO_2$ was produced by the following method. $Zr(NO_3)_2 \cdot 3H_2O$ was added to an aqueous solution of 2% by weight polyvinyl pyrrolidone, a $Li_4Ti_5O_{12}$ powder and water were added to this solution, and the resultant solution was stirred for six hours. After that, the resultant product was heat-treated at 600° C. in air for three hours, thus obtaining $Li_4Ti_5O_{12}$ covered with $ZrO_2$.

As the negative electrode active materials of Examples 2 and 3, a $Li_4Ti_5O_{12}$ powder having a spinel structure and having an average secondary particle size (average secondary particle diameter) of 0.8 µm was used.

Example 5

A secondary battery was produced similarly to Example 1 except that a surface of negative electrode active material particles was not covered with a covering member by changing the electrolytic solution composition to the composition shown in Table 1.

Example 6

A $Li_4Ti_5O_{12}$ powder having an average secondary particle size similar to Examples 2 and 3 was covered with a covering member made of $Li_{1.3}Ti_{1.7}Al_{0.3}(PO_4)_3$. A thin secondary battery was produced similarly to Example 1 except that negative electrode active material particles with a covering member were used, and a positive electrode active material, a thickness of a negative electrode covering member, a kind of a material mixed in the negative electrode, a mixing ratio, an aqueous electrolytic solution composition, and pH were set to the values shown in Table 1.

Example 7

A $Li_4TiO_{12}$ powder having an average secondary particle size similar to Examples 2 and 3 was covered with a covering member made of $Li_{3.6}Ge_{0.6}V_{0.4}O_4$. A thin secondary battery was produced similarly to Example 1 except that negative electrode active material particles with a covering member were used, and a positive electrode active material, a thickness of a negative electrode covering member, a kind of a material mixed in the negative electrode, a mixing ratio, an aqueous electrolytic solution composition, and pH were set to the values shown in Table 1.

Example 8

A thin secondary battery was produced similarly to Example 1 except that a $TiO_2$ (B) powder having a monoclinic structure and having an average secondary particle size (average secondary particle diameter) of 10 µm was provided as a negative electrode active material, and a zinc powder is not added to a negative electrode.

In order to change a thickness of a zinc metal layer, covering surfaces of negative electrode active material particles, to 0.1 µm, an initial charge/discharge condition of the secondary battery was changed to a condition in which the secondary battery was charged up to 2.7 v by a constant current of 2 A at 25° C. and then discharged up to 1.5 V at 3 A.

Example 9

As a negative electrode active material, an $Nb_2TiO_7$ powder having an average secondary particle size (average secondary particle diameter) of 2 µm was provided. A thin secondary battery was produced similarly to Example 1 except that a positive electrode active material, a negative electrode covering member, a thickness of the negative electrode covering member, a kind of a material mixed in the negative electrode, a mixing ratio, an aqueous electrolytic solution composition, and pH were set to the values shown in Table 1.

Examples 10 and 11

A $Li_4Ti_5O_{12}$ powder having an average secondary particle size similar to Examples 2 and 3 was covered with a covering member made of $Li_7La_3Zr_2O_{12}$. A thin secondary battery was produced similarly to Example 1 except that negative electrode active material particles with a covering member were used, and a positive electrode active material, a thickness of a negative electrode covering member, a kind of a material mixed in the negative electrode, a mixing ratio, an aqueous electrolytic solution composition, and pH were set to the values shown in Table 1.

Examples 12 to 20

Thin secondary batteries were produced similarly to Example 1 except that positive electrode active materials, negative electrode active materials, negative electrode covering members, thicknesses of the negative electrode covering members, kinds of materials mixed in the negative electrode, a mixing ratio, aqueous electrolytic solution compositions, and pH were set to the values shown in Table 1.

Example 21

In a $Li_4Ti_5O_{12}$ powder having an average secondary particle size similar to Examples 2 and 3, a covering member made of $Al_2O_3$ was produced by the following method. $Al(NO_3)_2 \cdot 9H_2O$ was added to an aqueous solution prepared by mixing 5 ml of polyvinyl alcohol and 10 ml of water, a $Li_4Ti_5O_{12}$ powder and 10 ml of water were added to this solution, and the resultant solution was stirred for six hours. After that, the resultant product was heat-treated at 600° C. in air for three hours, thus obtaining $Li_4Ti_5O_{12}$ covered with $Al_2O_3$.

Al particles having an average particle size of 50 μm were subjected to alumite treatment under the following conditions, thus obtaining Al particles whose surfaces were covered with an $Al_2O_3$ film.

An electrode is produced by holding a powder including Al particles between two Al plates having a plural of holes, and electrolysis was performed at a voltage of 30 V (Al plates serving as counter electrodes) with the use of a 5% oxalic acid aqueous solution as an electrolytic solution bath. After the electrode was taken out from the electrolytic solution bath, the electrode was washed with water and then immersed in boiling water for 10 minutes. After that, the electrode was dried to remove the Al particles from the Al plates, thus obtaining the Al particles whose surfaces were covered with an $Al_2O_3$ film.

A thin secondary battery was produced similarly to Example 1 except that the negative electrode active material and the particles of the additive element were used, and a positive electrode active material, a thickness of a negative electrode covering member, a mixing ratio, an aqueous electrolytic solution composition, and pH were set to the values shown in Table 2.

Example 22

In a $Li_4Ti_5O_{12}$ powder having an average secondary particle size similar to Examples 2 and 3, a covering member made of ZnO was produced by the following method. $Zn(NO_3)_2 \cdot 6H_2O$ was added to an aqueous solution prepared by mixing 5 ml of polyvinyl alcohol and 10 ml of water, a $Li_4Ti_5O_{12}$ powder and 10 ml of water were added to this solution, and the resultant solution was stirred for six hours. After that, the resultant product was heat-treated at 600° C. in air for three hours, thus obtaining $Li_4Ti_5O_{12}$ covered with ZnO.

Zn particles having an average particle size of 10 μm were covered with ZnO under the following conditions, thus obtaining Zn particles whose surfaces were covered with a ZnO film.

After the Zn particles were immersed in an alkaline aqueous solution of pH 9 for three hours, washing with water was performed, and heat treatment was performed at 200° C. in air for six hours, thus obtaining the Zn particles covered with ZnO.

A thin secondary battery was produced similarly to Example 1 except that the negative electrode active material and the particles of the additive element were used, and a positive electrode active material, a thickness of a negative electrode covering member, a mixing ratio, an aqueous electrolytic solution composition, and pH were set to the values shown in Table 2.

Example 23

A thin secondary battery was produced similarly to Example 21 except that a negative electrode covering member is not used, and a mixing ratio was set to the value shown in Table 2.

Example 24

A thin secondary battery was produced similarly to Example 22 except that a negative electrode covering member is not used, and a mixing ratio was set to the value shown in Table 2.

Comparative Examples 1 to 7

Thin secondary batteries were produced similarly to Example 1 except that positive electrode active materials, negative electrode active materials, negative electrode covering members, thicknesses of the negative electrode covering members, kinds of materials mixed in the negative electrode, a mixing ratio, aqueous electrolytic solution compositions, and pH were set to the values shown in Table 1.

In Examples and Comparative Examples, the pH of each electrolytic solution was adjusted to an intended value by adding sulfuric acid or LiOH.

After each of the obtained secondary batteries of Examples and Comparative Examples was charged up to 2.7 V by a constant current of 6 A at 25° C., a discharge capacity obtained when the secondary battery was discharged up to 1.5 V at 3 A was measured. As a cycle test, a charge-and-discharge cycle in which the secondary battery was charged up to 2.7 V by a constant current of 6 A at 25° C. and then discharged up to 1.5 V at 3 A was repeated, and a cycle number obtained when the discharge capacity reaches a value corresponding to 80% of an initial capacity was taken to be a cycle life. As a large current discharge performance test, the secondary battery was charged up to 2.7 V at 6 A and then discharged up to 1.5 V at 100 A, and a capacity retention at that time was obtained. As a storage test, the secondary battery was charged up to 2.7 V at 6 A and then stored at 30° C. for one week, and the self-discharge rate thereafter was obtained. Those measurement results are shown in the following Tables 3 to 4.

TABLE 1

| | Positive electrode active material | Negative electrode active material | Negative electrode covering member | Thickness (μm) | Material mixed in negative electrode | Mixing ratio (% by weight) | Aqueous electrolytic solution composition | pH |
|---|---|---|---|---|---|---|---|---|
| Example 1 | $LiMn_2O_4$ | $TiO_2$ (anatase) | Zn | 0.05 | Zn | 21.25 | 6 M/L LiCl + 0.5 M/L $ZnSO_4$ + 0.25 M/L $Li_2SO_4$ | 11 |
| Example 2 | $LiMn_2O_4$ | $Li_4Ti_5O_{12}$ | Zn | 0.05 | Zn | 5 | 6 M/L LiCl + 0.5 M/L $ZnSO_4$ + 0.25 M/L $Li_2SO_4$ | 11 |
| Example 3 | $LiMn_2O_4$ | $Li_4Ti_5O_{12}$ | $ZrO_2$ | 0.01 | Zn | 21.25 | 6 M/L LiCl + 0.5 M/L $ZnSO_4$ + 0.25 M/L $Li_2SO_4$ | 11 |
| Example 4 | $LiMn_2O_4$ | $TiO_2$ (anatase) | Zn | 0.05 | Zn | 2 | 6 M/L LiCl + 0.5 M/L $ZnSO_4$ + 0.25 M/L $Li_2SO_4$ | 5 |
| Example 5 | $LiMn_2O_4$ | $TiO_2$ (anatase) | — | — | Zn | 21.25 | 4 M/L LiCl + 0.25 M/L $Li_2SO_4$ | 8 |
| Example 6 | $LiMn_2O_4$ | $Li_4Ti_5O_{12}$ | $Li_{1.3}Ti_{1.7}Al_{0.3}(PO_4)_3$ | 0.02 | Zn | 21.25 | 4 M/L LiCl + 0.25 M/L $Li_2SO_4$ | 11 |
| Example 7 | $LiMn_2O_4$ | $Li_4Ti_5O_{12}$ | $Li_{3.6}Ge_{0.6}V_{0.4}O_4$ | 0.02 | Zn | 21.25 | 4 M/L LiCl + 0.25 M/L $Li_2SO_4$ | 11 |
| Example 8 | $LiMn_2O_4$ | $TiO_2(B)$ | Zn | 0.1 | — | — | 6 M/L LiCl + 0.5 M/L $ZnSO_4$ + 0.25 M/L $Li_2SO_4$ | 11 |
| Example 9 | $LiMn_2O_4$ | $Nb_2TiO_7$ | — | — | Zn | 21.25 | 4 M/L LiCl + 0.25 M/L $Li_2SO_4$ | 11 |
| Example 10 | $LiMn_2O_4$ | $Li_4Ti_5O_{12}$ | $Li_7La_3Zr_2O_{12}$ | 0.01 | Zn | 21.25 | 4 M/L LiCl + 0.5 M/$LiNO_3$ | 12 |
| Example 11 | $LiMn_2O_4$ | $Li_4Ti_5O_{12}$ | $Li_7La_3Zr_2O_{12}$ | 0.01 | Zn | 21.25 | 4 M/L LiCl + 0.1 M/L $LiB[(OCO)_2]_2$ | 12 |
| Example 12 | $LiMn_{0.9}Fe_{0.1}PO_4$ | $TiO_2$ (anatase) | — | — | Zn | 21.25 | 8 M/L LiCl + 0.25 M/L $Li_2SO_4$ | 11 |
| Example 13 | $LiMn_2O_4$ | $TiO_2$ (anatase) | Zn | 0.05 | — | — | 6 M/L LiCl + 0.5 M/L $ZnSO_4$ + 0.25 M/L $Li_2SO_4$ | 5 |
| Example 14 | $LiMn_2O_4$ | $Li_4Ti_5O_{12}$ | — | — | Zn | 21.25 | 6 M/L $LiNO_3$ + 0.25 M/L $Li_2SO_4$ | 5 |
| Example 15 | $LiMn_2O_4$ | $Li_4Ti_5O_{12}$ | Zn | 0.05 | Zn | 25 | 6 M/L LiCl + 0.5 M/L $ZnSO_4$ + 0.25 M/L $Li_2SO_4$ | 5 |
| Example 16 | $LiMn_2O_4$ | $Li_4Ti_5O_{12}$ | Zn | 0.05 | Zn | 30 | 6 M/L LiCl + 0.5 M/L $ZnSO_4$ + 0.25 M/L $Li_2SO_4$ | 6 |
| Example 17 | $LiMn_2O_4$ | $Li_4Ti_5O_{12}$ | — | — | Zn | 30 | 6 M/L $LiNO_3$ + 0.25 M/L $Li_2SO_4$ | 3 |
| Example 18 | $LiMn_2O_4$ | $TiO_2$ (anatase) | — | — | Zn | 30 | 6 M/L $LiNO_3$ + 0.25 M/L $Li_2SO_4$ | 5 |
| Example 19 | $LiFePO_4$ | $Li_4Ti_5O_{12}$ | Zn | 0.05 | Zn | 25 | 6 M/L LiCl + 0.5 M/L $ZnSO_4$ + 0.25 M/L $Li_2SO_4$ | 5 |
| Example 20 | $LiNi_{0.5}Co_{0.2}Mn_{0.3}O_2$ | $Li_4Ti_5O_{12}$ | Zn | 0.05 | Zn | 25 | 6 M/L LiCl + 0.5 M/L $ZnSO_4$ + 0.25 M/L $Li_2SO_4$ | 5 |

TABLE 2

| | Positive electrode active material | Negative electrode active material | Negative electrode covering member | Thickness (μm) | Material mixed in negative electrode | Mixing ratio (% by weight) | Aqueous electrolytic solution composition | pH |
|---|---|---|---|---|---|---|---|---|
| Example 21 | $LiMn_2O_4$ | $Li_4Ti_5O_{12}$ | $Al_2O_3$ | 0.01 | Al covered with $Al_2O_3$ | 5 | 4 M/L LiCl + 0.25 M/L $Li_2SO_4$ | 5 |
| Example 22 | $LiMn_2O_4$ | $Li_4Ti_5O_{12}$ | ZnO | 0.1 | Zn covered with ZnO | 5 | 4 M/L LiCl + 0.25 M/L $Li_2SO_4$ | 5 |
| Example 23 | $LiMn_2O_4$ | $Li_4Ti_5O_{12}$ | — | — | Al covered with $Al_2O_3$ | 10 | 4 M/L LiCl + 0.25 M/L $Li_2SO_4$ | 5 |
| Example 24 | $LiMn_2O_4$ | $Li_4Ti_5O_{12}$ | — | — | Zn covered with ZnO | 20 | 4 M/L LiCl + 0.25 M/L $Li_2SO_4$ | 5 |
| Comparative Example 1 | $LiMn_2O_4$ | $VO_2$ | — | — | — | — | 3 M/L LiCl + 0.25 M/L $Li_2SO_4$ | 8 |
| Comparative Example 2 | $LiMn_2O_4$ | $LiV_3O_8$ | — | — | — | — | 3 M/L LiCl + 0.25 M/L $Li_2SO_4$ | 8 |

TABLE 2-continued

| | Positive electrode active material | Negative electrode active material | Negative electrode covering member | Thickness (μm) | Material mixed in negative electrode | Mixing ratio (% by weight) | Aqueous electrolytic solution composition | pH |
|---|---|---|---|---|---|---|---|---|
| Comparative Example 3 | LiMn$_2$O$_4$ | TiO$_2$ (anatase) | — | — | — | — | 3 M/L LiCl + 0.25 M/L Li$_2$SO$_4$ | 11 |
| Comparative Example 4 | LiMn$_2$O$_4$ | TiO$_2$ (anatase) | — | — | — | — | 3 M/L LiCl + 0.25 M/L Li$_2$SO$_4$ | 8 |
| Comparative Example 5 | LiMn$_2$O$_4$ | TiO$_2$ (anatase) | — | — | — | — | 3 M/L LiCl + 0.25 M/L Li$_2$SO$_4$ | 7.5 |
| Comparative Example 6 | LiMn$_2$O$_4$ | Li$_4$Ti$_5$O$_{12}$ | — | — | — | — | 3 M/L LiCl + 0.25 M/L Li$_2$SO$_4$ | 8 |
| Comparative Example 7 | LiMn$_2$O$_4$ | Li$_4$Ti$_5$O$_{12}$ | — | — | TiO$_2$ (anatase) | — | 3 M/L LiCl + 0.25 M/L Li$_2$SO$_4$ | 8 |

TABLE 3

| | 25° C. discharge capacity (mAh) | Large current discharge capacity retention rate (%) | Cycle life (cycle number) | 30° C. storage self-discharge rate (%) |
|---|---|---|---|---|
| Example 1 | 3000 | 90 | 2400 | 10 |
| Example 2 | 3100 | 85 | 2000 | 6 |
| Example 3 | 2800 | 80 | 2000 | 10 |
| Example 4 | 3000 | 70 | 2100 | 8 |
| Example 5 | 3100 | 95 | 2200 | 10 |
| Example 6 | 3000 | 75 | 2200 | 10 |
| Example 7 | 3000 | 70 | 2000 | 10 |
| Example 8 | 3100 | 75 | 1500 | 6 |
| Example 9 | 3300 | 80 | 1800 | 10 |
| Example 10 | 3000 | 80 | 2000 | 10 |
| Example 11 | 3000 | 80 | 2200 | 9 |
| Example 12 | 3100 | 80 | 3000 | 10 |
| Example 13 | 3000 | 70 | 1800 | 8 |
| Example 14 | 3000 | 85 | 2200 | 12 |
| Example 15 | 3200 | 90 | 2400 | 6 |
| Example 16 | 3200 | 92 | 2800 | 6 |
| Example 17 | 2800 | 90 | 2600 | 12 |
| Example 18 | 2500 | 90 | 2500 | 12 |
| Example 19 | 3300 | 70 | 3000 | 5 |
| Example 20 | 3500 | 80 | 2000 | 6 |

TABLE 4

| | 25° C. discharge capacity (mAh) | Large current discharge capacity retention rate (%) | Cycle life (cycle number) | 30° C. storage self-discharge rate (%) |
|---|---|---|---|---|
| Example 21 | 2800 | 70 | 3000 | 5 |
| Example 22 | 3000 | 80 | 2800 | 7 |
| Example 23 | 2800 | 70 | 2800 | 8 |
| Example 24 | 3000 | 80 | 2500 | 10 |
| Comparative Example 1 | 1500 | 50 | 500 | 40 |
| Comparative Example 2 | 1600 | 40 | 300 | 50 |
| Comparative Example 3 | 1000 | 30 | 300 | 30 |
| Comparative Example 4 | 500 | 30 | 100 | 50 |
| Comparative Example 5 | 100 | 10 | 20 | 90 |
| Comparative Example 6 | 1000 | 40 | 20 | 90 |
| Comparative Example 7 | 1100 | 30 | 20 | 80 |

As seen in Tables 1 to 4, the secondary batteries of Examples 1 to 24 are excellent in discharge capacity, large current discharge performance, cycle life performance, and storage performance as compared with Comparative Examples 1 to 7.

By comparing Example 1 and Example 5, it is found that the cycle life performance of Example 1 in which a zinc-containing layer is formed on surfaces of negative electrode active material particles is more excellent than that of Example 5.

By comparing Examples 2, 3, 6, 7, 10, 11, 21, and 22 in which the negative electrode active material is a lithium titanium oxide having a spinel structure, it is found that Example 2 using the covering member containing zinc metal is more excellent in discharge capacity and large current discharge performance than other examples.

As can be seen from the results of Examples 5, 8, 9, and 14, excellent performances can be obtained even if the kind of the negative electrode active material is changed. As can be seen from the results of Examples 1, 12, 19, and 20, excellent performances can be obtained even if the kind of the positive electrode active material is changed.

As can be seen from the results of Examples 21 to 24, by virtue of the use of Al particles whose surfaces are covered with an Al$_2$O$_3$ film or Zn particles whose surfaces are covered with a ZnO film, excellent cycle life performance can be obtained.

As can be seen from the results of Comparative Examples 4, 6, and 7, in Comparative Example 7 using a mixture of titanium dioxide and a lithium titanium oxide in the negative electrode active material, the discharge capacity, the large current discharge performance, the cycle life performance, and the storage performance are as inferior as those of Comparative Examples 4 and 6 using one kind of the negative electrode active material.

Although other examples will be explained below, the disclosure is not limited to the examples described below, while not departing from the scope of the disclosure.

Example 101

(Production of Battery for Evaluation)

First, N-methylpyrrolidone (NMP) was added to and mixed with 100 parts by weight of an olivine type LiMn$_2$O$_4$ powder as a positive electrode active material, 10 parts by weight of acetylene black as an electro-conductive agent, and 10 parts by weight of polyvinylidene fluoride (PVdF) as a binder, thus preparing a positive electrode slurry. The prepared slurry was coated onto one surface of a Ti foil as a positive electrode current collector, a coating of the slurry was dried and then pressed, whereby a positive electrode sheet having an electrode density of 2.6 g/cm³ was produced. The produced positive electrode sheet was punched into a circle of φ 10 mm, thus obtaining a disc-shaped positive electrode.

Next, N-methylpyrrolidone (NMP) was added to and mixed with 100 parts by weight of a spinel type $Li_4Ti_5O_{12}$ powder as a negative electrode active material, 10 parts by weight of acetylene black as an electro-conductive agent, and 10 parts by weight of polyvinylidene fluoride (PVdF) as a binder, thus preparing a negative electrode slurry. The prepared slurry was coated onto one surface of a Zn foil as a negative electrode current collector, a coating of the slurry was dried and then pressed, whereby a negative electrode sheet having an electrode density of 2.0 g/cm³ was produced. The produced negative electrode sheet was punched into a circle of φ 10 mm, thus obtaining a disc-shaped negative electrode.

A three electrode type cell having the configuration shown in FIG. 9 was produced using the produced positive and negative electrodes. In the cell, as a positive electrode external terminal (positive electrode can) and a positive electrode internal terminal, a Ti plate and a Ti wire were used, respectively, and they were resistance-welded to provide an integrated positive electrode terminal. As a negative electrode terminal (negative electrode can), an aluminum plate was used, and a portion of the internal surface that becomes in contact with an electrolytic solution was insulated with Kapton tape (registered trademark, manufactured by Du Pont-Toray Co., Ltd.).

12 ml of a 12 M LiCl aqueous solution as an electrolytic solution, that is, an aqueous solution of the second electrolyte was put into the produced three electrode type cell. The concentration of the electrolytic solution was measured by the ion chromatography method.

As described above, the battery for evaluation of Example 101 was produced.

Example 102

A battery for evaluation was produced similarly to Example 101 except that a Ti foil was used as a negative electrode current collector, and 20 mM of $ZnCl_2$ as an additive was added to an electrolytic solution.

Example 103

A battery for evaluation was produced similarly to Example 101 except that a Ti foil was used as a negative electrode current collector, and 20 mM of $ZnCl_2$ and 10 mM of saccharin sodium salt as additives were added to an electrolytic solution.

Example 104

A battery for evaluation was produced similarly to Example 101 except that a Ti foil was used as a negative electrode current collector, and 10 mM of $ZnCl_2$, 10 mM of $InCl_3$, and 10 mM of saccharin sodium salt as additives were added to an electrolytic solution.

Example 105

A battery for evaluation was produced similarly to Example 101 except that a Ti foil was used as a negative electrode current collector, and 10 mM of $ZnCl_2$, 10 mM of $CuCl_2$, and 10 mM of saccharin sodium salt as additives were added to an electrolytic solution.

Example 106

A battery for evaluation was produced similarly to Example 101 except that a Ti foil was used as a negative electrode current collector, and 20 mM of $SnCl_2$ and 10 mM of saccharin sodium salt as additives were added to an electrolytic solution.

Comparative Example 101

A battery for evaluation was produced similarly to Example 101 except that a Ti foil was used as a negative electrode current collector.

Comparative Example 102

A battery for evaluation was produced similarly to Example 101 except that a Ti foil was used as a negative electrode current collector, $LiTi_2(PO_4)_3$ was used as a negative electrode active material, and 20 mM of $ZnCl_2$ as an additive was added to an electrolytic solution.

The following table 5 summarizes, for each of Examples 101 to 106 and Comparative Examples 101 and 102, the material of the current collector and the composition of the active material in each of the positive and negative electrodes used in the manufacturing of the battery for evaluation, the composition and concentration of the electrolyte used in the electrolytic solution, the additive added to the electrolytic solution and concentration thereof, and pH of the electrolytic solution.

TABLE 5

| | Positive electrode | | Negative electrode | | Li insertion/extraction potential of active material (V vs. SCE) | Electrolytic solution | | |
|---|---|---|---|---|---|---|---|---|
| | Current collector | Active material | Current collector | Active material | | Electrolyte (M) | Additive (mM) | pH |
| Example 101 | Ti | $LiMn_2O_4$ | Zn | $Li_4Ti_5O_{12}$ | −1.52 | LiCl (12) | — | 3.1 |
| Example 102 | Ti | $LiMn_2O_4$ | Ti | $Li_4Ti_5O_{12}$ | −1.52 | LiCl (12) | $ZnCl_2$ (20) | 3.1 |
| Example 103 | Ti | $LiMn_2O_4$ | Ti | $Li_4Ti_5O_{12}$ | −1.52 | LiCl (12) | $ZnCl_2$ (20) saccharin (10) | 3.0 |
| Example 104 | Ti | $LiMn_2O_4$ | Ti | $Li_4Ti_5O_{12}$ | −1.52 | LiCl (12) | $ZnCl_2$ (10) $InCl_3$ (10) saccharin (10) | 3.0 |

TABLE 5-continued

| | Positive electrode | | Negative electrode | | | Electrolytic solution | | |
|---|---|---|---|---|---|---|---|---|
| | Current collector | Active material | Current collector | Active material | Li insertion/extraction potential of active material (V vs. SCE) | Electrolyte (M) | Additive (mM) | pH |
| Example 105 | Ti | $LiMn_2O_4$ | Ti | $Li_4Ti_5O_{12}$ | −1.52 | LiCl (12) | $ZnCl_2$ (10) $CuCl_2$ (10) saccharin (10) | 2.9 |
| Example 106 | Ti | $LiMn_2O_4$ | Ti | $Li_4Ti_5O_{12}$ | −1.52 | LiCl (12) | $SnCl_2$ (20) saccharin (10) | 2.8 |
| Comparative Example 101 | Ti | $LiMn_2O_4$ | Ti | $Li_4Ti_5O_{12}$ | −1.52 | LiCl (12) | — | 3.1 |
| Comparative Example 102 | Ti | $LiMn_2O_4$ | Ti | $LiTi_2(PO_4)_3$ | −0.75 | LiCl (12) | $ZnCl_2$ (20) | 3.1 |

The following table 6 summarizes the conditions of the initial charge and discharge of the battery for evaluation manufactured in each of Examples 101 to 106 and Comparative Examples 101 and 102.

TABLE 6

| | Charge-and-discharge conditions | | | |
|---|---|---|---|---|
| | Temperature (° C.) | Current density (mA/cm$^2$) | Negative electrode potential reached at charge (V vs. SCE) | Negative electrode potential reached at discharge (V vs. SCE) |
| Example 101 | 25 | 4.0 | −1.6 | −1.3 |
| Example 102 | 25 | 4.1 | −1.6 | −1.3 |
| Example 103 | 25 | 3.9 | −1.6 | −1.3 |
| Example 104 | 25 | 4.0 | −1.6 | −1.3 |
| Example 105 | 25 | 4.1 | −1.6 | −1.3 |
| Example 106 | 25 | 3.9 | −1.6 | −1.3 |
| Comparative Example 101 | 25 | 4.0 | −1.6 | −1.3 |
| Comparative Example 102 | 25 | 3.9 | −0.9 | −0.4 |

(Constant-Current Charge-and-Discharge Test)

For each of the batteries for evaluation manufactured in Examples 101 to 106 and Comparative Examples 101 and 102, a constant-current charge-and-discharge test was conducted by controlling the voltage of the negative electrode under a temperature condition of 25° C. and a condition of a current value of 5 C rate. Regarding charging, the battery was charged until the negative electrode potential reached −1.6 V (vs. SCE), and charging was performed in a constant current/constant voltage mode (CCCV) in which charging was stopped once the current value reached 2.5 C or after a lapse of 20 minutes from the start of charging. Regarding discharging, constant current discharge where the battery was discharged until the negative electrode potential reached −1.3 V was performed. One cycle was set as being charging once and discharging once. No interruption time was provided after either charge or discharge, and charge and discharge were repeated for 20 cycles.

When charge and discharge at the first cycle were performed, the discharge capacity of the battery was measured and was taken to be the discharge capacity before the cycle test. The discharge capacity after charge and discharge at the twentieth cycle was taken to be the discharge capacity after 20 cycles. A value obtained by dividing the discharge capacity after 20 cycles by the discharge capacity before the cycle test was calculated as a capacity retention ratio after 20 cycles.

An average value of charge-and-discharge efficiency for each cycle when charge and discharge were performed for 20 cycles was taken to be the charge-and-discharge efficiency after 20 cycles.

The following table 7 summarizes the capacity retention ratio after 20 cycles and the charge-and-discharge efficiency after 20 cycles obtained in each of Examples 101 to 106 and Comparative Examples 101 and 102.

TABLE 7

| | Capacity retention rate after 20 cycles (%) | Charge-and-discharge efficiency after 20 cycles (%) |
|---|---|---|
| Example 101 | 94.2 | 86.0 |
| Example 102 | 89.5 | 82.6 |
| Example 103 | 90.2 | 89.4 |
| Example 104 | 91.2 | 87.1 |
| Example 105 | 92.0 | 80.1 |
| Example 106 | 88.7 | 81.5 |
| Comparative Example 101 | 71.5 | 80.0 |
| Comparative Example 102 | 81.2 | 82.0 |

(Analysis of Composition and Thickness of Covering Layer)

For each of the batteries for evaluation manufactured in Examples 101 to 106 and Comparative Examples 101 and 102, the composition and layer thickness of the covering layer in each member in the negative electrode were analyzed. As a result, it was found that in Example 101, the covering layer including a ZnO phase was present on all of the negative electrode active material, the electro-conductive agent, and the negative electrode current collector. In Example 101, it is considered that since a Zn foil was used as the negative electrode current collector, the covering layer including the ZnO phase was formed due to zinc eluted from the Zn foil.

Also in Examples 102 and 103, it had been confirmed that the covering layer including the ZnO phase was formed on the surface of each member. In Examples 102 and 103, unlike Example 101, although a Ti foil was used as the negative electrode current collector instead of a Zn foil, $ZnCl_2$ as an additive was contained in the electrolytic solution. It is considered that the covering layer including the ZnO phase was formed due to $ZnCl_2$.

In Example 104, the covering layer including a ZnO phase and an $In_2O_3$ phase was formed on surfaces of each of the negative electrode active material, the electro-conductive agent, and the negative electrode current collector. In example 4, $ZnCl_2$ and $InCl_3$ as additives were contained in the electrolytic solution. It is considered that the covering layer including Zn and In was formed due to these additives.

In Example 105, the covering layer including a ZnO phase and a Cu phase was formed on each of the negative electrode active material, the electro-conductive agent, and the negative electrode current collector. In Example 105, $ZnCl_2$ and $CuCl_2$ as additives were contained in the electrolytic solution. It is considered that the covering layer including the ZnO phase and the Cu phase was formed due to these additives.

In Example 106, the covering layer including a SnO phase was formed on all of the members. In Example 106, $SnCl_2$ as an additive was contained in the electrolytic solution. It is considered that the covering layer including the SnO phase was formed of $SnCl_2$.

confirmed in any of the negative electrode active material, the electro-conductive agent, and the negative electrode current collector. In Comparative Example 101, it is considered that since an element, which may serve as the constituent element of the covering layer, was not included in either of the negative electrode and the electrolytic solution, no covering layer was formed. In Comparative Example 102, although $ZnCl_2$ as an additive was contained in the electrolytic solution, no covering layer was formed. It is considered that, since the operating potential of $LiTi_2(PO_4)_3$ used as the negative electrode active material was too high, the negative electrode potential did not become low enough, so that a reaction in which a covering layer is formed of $ZnCl_2$ did not occur.

The following Table 8 summarizes, for each of the negative electrode active material, the electro-conductive agent, and the negative electrode current collector included in the negative electrode in the battery for evaluation in each of Examples 101 to 106 and Comparative Examples 101 and 102, the component of the covering layer (composition of a confirmed phase), the abundance ratio between the constituent elements in the covering layer, the thickness of the covering layer, and the cover ratio of the covering layer on the surface.

TABLE 8

| | Negative electrode active material | | | | Electro-conductive agent | | | | Negative electrode current collector | | | |
|---|---|---|---|---|---|---|---|---|---|---|---|---|
| | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) |
|---|---|---|---|---|---|---|---|---|---|---|---|---|
| Example 101 | ZnO | Zn (49%), O (51%) | 10 | 54 | ZnO | Zn (47%), O (53%) | 20 | 14 | ZnO | Zn (50%), O (50%) | 3000 | 99 |
| Example 102 | ZnO | Zn (48%), O (52%) | 2 | 25 | ZnO | Zn (47%), O (53%) | 4 | 13 | ZnO | Zn (49%), O (51%) | 50 | 96 |
| Example 103 | ZnO | Zn (47%), O (53%) | 2 | 30 | ZnO | Zn (45%), O (55%) | 5 | 12 | ZnO | Zn (50%), O (50%) | 30 | 95 |
| Example 104 | ZnO, $In_2O_3$ | Zn (13%), In (30%), O (57%) | 3 | 35 | ZnO, $In_2O_3$ | Zn (15%), In (27%), O (58%) | 4 | 12 | ZnO, $In_2O_3$ | Zn (15%), In (30%), O (55%) | 25 | 96 |
| Example 105 | ZnO, Cu | Zn (23%), Cu (54%), O (23%) | 10 | 45 | ZnO, Cu | Zn (24%), Cu (49%), O (27%) | 20 | 14 | ZnO, Cu | Zn (26%), Cu (47%), O (27%) | 100 | 99 |
| Example 106 | SnO | Sn (54%), O (46%) | 10 | 37 | SnO | Sn (52%), O (48%) | 15 | 20 | SnO | Sn (55%), O (45%) | 30 | 97 |
| Comparative Example 101 | — | — | — | — | — | — | — | — | — | — | — | — |
| Comparative Example 102 | — | — | — | — | — | — | — | — | — | — | — | — |

In Examples 101 to 106, since $Li_4Ti_5O_{12}$ was used as the negative electrode active material as shown in Table 5, the negative electrode potential reached −1.6 V (vs. SCE) as shown in Table 6 in the initial discharge of the battery for evaluation. Thus, it is considered that due to electrodeposition during initial charge, in Example 101, the covering layer was formed from a Zn element eluted from a Zn foil as the negative electrode current collector, and in each of Examples 102 to 105, the covering layer was formed from the respective additive ($ZnCl_2$, $InCl_3$, $CuCl_2$, or $SnCl_2$) added to the electrolytic solution.

On the other hand, in both Comparative Examples 101 and 102, the formation of the covering layer could not be As shown in Table 7, as compared with the batteries for evaluation manufactured in Examples 101 to 106, in the batteries for evaluation manufactured in Comparative Examples 101 and 102, at least one of the capacity retention ratio after 20 cycles and the charge-and-discharge efficiency after 20 cycles was low. As described above, in Examples 101 to 106, the negative electrode included the covering layer, while on the other hand, in Comparative Examples 101 and 102, the negative electrode included no covering layer. It is considered that in Comparative Examples 101 and 102, since the negative electrode included no covering layer, a reaction between each member (the negative electrode active material, the electro-conductive agent, and the negative electrode current collector) in the negative electrode and the electrolytic solution and self-discharge could not be suppressed, so that the capacity retention ratio and the charge-and-discharge efficiency were reduced.

As shown in Table 8, in any of the negative electrodes in Examples 101 to 106, the thickness of the covering layer formed on the negative electrode active material was smallest, and the thickness of the covering layer formed on the negative electrode current collector was largest. It is considered that this is because in surface covering by electrodeposition, coating of a material having high conductivity had preferentially progressed.

Next, the results of investigating a lithium ion secondary battery using various titanium-containing oxides as the negative electrode active materials are shown in Examples 107 and 108, and Comparative Examples 103 and 104.

Example 107

A battery for evaluation was produced similarly to Example 101 except that monoclinic titanium dioxide ($TiO_2$ (B)) was used as a negative electrode active material.

Example 108

A battery for evaluation was produced similarly to Example 101 except that $Li_2NaTi_5NbO_{14}$ was used as a negative electrode active material.

Comparative Example 103

A battery for evaluation was produced similarly to Example 101 except that a Ti foil was used as a negative electrode current collector, and monoclinic titanium dioxide ($TiO_2(B)$) was used as a negative electrode active material.

Comparative Example 104

A battery for evaluation was produced similarly to Example 101 except that a Ti foil was used as a negative electrode current collector, and $Li_2NaTi_5NbO_{14}$ was used as a negative electrode active material.

The following table 9 summarizes, for each of Examples 107 and 108 and Comparative Examples 103 and 104, the material of the current collector and the composition of the active material in each of the positive and negative electrodes used in the manufacturing of the battery for evaluation, the composition and concentration of the electrolyte used in the electrolytic solution, the additive added to the electrolytic solution and concentration thereof, and pH of the electrolytic solution.

TABLE 9

| | Positive electrode | | Negative electrode | | | Electrolytic solution | | |
|---|---|---|---|---|---|---|---|---|
| | Current collector | Active material | Current collector | Active material | Li insertion/extraction potential of active material (V vs. SCE) | Electrolyte (M) | Additive (mM) | pH |
| Example 107 | Ti | $LiMn_2O_4$ | Zn | $TiO_2$ | −1.50 | LiCl (12) | — | 3.1 |
| Example 108 | Ti | $LiMn_2O_4$ | Zn | $Li_2NaTi_5NbO_{14}$ | −1.75 | LiCl (12) | — | 3.1 |
| Comparative Example 103 | Ti | $LiMn_2O_4$ | Ti | $TiO_2$ | −1.50 | LiCl (12) | — | 3.1 |
| Comparative Example 104 | Ti | $LiMn_2O_4$ | Ti | $Li_2NaTi_5NbO_{14}$ | −1.75 | LiCl (12) | — | 3.1 |

The following table 10 summarizes the conditions of the initial charge and discharge of the battery for evaluation manufactured in each of Examples 107 and 108, and Comparative Examples 103 and 104.

TABLE 10

| | Charge-and-discharge conditions | | | |
|---|---|---|---|---|
| | Temperature (° C.) | Current density (mA/cm$^2$) | Negative electrode potential reached at charge (V vs. SCE) | Negative electrode potential reached at discharge (V vs. SCE) |
| Example 107 | 25 | 4.0 | −1.6 | −1.3 |
| Example 108 | 25 | 4.0 | −1.6 | −1.3 |
| Comparative Example 103 | 25 | 4.1 | −1.6 | −1.3 |
| Comparative Example 104 | 25 | 4.1 | −1.6 | −1.3 |

(Constant-Current Charge-and-Discharge Test)

For each of the batteries for evaluation manufactured in Examples 107 and 108 and Comparative Examples 103 and 104, the capacity retention ratio after 20 cycles and the charge-and-discharge efficiency after 20 cycles were obtained similarly to Examples 101 to 106, and Comparative Examples 101 and 102. The following table 11 summarizes the obtained results.

TABLE 11

| | Capacity retention rate after 20 cycles (%) | Charge-and-discharge efficiency after 20 cycles (%) |
|---|---|---|
| Example 107 | 86.5 | 82.3 |
| Example 108 | 80.4 | 78.5 |
| Comparative Example 103 | 65.0 | 77.4 |
| Comparative Example 104 | 68.0 | 71.2 |

(Analysis of Composition and Thickness of Covering Layer)

For each of the batteries for evaluation manufactured in Examples 107 and 108 and Comparative Examples 103 and 104, the composition and layer thickness of the covering layer in each member in the negative electrode were analyzed similarly to Examples 101 to 106, and Comparative Examples 101 and 102. As a result, it was found that in Examples 107 and 108, the covering layer including a ZnO phase was present in each of the negative electrode active material, the electro-conductive agent, and the negative electrode current collector. In Examples 107 and 108, it is considered that since as in Example 101, a Zn foil was used as the negative electrode current collector, and titanium dioxide and $Li_2NaTi_5NbO_{14}$ were respectively used as the negative electrode active materials, so that the negative electrode potential reached −1.6 V (vs. SCE) in the initial charge as shown in Table 6, and therefore, the covering layer including the ZnO phase was formed due to zinc eluted from the Zn foil.

On the other hand, in both Comparative Examples 103 and 104, the formation of the covering layer could not be confirmed in any of the negative electrode active material, the electro-conductive agent, and the negative electrode current collector. In Comparative Examples 103 and 104, it is considered that although the negative electrode potential reached −1.6 V (vs. SCE) in the initial charge by using the negative electrode active material similar to that of Examples 107 and 108, respectively, since an element, which may serve as the constituent element of the covering layer, was not included in either of the negative electrode and the electrolytic solution as in Comparative Example 101, no covering layer was formed.

The following Table 12 summarizes, for each of the negative electrode active material, the electro-conductive agent, and the negative electrode current collector included in the negative electrode in the battery for evaluation in each of Examples 107 and 108 and Comparative Examples 103 and 104, the component of the covering layer (composition of a confirmed phase), the abundance ratio between the constituent elements in the covering layer, the thickness of the covering layer, and the cover ratio of the covering layer on the surface.

and 108, the negative electrode included the covering layer, while on the other hand, in Comparative Examples 103 and 104, the negative electrode included no covering layer. Thus, it is considered that a reaction between each member (the negative electrode active material, the electro-conductive agent, and the negative electrode current collector) in the negative electrode and the electrolytic solution and self-discharge could not be suppressed, so that the capacity retention ratio and the charge-and-discharge efficiency were reduced.

Examples in which batteries for evaluation were manufactured using various additives in electrolytic solutions are shown below.

Example 109

A battery for evaluation was produced similarly to Example 101 except that a Ti foil was used as a negative electrode current collector, and 20 mM of $InCl_3$ and 10 mM of saccharin sodium salt as additives were added to an electrolytic solution.

Example 110

A battery for evaluation was produced similarly to Example 101 except that a Ti foil was used as a negative electrode current collector, and 20 mM of $PbCl_2$ and 10 mM of saccharin sodium salt as additives were added to an electrolytic solution.

Example 111

A battery for evaluation was produced similarly to Example 101 except that a Ti foil was used as a negative electrode current collector, and 10 mM of $PbCl_2$, 10 mM of $InCl_3$, and 10 mM of saccharin sodium salt as additives were added to an electrolytic solution.

The following table 13 summarizes, for each of Examples 109 to 111, the material of the current collector and the

TABLE 12

| | Negative electrode active material | | | | Electro-conductive agent | | | | Negative electrode current collector | | | |
|---|---|---|---|---|---|---|---|---|---|---|---|---|
| | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) |
| Example 107 | ZnO | Zn (49%), O (51%) | 15 | 36 | ZnO | Zn (47%), O (51%) | 25 | 21 | ZnO | Zn (47%), O (53%) | 3000 | 99 |
| Example 108 | ZnO | Zn (55%), O (45%) | 24 | 38 | ZnO | Zn (53%), O (47%) | 38 | 19 | ZnO | Zn (47%), O (53%) | 3000 | 99 |
| Comparative Example 103 | — | — | — | — | — | — | — | — | — | — | — | — |
| Comparative Example 104 | — | — | — | — | — | — | — | — | — | — | — | — |

As shown in Table 11, as compared with the batteries for evaluation manufactured in Examples 107 and 108, in the batteries for evaluation manufactured in Comparative Examples 103 and 104, both of the capacity retention ratio after 20 cycles and the charge-and-discharge efficiency after 20 cycles were low. As described above, in Examples 107 composition of the active material in each of the positive and negative electrodes used in the manufacturing of the battery for evaluation, the composition and concentration of the electrolyte used in the electrolytic solution, the additive added to the electrolytic solution and concentration thereof, and pH of the electrolytic solution.

TABLE 13

| | Positive electrode | | Negative electrode | | Li insertion/extraction potential of active material (V vs. SCE) | Electrolytic solution | | pH |
|---|---|---|---|---|---|---|---|---|
| | Current collector | Active material | Current collector | Active material | | Electrolyte (M) | Additive (mM) | |
| Example 109 | Ti | $LiMn_2O_4$ | Ti | $Li_4Ti_5O_{12}$ | −1.52 | LiCl (12) | $InCl_3$ (10) saccharin (10) | 2.9 |
| Example 110 | Ti | $LiMn_2O_4$ | Ti | $Li_4Ti_5O_{12}$ | −1.52 | LiCl (12) | $PbCl_2$ (20) saccharin (10) | 2.8 |
| Example 111 | Ti | $LiMn_2O_4$ | Ti | $Li_4Ti_5O_{12}$ | −1.52 | LiCl (12) | $PbCl_2$ (20) $InCl_3$ (10) saccharin (10) | 2.8 |

The following table 14 summarizes the conditions of the initial charge and discharge of the battery for evaluation manufactured in each of Examples 109 to 111.

TABLE 14

| | Charge-and-discharge conditions | | | |
|---|---|---|---|---|
| | Temperature (° C.) | Current density (mA/cm$^2$) | Negative electrode potential reached at charge (V vs. SCE) | Negative electrode potential reached at discharge (V vs. SCE) |
| Example 109 | 25 | 4.0 | −1.6 | −1.3 |
| Example 110 | 25 | 4.2 | −1.6 | −1.3 |
| Example 111 | 25 | 4.0 | −1.6 | −1.3 |

(Constant-Current Charge-and-Discharge Test)

For each of the batteries for evaluation manufactured in Examples 109 to 111, the capacity retention ratio after 20 cycles and the charge-and-discharge efficiency after 20 cycles were obtained similarly to Examples 101 to 108 and Comparative Examples 101 to 103. The following table 15 summarizes the obtained results.

TABLE 15

| | Capacity retention rate after 20 cycles (%) | Charge-discharge efficiency after 20 cycles (%) |
|---|---|---|
| Example 109 | 89.8 | 83.2 |
| Example 110 | 97.1 | 90.0 |
| Example 111 | 96.4 | 904 |

(Analysis of Composition and Thickness of Covering Layer)

For each of the batteries for evaluation manufactured in Examples 109 to 111, the composition and layer thickness of the covering layer in each member in the negative electrode were analyzed similarly to Examples 101 to 108 and Comparative Examples 101 to 104.

As a result, in Example 109, a covering layer including an indium oxide ($In_2O_3$, InO) phase was formed in each of the members. In Example 109, $InCl_3$ as an additive was contained in the electrolytic solution. It is considered that the covering layer including the indium oxide phase was formed due to $InCl_3$.

In Example 110, a covering layer including a $PbO_2$ phase was formed in each of the members. In Example 110, $PbCl_2$ as an additive was contained in the electrolytic solution. It is considered that the covering layer including the $PbO_2$ phase was formed due to $PbCl_2$.

In Example 111, a covering layer including an $In_2O_3$ phase and a $PbO_2$ phase was formed in each of the members. In Example 111, $PbCl_2$ and $InCl_3$ as additives were contained in the electrolytic solution. It is considered that the covering layer including the $In_2O_3$ phase and the $PbO_2$ phase was formed due to those additives.

The following Table 16 summarizes, for each of the negative electrode active material, the electro-conductive agent, and the negative electrode current collector included in the negative electrode in the battery for evaluation in each of Examples 109 to 111, the component of the covering layer (composition of a confirmed phase), the abundance ratio between the constituent elements in the covering layer, the thickness of the covering layer, and the cover ratio of the covering layer on the surface.

TABLE 16

| | Negative electrode active material | | | | Electro-conductive agent | | | | Negative electrode current collector | | | |
|---|---|---|---|---|---|---|---|---|---|---|---|---|
| | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) |
| Example 109 | $In_2O_3$ | In (43%), O (57%) | 8 | 32 | InO | In (41%), O (59%) | 12 | 24 | $In_2O_3$ | In (39%), O (61%) | 25 | 98 |

TABLE 16-continued

| | Negative electrode active material | | | | Electro-conductive agent | | | | Negative electrode current collector | | | |
|---|---|---|---|---|---|---|---|---|---|---|---|---|
| | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) |
| Example 110 | $PbO_2$ | Pb (35%), O (65%) | 12 | 40 | $PbO_2$ | Pb (37%), O (63%) | 15 | 22 | $PbO_2$ | Pb (40%), O (60%) | 35 | 98 |
| Example 111 | $In_2O_3$ $PbO_2$ | In (24%), Pb (11%) O (65%) | 15 | 42 | $In_2O_3$ $PbO_2$ | In (22%), Pb (13%) O (65%) | 15 | 26 | $In_2O_3$ $PbO_2$ | In (20%), Pb (12%) O (68%) | 39 | 99 |

The result of investigating secondary batteries using various electrode active materials is shown in Examples 112 to 114 and Comparative Examples 105 to 107.

Example 112

A battery for evaluation was produced similarly to Example 101 except that $Nb_2TiO_7$ was used as a negative electrode active material.

Example 113

A battery for evaluation was produced similarly to Example 101 except that $LiFePo_4$ was used as a positive electrode active material.

Example 114

A battery for evaluation was produced similarly to Example 101 except that $LiCoO_2$ was used as a positive electrode active material.

Comparative Example 105

A battery for evaluation was produced similarly to Example 101 except that a Ti foil was used as a negative electrode current collector, and $Nb_2TiO_7$ was used as a negative electrode active material.

Comparative Example 106

A battery for evaluation was produced similarly to Example 101 except that a Ti foil was used as a negative electrode current collector, and $LiFePo_4$ was used as a positive electrode active material.

Comparative Example 107

A battery for evaluation was produced similarly to Example 101 except that a Ti foil was used as a negative electrode current collector, and $LiCoO_2$ was used as a positive electrode active material.

The following table 17 summarizes, for each of Examples 112 to 114 and Comparative Examples 105 to 107, the material of the current collector and the composition of the active material in each of the positive and negative electrodes used in the manufacturing of the battery for evaluation, the composition and concentration of the electrolyte used in the electrolytic solution, the additive added to the electrolytic solution and concentration thereof, and pH of the electrolytic solution.

TABLE 17

| | Positive electrode | | Negative electrode | | Li insertion/extraction potential of active material (V vs. SCE) | Electrolytic solution | | |
|---|---|---|---|---|---|---|---|---|
| | Current collector | Active material | Current collector | Active material | | Electrolyte (M) | Additive (mM) | pH |
| Example 112 | Ti | $LiMn_2O_4$ | Zn | $Nb_2TiO_7$ | −1.64 | LiCl (12) | — | 3.1 |
| Example 113 | Ti | $LiFePO_4$ | Zn | $Li_4Ti_5O_{12}$ | −1.60 | LiCl (12) | — | 3.1 |
| Example 114 | Ti | $LiCoO_2$ | Zn | $Li_4Ti_5O_{12}$ | −1.60 | LiCl (12) | — | 3.1 |
| Comparative Example 105 | Ti | $LiMn_2O_4$ | Ti | $Nb_2TiO_7$ | −1.64 | LiCl (12) | — | 3.1 |
| Comparative Example 106 | Ti | $LiFePO_4$ | Ti | $Li_4Ti_5O_{12}$ | −1.60 | LiCl (12) | — | 3.1 |
| Comparative Example 107 | Ti | $LiCoO_2$ | Ti | $Li_4Ti_5O_{12}$ | −1.60 | LiCl (12) | — | 3.1 |

The following table 18 summarizes the conditions of the initial charge and discharge of the battery for evaluation manufactured in each of Examples 112 to 114 and Comparative Examples 105 to 107.

TABLE 18

| | Charge-and-discharge conditions | | | |
|---|---|---|---|---|
| | Temperature (° C.) | Current density (mA/cm$^2$) | Negative electrode potential reached at charge (V vs. SCE) | Negative electrode potential reached at discharge (V vs. SCE) |
| Example 112 | 25 | 4.0 | −1.8 | −1.4 |
| Example 113 | 25 | 3.9 | −1.6 | −1.4 |
| Example 114 | 25 | 3.8 | −1.6 | −1.3 |
| Comparative Example 105 | 25 | 3.8 | −1.8 | −1.4 |
| Comparative Example 106 | 25 | 3.9 | −1.6 | −1.4 |
| Comparative Example 107 | 25 | 3.8 | −1.6 | −1.3 |

(Constant-Current Charge-and-Discharge Test)

For each of the batteries for evaluation manufactured in Examples 112 to 114 and Comparative Examples 105 to 107, the capacity retention ratio after 20 cycles and the charge-and-discharge efficiency after 20 cycles were obtained similarly to Examples 101 to 111 and Comparative Examples 101 to 104. The following table 19 summarizes the obtained results.

TABLE 19

| | Capacity retention rate after 20 cycles (%) | Charge-and-discharge efficiency after 20 cycles (%) |
|---|---|---|
| Example 112 | 76.2 | 75.3 |
| Example 113 | 85.5 | 81.2 |
| Example 114 | 86.8 | 81.8 |
| Comparative Example 105 | 66.4 | 69.2 |
| Comparative Example 106 | 62.0 | 70.6 |
| Comparative Example 107 | 65.2 | 76.9 |

(Analysis of Composition and Thickness of Covering Layer)

For each of the batteries for evaluation manufactured in Examples 112 to 114 and Comparative Examples 105 to 107, the composition and layer thickness of the covering layer in each member in the negative electrode were analyzed similarly to Examples 101 to 111 and Comparative Examples 101 to 104. As a result, in Examples 112 to 114, it was found that the covering layer including a ZnO phase was present in each of the negative electrode active material, the electro-conductive agent, and the negative electrode current collector. In Examples 112 to 114, it is considered that since as in Example 101, a Zn foil was used as the negative electrode current collector, and niobium titanium (Nb$_2$TiO$_7$) or spinel type lithium titanate oxide (Li$_4$Ti$_5$O$_{12}$) was used as the negative electrode active material, so that the negative electrode potential reached −1.6 V to −1.8 V (vs. SCE) in the initial charge as shown in Table 18, and therefore, the covering layer including the ZnO phase was formed due to zinc eluted from the Zn foil.

On the other hand, in any of Comparative Examples 112 to 114, the formation of the covering layer could not be confirmed in any of the negative electrode active material, the electro-conductive agent, and the negative electrode current collector. In Comparative Examples 112 to 114, it is considered that although the negative electrode potential reached −1.6 V to −1.8 V (vs. SCE) in the initial charge by respectively using the negative electrode active material similar to that in Examples 112 to 114, since an element, which may serve as the constituent element of the covering layer, was not included in either of the negative electrode and the electrolytic solution as in Comparative Example 101, no covering layer was formed.

The following Table 20 summarizes, for each of the negative electrode active material, the electro-conductive agent, and the negative electrode current collector included in the negative electrode in the battery for evaluation in each of Examples 112 to 114 and Comparative Examples 105 to 107, the component of the covering layer (composition of a confirmed phase), the abundance ratio between the constituent elements in the covering layer, the thickness of the covering layer, and the cover ratio of the covering layer on the surface.

TABLE 20

| | Negative electrode active material | | | | Electro-conductive agent | | | | Negative electrode current collector | | | |
|---|---|---|---|---|---|---|---|---|---|---|---|---|
| | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) |
| Example 112 | ZnO | Zn (53%), O (47%) | 32 | 52 | ZnO | Zn (53%), O (47%) | 37 | 18 | ZnO | Zn (47%), O (53%) | 3000 | 97 |
| Example 113 | ZnO | Zn (51%), O (49%) | 22 | 40 | ZnO | Zn (50%), O (50%) | 38 | 19 | ZnO | Zn (48%), O (52%) | 3000 | 99 |
| Example 114 | ZnO | Zn (52%), O (48%) | 23 | 37 | ZnO | Zn (55%), O (45%) | 35 | 20 | ZnO | Zn (49%), O (51%) | 3000 | 98 |
| Comparative Example 105 | — | — | — | — | — | — | — | — | — | — | — | — |

TABLE 20-continued

| | Negative electrode active material | | | | Electro-conductive agent | | | | Negative electrode current collector | | | |
|---|---|---|---|---|---|---|---|---|---|---|---|---|
| | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) | Component of covering layer | Abundance ratio of constituent elements (at %) | Thickness (nm) | Cover ratio (%) |
| Comparative Example 106 | — | — | — | — | — | — | — | — | — | — | — | — |
| Comparative Example 107 | — | — | — | — | — | — | — | — | — | — | — | — |

As shown in Table 19, as compared with the battery for evaluation manufactured in Example 112, in the battery for evaluation manufactured in Comparative Example 105, both of the capacity retention ratio after 20 cycles and the charge-and-discharge efficiency after 20 cycles were low. Similarly, as compared with the batteries for evaluation manufactured in Examples 113 and 114, in the batteries for evaluation manufactured in Comparative Examples 106 and 107, both of the capacity retention ratio after 20 cycles and the charge-and-discharge efficiency after 20 cycles were low. As described above, in Examples 112 to 114, the negative electrode included the covering layer, while on the other hand, in Comparative Examples 105 to 107, the negative electrode included no covering layer. Thus, it is considered that a reaction between each member (the negative electrode active material, the electro-conductive agent, and the negative electrode current collector) in the negative electrode and the electrolytic solution and self-discharge could not be suppressed, so that the capacity retention ratio and the charge-and-discharge efficiency were reduced.

According to at least one of the above embodiments, since the secondary battery includes the negative electrode, containing titanium-containing oxide and at least one kind of element selected from the group consisting of B, P, Al, La, Zr, Ge, Zn, Sn, Ga, Pb, In, Bi, and Tl, and the electrolyte containing lithium ions and a solvent containing water, the secondary battery, battery module and battery pack excellent in cycle life performance, storage performance, and large current discharge performance, and the vehicle including the battery pack can be provided.

According to at least one embodiment and Example described above, a secondary battery including a positive electrode, a negative electrode, and an electrolytic solution is provided. The negative electrode includes a current collector and a negative electrode active material including titanium-containing oxide. At least one of the current collector and the negative electrode active material includes, on at least a portion of a surface thereof, a covering layer including at least one kind of element selected from the group consisting of Zn, In, Sn, Pb, Hg, Cu, Cd, Ag, and Bi. The electrolytic solution includes an aqueous solvent and an electrolyte. According to this constitution, safety is high because the electrolytic solution including the aqueous solvent is used, and self-discharge is suppressed; therefore, it is possible to provide a secondary battery, a battery module, and a battery pack excellent in charge-and-discharge efficiency and charge-and-discharge cycle life and a vehicle including the battery pack.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A secondary battery comprising:
a positive electrode;
a negative electrode comprising a titanium-containing oxide and zinc as metal, at least one compound of additive element, or both the zinc as metal and the compound of additive element, the titanium-containing oxide comprising one or more selected from the group consisting of titanium oxide represented by a general formula $Li_xTiO_2$ where $0 \leq x \leq 1$, lithium titanium oxide represented by a general formula $Li_{4+x}Ti_5O_{12}$ where $-1 \leq x \leq 3$, lithium titanium oxide represented by $Li_{2+x}Ti_3O_7$ where $-1 \leq x \leq 3$, lithium titanium oxide represented by $Li_{1+x}Ti_2O_4$ where $0 \leq x \leq 1$, lithium titanium oxide represented by $Li_{1.1+x}Ti_{1.8}O_4$ where $0 \leq x \leq 1$, lithium titanium oxide represented by $Li_{1.07+x}Ti_{1.86}O_4$ where $0 \leq x \leq 1$, niobium oxide represented by $Li_aTiM_bNb_{2\pm\beta}O_{7\pm\sigma}$ where $0 \leq a \leq 5$, $0 \leq b \leq 0.3$, $0 \leq \beta \leq 0.3$, $0 \leq \sigma \leq 0.3$, and M is at least one selected from the group consisting of Fe, V, Mo, and Ta, and sodium niobium titanium oxide represented by a general formula $Li_{2+v}Na_{2-w}M1_xTi_{6-y-z}Nb_yM2_zO_{14+\delta}$ where $0 \leq v \leq 4$, $0 < w < 2$, $0 \leq x < 2$, $0 < y \leq 6$, $0 \leq z < 3$, $-0.5 \leq \delta \leq 0.5$, M1 includes at least one selected from Cs, K, Sr, Ba, and Ca, and M2 includes at least one selected from Zr, Sn, V, Ta, Mo, W, Fe, Co, Mn, and Al, and the compound of additive element being at least one selected from the group consisting of boron oxide, alumina, zirconium oxide, germanium oxide, zinc oxide, lead oxide, zinc hydroxide, $Li_{5+x}A_xLa_{3-x}M_2O_{12}$ where A is at least one element selected from the group consisting of Ca, Sr, and Ba, M is Nb and/or Ta, and x is $0 \leq x \leq 2$, $Li_3M_{2-x}L_2O_{12}$ where M is Ta and/or Nb, L is Zr, and x is $0 \leq x \leq 2$, $Li_{7-3x}Al_xLa_3Zr_2O_{12}$ where x is $0 \leq x \leq 0.3$, $Li_7La_3Zr_2O_{12}$, $Li_{3x}La_{2/3-x}TiO_3$ where $0.05 \leq x \leq 0.15$, $Li_{1.3}Ti_{1.7}Al_{0.3}(PO_4)_3$, an oxide solid electrolyte having a $\gamma$-$Li_3PO_4$ crystal structure, a Zn alloy, a Bi—In—Pb-based alloy, a Bi—In—Ca-based alloy, and a Bi—In—Al alloy; and
an electrolyte comprising lithium ions and water as a solvent.

2. The secondary battery according to claim 1, wherein the electrolyte further comprises zinc ions.

3. The secondary battery according to claim 1, wherein the negative electrode comprises particles of the titanium-containing oxide and a covering member covering at least a portion of surfaces of the particles and comprising the at least one kind of element.

4. The secondary battery according to claim 1, wherein the electrolyte further comprises an anion comprising at least one selected from the group consisting of a chlorine ion ($Cl^-$), a hydroxide ion ($OH^-$), a sulfate ion ($SO_4^{2-}$), and a nitrate ion ($NO_3^-$).

5. The secondary battery according to claim 1, wherein the titanium-containing oxide comprises at least one of the titanium oxide represented by the general formula $Li_xTiO_2$ ($0 \leq x \leq 1$) and the lithium titanium oxide represented by the general formula $Li_{4+x}Ti_5O_{12}$ (x is $-1 \leq x \leq 3$).

6. A battery module comprising the secondary battery according to claim 1.

7. A battery pack comprising the secondary battery according to claim 1.

8. The battery pack according to claim 7, further comprising an external power distribution terminal and a protective circuit.

9. The battery pack according to claim 7, comprising a plural of the secondary batteries, the secondary batteries being electrically connected in series, in parallel, or in combination thereof.

10. A vehicle comprising the battery pack according to claim 7.

11. The vehicle according to claim 10, wherein the battery pack is configured to recover a regenerative energy of power of the vehicle.

12. A secondary battery comprising:
a positive electrode;
a negative electrode comprising a current collector and a negative electrode active material containing a titanium-containing oxide, at least one of the current collector and the negative electrode active material including, on at least a portion of a surface thereof, a covering layer including at least one kind of element selected from the group consisting of Zn, In, Sn, Pb, Hg, Cu, Cd, Ag, and Bi, the titanium-containing oxide comprising at least one kind of compound selected from the group consisting of oxide of titanium represented by $Li_xTiO_2$ wherein x is $0 \leq x \leq 1$, lithium titanium oxide having a spinel structure, lithium-titanium oxide having a ramsdellite structure, niobium-titanium oxide represented by $Li_aTiM_bNb_{2\pm\beta}O_{7\pm\sigma}$ wherein $0 \leq a \leq 5$, $0 \leq b \leq 0.3$, $0 \leq \beta \leq 0.3$, $0 \leq \sigma \leq 0.3$, and M is at least one element selected from the group consisting of Fe, V, Mo, and Ta, niobium titanium composite oxide represented by a general formula $Ti_{1-x}M_{x+y}Nb_{2-y}O_{7-\delta}$, wherein $0 \leq x < 1$, $0 \leq y < 1$, and M includes at least one selected from the group consisting of Mg, Fe, Ni, Co, W, Ta, and Mo, and orthorhombic Na-containing niobium titanium composite oxide represented by a general formula $Li_{2+v}Na_{2-w}M1_xTi_{6-y-z}Nb_yM2_zO_{14+\delta}$ wherein $0 \leq v \leq 4$, $0 < w < 2$, $0 \leq x < 2$, $0 < y < 6$, $0 \leq z < 3$, $y+z < 6$, $-0.5 \leq \delta \leq 0.5$, M1 is at least one element selected from the group consisting of Cs, K, Sr, Ba, and Ca, and M2 is at least one element selected from the group consisting of Zr, Sn, V, Ta, Mo, W, Fe, Co, Mn, and Al; and
an electrolytic solution comprising an aqueous solvent and an electrolyte.

13. The secondary battery according to claim 12, wherein the negative electrode active material includes the covering layer on at least a portion of the surface thereof.

14. The secondary battery according to claim 12, wherein the negative electrode further comprises an electro-conductive agent, and the current collector, the negative electrode active material, and the electro-conductive agent each include the covering layer on at least a portion of a surface thereof.

15. The secondary battery according to claim 14, wherein for each of the current collector, the negative electrode active material, and the electro-conductive agent, 10% or more to 100% or less of a surface area thereof is covered with the covering layer.

16. The secondary battery according to claim 12, wherein the covering layer has a thickness of 2 nm or more and 5 μm or less and comprises at least one phase selected from the group consisting of: a phase of metal comprising at least one kind of element selected from the group consisting of Zn, In, Sn, Pb Hg, Cu, Cd, Ag, and Bi; a phase of alloy comprising the at least one kind of element; a phase of oxide of the at least one kind of element; and a phase of hydroxide of the at least one kind of element.

17. The secondary battery according to claim 12, wherein the negative electrode active material comprises at least one kind of compound selected from the group consisting of the oxide of titanium, the lithium titanium oxide having the spinel structure, the niobium titanium composite oxide represented by the general formula $Ti_{1-x}M_{x+y}Nb_{2-y}O_{7-\delta}$, wherein $0 \leq x < 1$, $0 \leq y < 1$, and M includes at least one selected from Mg, Fe, Ni, Co, W, Ta, and Mo, and the orthorhombic type Na-containing niobium titanium composite oxide represented by the general formula $Li_{2+v}Na_{2-w}M1_xTi_{6-y-z}Nb_yM2_zO_{14+\delta}$ wherein $0 \leq v \leq 4$, $0 < w < 2$, $0 \leq x < 2$, $0 < y < 6$, $0 \leq z < 3$, $y+z < 6$, $-0.5 \leq \delta \leq 0.5$, M1 is at least one element selected from the group consisting of Cs, K, Sr, Ba, and Ca, and M2 is at least one element selected from the group consisting of Zr, Sn, V, Ta, Mo, W, Fe, Co, Mn, and Al.

18. The secondary battery according to claim 12, wherein the electrolytic solution includes at least one kind of anion selected from the group consisting of $NO_3^-$, $Cl^-$, $LiSO_4^-$, $SO_4^{2-}$, $OH^-$, $[N(SO_2CF_3)_2]^-$, $[N(SO_2F)_2]^-$, and $[B(C_2O_4)_2]^-$.

19. The secondary battery according to claim 12, wherein the positive electrode includes a positive electrode active material comprising at least one kind of compound selected from the group consisting of a phosphate compound having an olivine structure and represented by a general formula $Li_xFePO_4$ wherein $0 \leq x \leq 1$, a lithium manganese composite oxide represented by a general formula $Li_xMn_2O_4$ wherein $0 < x \leq 1$, and a lithium cobalt composite oxide represented by a general formula $Li_xCoO_2$ wherein $0 < x \leq 1$.

20. A battery module comprising the secondary battery according to claim 12.

21. A battery pack comprising the secondary battery according to of claim 12.

22. The battery pack according to claim 21, further comprising an external power distribution terminal and a protective circuit.

23. The battery pack according to claim 21, comprising a plural of the secondary batteries, the secondary batteries being electrically connected in series, in parallel, or in combination thereof.

24. A vehicle comprising the battery pack according to claim 21.

25. The vehicle according to claim 24,
wherein the battery pack is configured to recover a regenerative energy of power of the vehicle.

26. The secondary battery according to claim 1, wherein the electrolyte is an aqueous electrolyte.

27. The secondary battery according to claim 1, wherein the electrolyte further comprises a lithium salt, the lithium salt is comprised of anion species and the lithium ions, and the electrolyte comprises the water in an amount of 1 mol or more relative to 1 mol of the lithium salt.

28. The secondary battery according to claim 12, wherein the electrolytic solution comprises water, and the electrolytic solution comprises the water in an amount of 1 mol or more relative to 1 mol of the electrolyte.

29. The secondary battery according to claim 27,
wherein the electrolyte comprises an aqueous solution having a lithium ion concentration in the range of not less than 2 mol/L and not more than 10 mol/L.

30. The secondary battery according to claim 28,
wherein the electrolyte comprises a lithium salt that dissociates into Li ions and anions, and the anions have a concentration of 1 M to 10 M in the electrolyte.

31. The secondary battery according to claim 12,
wherein the electrolytic solution further comprises zinc ions, and the electrolyte comprises a lithium salt that dissociates into Li ions and anions.

32. The secondary battery according to claim 1,
wherein the compound of additive element is selected from the group consisting of alumina, zirconium oxide, zinc oxide, $Li_7La_3Zr_2O_{12}$, $Li_{1.3}Ti_{1.7}Al_{0.3}(PO_4)_3$, $Li_{3.6}Ge_{0.6}V_{0.4}O_4$.

33. The secondary battery according to claim 1,
wherein the zinc as metal and the compound of additive element is comprised as particles mixed in the negative electrode or as a covering member covering the titanium-containing oxide.

34. The secondary battery according to claim 12,
wherein the covering layer comprises at least one selected from the group consisting of ZnO, $In_2O_3$, Cu, SnO, InO, and $PbO_2$.

* * * * *